(12) United States Patent
Matsumoto et al.

(10) Patent No.: US 8,051,322 B2
(45) Date of Patent: Nov. 1, 2011

(54) REDUNDANT FAILOVER SYSTEM, REDUNDANCY MANAGING APPARATUS AND APPLICATION PROCESSING APPARATUS

(75) Inventors: Norihisa Matsumoto, Fuchu (JP); Nodoka Mimura, Kunitachi (JP); Hidetoshi Nishiyama, Kodaira (JP); Makoto Watanabe, Kokubunji (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 202 days.

(21) Appl. No.: 12/435,679

(22) Filed: May 5, 2009

(65) Prior Publication Data

US 2009/0287955 A1    Nov. 19, 2009

(30) Foreign Application Priority Data

May 13, 2008    (JP) .................................. 2008-126326

(51) Int. Cl.
*G06F 11/00* (2006.01)
(52) U.S. Cl. ........................................ 714/4.11; 714/13
(58) Field of Classification Search ................. 714/4, 13, 714/4.11
See application file for complete search history.

(56) References Cited

U.S. PATENT DOCUMENTS

| | | | | |
|---|---|---|---|---|
| 5,917,997 | A * | 6/1999 | Bell et al. ............................ | 714/4 |
| 6,108,300 | A * | 8/2000 | Coile et al. ...................... | 370/217 |
| 6,647,427 | B1 * | 11/2003 | Watanabe ...................... | 709/239 |
| 6,687,245 | B2 * | 2/2004 | Fangman et al. ............. | 370/356 |
| 6,718,383 | B1 * | 4/2004 | Hebert ........................... | 709/224 |
| 6,895,442 | B1 * | 5/2005 | Khanna ......................... | 709/245 |
| 7,139,926 | B1 * | 11/2006 | Madhav et al. .................. | 714/4 |
| 7,426,576 | B1 * | 9/2008 | Banga et al. .................. | 709/245 |
| 7,516,202 | B2 * | 4/2009 | Yu et al. ........................ | 709/223 |
| 7,657,657 | B2 * | 2/2010 | Rao et al. ...................... | 709/248 |
| 7,783,914 | B1 * | 8/2010 | Havemose ................... | 714/4.11 |
| 7,818,615 | B2 * | 10/2010 | Krajewski et al. .............. | 714/13 |
| 2002/0165977 | A1 * | 11/2002 | Novaes ......................... | 709/238 |
| 2009/0113073 | A1 * | 4/2009 | Koide et al. ................... | 709/245 |
| 2009/0158082 | A1 * | 6/2009 | Jain et al. ..................... | 714/4.11 |

OTHER PUBLICATIONS

A. Niki et al., Large-Scale Fire-Fighting/Emergency Digital Wireless System, Hitachi Kokusai Denki Giho, 2006, No. 7, pp. 17-25. (with partial English translation).

N. Fujita et al., Scalable Overlay Network Deployment for Dynamic Collaborative Groups, The Institute of Electronics, Information and Communication Engineers, Technical Report of IEICE, NS2004-95m, Sep. 2004, pp. 55-58. (with English Abstract).

* cited by examiner

*Primary Examiner* — Robert Beausoliel, Jr.
*Assistant Examiner* — Elmira Mehrmanesh
(74) *Attorney, Agent, or Firm* — Mattingly & Malur, PC

(57) ABSTRACT

In a communication system using an IP tunnel for communication between application processing apparatuses (hereinafter, processing apparatuses), an application can be moved to an arbitrary processing apparatus, update of tunnel tables included in the respective processing apparatuses is quickly performed, and a buffer for waiting for packets during the table update is made small. A redundancy managing apparatus manages a correspondence between a virtual IP address (VIP) of an application in a communication system and an IP address (RIP) of an processing apparatus to execute the application. The processing apparatus notifies the VIP of the communication partner application of the application to the redundancy managing apparatus. The redundancy managing apparatus notifies the VIP of the communication partner application of the moved application and the RIP of the processing apparatus to execute the communication partner application to the processing apparatus of the movement destination (failover destination) of the application.

8 Claims, 42 Drawing Sheets

| VIRTUAL IP ADDRESS 401 | STATE 402 | APPARATUS IP ADDRESS 403 | SUBNET MASK 404 |
|---|---|---|---|
| VIP0 | ACTIVE | RIP0 | M0 |
| VIP1 | ACTIVE | RIP1 | M1 |
| | STANDBY | RIP3 | M3 |
| VIP2 | ACTIVE | RIP2 | M2 |
| VIP4 | ACTIVE | RIP4 | M4 |
| VIP6 | ACTIVE | RIP6 | M6 |
| | STANDBY | RIP7 | M7 |

FIG.4

TUNNEL TABLE OF APPLICATION PROCESSING APPARATUS 1

| VIRTUAL IP ADDRESS | STATE | APPARATUS IP ADDRESS | REGISTRATION PERIOD |
|---|---|---|---|
| VIP4 | ACTIVE | RIP4 | 3600s |
| VIP6 | ACTIVE | RIP6 | INFINITE |
|  | STANDBY | RIP7 | INFINITE |

3801 — VIRTUAL IP ADDRESS
3802 — STATE
3803 — APPARATUS IP ADDRESS
3804 — REGISTRATION PERIOD

FIG.38A

TUNNEL TABLE OF APPLICATION PROCESSING APPARATUS 4

| VIRTUAL IP ADDRESS | STATE | APPARATUS IP ADDRESS | REGISTRATION PERIOD |
|---|---|---|---|
| VIP1 | ACTIVE | RIP1 | 3600s |
| | STANDBY | RIP3 | DEPENDENCY |
| VIP6 | ACTIVE | RIP6 | INFINITE |
| | STANDBY | RIP7 | INFINITE |

FIG.38B

TUNNEL TABLE OF APPLICATION PROCESSING APPARATUS 2

| VIRTUAL IP ADDRESS 3801 | STATE 3802 | APPARATUS IP ADDRESS 3803 | REGISTRATION PERIOD 3804 |
|---|---|---|---|
| VIP1 | ACTIVE | RIP1 | 200s |
|  | STANDBY | RIP3 | DEPENDENCY |
| VIP6 | ACTIVE | RIP6 | INFINITE |
|  | STANDBY | RIP7 | INFINITE |

FIG.39A

BEFORE FAILURE DETECTION

| VIRTUAL IP ADDRESS | STATE | APPARATUS IP ADDRESS | REGISTRATION PERIOD |
|---|---|---|---|
| VIP1 | ACTIVE | RIP1 | 200s |
|  | BICAST | RIP3 | DEPENDENCY |
| VIP6 | ACTIVE | RIP6 | INFINITE |
|  | STANDBY | RIP7 | INFINITE |

FIG.39B

AFTER FAILURE DETECTION

| VIRTUAL IP ADDRESS | STATE | APPARATUS IP ADDRESS | REGISTRATION PERIOD |
|---|---|---|---|
| VIP1 | FAILURE | RIP1 | DEPENDENCY |
|  | ACTIVE | RIP3 | 3600s |
| VIP6 | ACTIVE | RIP6 | INFINITE |
|  | STANDBY | RIP7 | INFINITE |

FIG.39C

AFTER COMPLETION OF FAILOVER

TUNNEL TABLE OF APPLICATION PROCESSING APPARATUS 3

| VIRTUAL IP ADDRESS | STATE | APPARATUS IP ADDRESS | REGISTRATION PERIOD |
|---|---|---|---|
| VIP6 | ACTIVE | RIP6 | INFINITE |
|  | STANDBY | RIP7 | INFINITE |

3801  3802  3803  3804

BEFORE FAILOVER

FIG.40A

| VIRTUAL IP ADDRESS | STATE | APPARATUS IP ADDRESS | REGISTRATION PERIOD |
|---|---|---|---|
| VIP4 | ACTIVE | RIP4 | 3600s |
| VIP6 | ACTIVE | RIP6 | INFINITE |
|  | STANDBY | RIP7 | INFINITE |

AFTER FAILOVER PREPARATION

AFTER FAILURE DETECTION

| VIRTUAL IP ADDRESS (401) | STATE (402) | APPARATUS IP ADDRESS (403) | SUBNET MASK (404) |
|---|---|---|---|
| VIP0 | ACTIVE | RIP0 | M0 |
| VIP1 | FAILURE | RIP1 | M1 |
|  | FAILOVER SCHEDULED | RIP3 | M3 |
| VIP2 | ACTIVE | RIP2 | M2 |
| VIP4 | ACTIVE | RIP4 | M4 |
| VIP6 | ACTIVE | RIP6 | M6 |
|  | STANDBY | RIP7 | M7 |

FIG.41B

AFTER FAILOVER COMPLETION

| VIRTUAL IP ADDRESS | STATE | APPARATUS IP ADDRESS | SUBNET MASK |
|---|---|---|---|
| VIP0 | ACTIVE | RIP0 | M0 |
| VIP1 | FAILURE | RIP1 | M1 |
|  | ACTIVE | RIP3 | M3 |
| VIP2 | ACTIVE | RIP2 | M2 |
| VIP4 | ACTIVE | RIP4 | M4 |
| VIP6 | ACTIVE | RIP6 | M6 |
|  | STANDBY | RIP7 | M7 |

REDUNDANT FAILOVER SYSTEM, REDUNDANCY MANAGING APPARATUS AND APPLICATION PROCESSING APPARATUS

CLAIM OF PRIORITY

The present application claims priority from Japanese patent application JP 2008-126326 filed on May 13, 2008, the content of which is hereby incorporated by reference into this application.

BACKGROUND OF THE INVENTION

1. Field of the Invention

The present invention relates to a redundant failover system, a redundancy managing apparatus and an application processing apparatus, and particularly to a redundant failover system for performing redundant failover of an application processing apparatus in a communication system in which a plurality of application processing apparatuses cooperate with each other to perform communication control, a redundancy managing apparatus and an application processing apparatus.

2. Description of the Related Art

In an independent wireless system for disaster prevention or fire-fighting use, failure resistance against disaster or the like is very important. Thus, an inter-site redundancy technique as disclosed in, for example, non-patent document 1 is put to practical use. In the technique of non-patent document 1, circuit switches of a site A and a site B, which are geographically separated from each other, have one-to-one redundant structure. It is assumed that the circuit switch at the site A is in an active state, and the circuit switch at the site B is in a standby state. Each site contains lines from peripheral base stations, and in the site B, the line from the base station is connected to a relay line to the site A, not the circuit switch of the site B. The circuit switch of the site A controls all base stations in the independent wireless system. Here, it is assumed that an earthquake occurs at the site A, and a failure occurs in the circuit switch of the site A. In the site B, the line from the base station is connected to the circuit switch of the site B, not the relay line. In the site A, the line from the base station is connected to the relay line to the site B, not the circuit switch of the site A. The circuit switch of the site B is placed in the active state, and all the base stations in the independent wireless system are controlled in the site B.

On the other hand, as a failure resistance technique in an IP-based communication system, for example, there is a Linux Virtual Server (LVS). In the LVS, requests from an unspecified number of Web clients are processed by Web servers dispersed and arranged in a plurality of subnets. First, a Web client inquires of a DNS server about an IP address of URL which the client desires to access. The DNS server sends back the IP address of a load balancer. The Web client transmits an HTTP request packet to the IP address of the load balancer. The load balancer selects the Web server to process the HTTP request by the Hash value of the source IP address of the HTTP request packet. Then, the received packet is encapsulated by a packet addressed to the selected Web server and is transmitted. In all the Web servers, the IP address of the load balancer is set (that is, made effective) as one of IP addresses of the Web server itself. The Web server having received the encapsulated packet decapsulates the packet. Then, since the packet addressed to the IP address of the load balancer, that is, the packet addressed to the Web server appears, an application on the Web server processes the HTTP request. The application on the Web server transmits an HTTP response packet to the IP address of the Web client set in the source address of the packet. The source IP address is the IP address of the load balancer.

As described above, in the LVS, since an IP tunnel is used for the packet transfer from the load balancer to the Web server, the load balancer and the Web server, and the Web servers may be located in different subnets. Besides, the load server periodically transmits an HTTP request to each Web server in order to detect the failure of the Web server. When a response is not returned, the HTTP request from the Web client is made not to be transferred to the Web server. By doing so, also with respect to the Web client whose HTTP request has been transferred to the failed Web server, the HTTP request is transferred to a normal Web server.

Besides, as a technique in which an IP tunnel is used for communication between apparatuses, and an application uses a virtual IP address different from an IP address of the apparatus, there is a technique disclosed in, for example, non-patent document 2. According to the technique of non-patent document 2, a plurality of users on an IP network form a group and secure communication is performed in the group. Member information of the group and a virtual IP address space are previously registered in a DNS server. The user starts the login client in a user terminal, and transmits a login request to the DNS server. The DNS server identifies the group to which the user terminal belongs, and assigns a virtual IP address used by an application of the user terminal. When the application of the user terminal communicates with an application of a terminal of the same group, a packet is transmitted to the virtual IP address of the communication partner application. When it is not known that the destination address of the packet transmitted by the application is a virtual IP address on which terminal, the IPsec driver of the user terminal inquires of the DNS server, and knows the IP address of the communication partner terminal. An IPsec tunnel is established between the user terminal and the communication partner terminal, and the packet transmitted by the application is sent to the communication partner terminal.

[Non-patent document 1] "Large-Scale Fire-Fighting/Emergency Digital Wireless System" Hitachi Kokusai Denki Giho, 2006, No. 7

[Non-patent document 2] "Overlay Network Control System Suitable For Large-Scale Dynamic Group Communication", Denshi Jouhou Tsusin Gakkai, Singaku Giho, NS2004-95, 2004-09

SUMMARY OF THE INVENTION

In an IP-based independent wireless system, a base station, a gateway apparatus to contain the base station, an SIP server, an application server and the like cooperate with each other to perform communication control. Thus, for example, in communication between the gateway apparatus and the SIP server, it is necessary that redundant failover can be performed in both apparatuses. Besides, when a public IP-VPN service is used for inter-site communication in the independent wireless system, subnets are separated for each site. Thus, in order to perform the redundant failover of the gateway apparatus or the SIP server (hereinafter referred to as the application processing apparatus) between the sites, it is necessary that failover can be performed between the subnets.

On the other hand, in the LVS, although failover between subnets for the Web server can be performed, failover between subnets for the Web client can not be performed. This is because, a packet transmitted by the Web server is addressed to the IP address of the user terminal, and the packet is routed only to the subnet to which the user terminal belongs. This is not improved even if the function of a load balancer is incorporated in the user terminal, and communication is performed through the IP tunnel from the user terminal to the Web server. On the other hand, when the Web client is regarded as the Web server and the LVS is applied reversely, the IP tunnel can be used for packet transfer from the load balancer to the Web client, and failover spanning subnets can be performed between Web clients sharing the IP address of the load balancer. However, in this method, traffic is concentrated on the load balancer, and it becomes a bottleneck for communication. Further, when a packet is transmitted from the Web client and the Web server to the load balancer, the IP tunnel is not used, and therefore, redundant failover of the load balancer to a different subnet can not be performed.

On the other hand, in non-patent document 2, since the IP tunnel is used for communication among all user terminals, even if an application is performed on any user terminal, when the correspondence between the virtual IP address and the IP address of the user terminal can be suitably updated, redundant failover between subnets can be performed. However, in non-patent document 2, there is no such a mechanism that after the DNS server assigns the virtual IP address to the user terminal at the time of login of the user terminal, the assigned virtual IP address is moved to another user terminal. This is because, non-patent document 2 introduces the virtual IP address for the purpose of performing the secure communication among the group members, and the redundant failover of the application during communication is not an object. Accordingly, the application process to which the virtual IP address is assigned can not be moved between the terminals or a plurality of applications using different virtual IP addresses can not be executed on one terminal.

As stated above, the update of a correspondence between a virtual IP address of an application and an IP address of an application processing apparatus to execute the application is one of matters in the case where redundant failover (or also called movement) of an application is performed between arbitrary application processing apparatuses. The update of the correspondence is required for an IP encapsulating function, so-called communication middle-wave operation, which is independent of the application, and is a specific process in a system for performing communication between application processing apparatuses through an IP tunnel. Hereinafter, a table for storing a correspondence between a virtual IP address of a communication partner application and an IP address of an application processing apparatus to execute the communication partner application, which is stored in each application processing apparatus, is called, for example, a tunnel table. A matter of update of the tunnel table will be described in detail below.

For example, consideration is given to a case where an application A on an application processing apparatus "a" continuously transmits a packet to an application B on an application processing apparatus "b", and the application B performs a process each time the packet is received, and transmits the packet to an application C on an application processing apparatus "c". At this time, it is assumed that a failure occurs in the application processing apparatus "b", and the application B is moved to another application processing apparatus "x". First, the application processing apparatus "a" must change the tunnel table so that a packet addressed to the virtual IP address of the application B is encapsulated into a packet addressed to the IP address of the application processing apparatus "x". In non-patent document 2, after the encapsulated packet, that is, the user packet is transmitted, when an error response is detected, a DNS inquiry for tunnel table update is first performed. Accordingly, when the application processing apparatus "b" does not respond due to the failure, quick tunnel table update can not be performed. Next, it is assumed that the update of the tunnel table of the application processing apparatus "a" can be quickly performed by some method, the application processing apparatus "x" must configure the tunnel table relating to the application C as the packet transmission destination of the application B. In non-patent document 2, when the application B transmits the packet, and when the destination address, that is, the IP address of the application processing apparatus "c" corresponding to the virtual IP address of the application C is unclear, a DNS inquiry is made. Accordingly, until a response from the DNS server occurs, the application processing apparatus "x" is required to temporarily buffer the packet transmitted by the application B. This causes the delay of communication. Besides, the application B transmits the packet irrespective of waiting for the response from the DNS server. Thus, it is necessary that the application processing apparatus "x" includes a buffer corresponding to the packet transmission speed of the application B. For example, when a packet flowing through the application A, the application B, and the application C is a voice packet, it is necessary to buffer 50 packets/sec for one mobile station, or packets 100 times larger than that for 100 mobile stations. In the case of a video packet, since the packet length is long, a larger buffer is required. Besides, a time period required for redundant failover is a time period of interruption of user communication.

In view of the above, it is an object of the invention to provide a redundant failover system, a redundancy managing apparatus and an application processing apparatus, in which a time required for redundant failover is made as short as possible in a communication system such as an independent wireless system. Besides, it is another object of the invention to shorten an interruption time of communication between applications. Besides, it is another object of the invention to dynamically move (switch) an application to an application processing apparatus of a different subnet in a communication system using an IP tunnel for communication between application processing apparatuses.

It is another object of the invention to quickly perform update of a tunnel table of each application processing apparatus. For example, it is another object of the invention to update a tunnel table after redundant failover without waiting for transmission of a packet by an application and to perform the quick update. Besides, it is another object of the invention to reduce a buffer for waiting for packets during update of a table.

There is provided a redundancy managing apparatus for collectively managing a correspondence between a virtual IP address of an application in an independent wireless system and an IP address of an application processing apparatus to execute the application. The redundancy managing apparatus determines an application processing apparatus of a movement destination of the application, and notifies the correspondence between the virtual IP address of the communication partner application of the moved application and the IP address of the application processing apparatus to execute the communication partner application to the application processing apparatus of the movement destination.

According to the first solving means of this invention, there is provided a redundant failover system for switching an application processing apparatus to execute a first application in a communication system which comprises a plurality of application processing apparatuses including a failover source application processing apparatus to execute the first application, a failover destination application processing apparatus to execute the first application instead of the failover source application processing apparatus, and a communication partner application processing apparatus to communicate with the failover source application processing apparatus and the failover destination application processing apparatus, and a redundancy managing apparatus, and in which respective applications executed by the plurality of application processing apparatuses perform communication control, wherein each of the failover source application processing apparatus and the failover destination application processing apparatus includes a memory storing the first application and tunnel information, and a packet transfer processing section, the tunnel information includes a correspondence between a virtual IP address of a second application executed by the communication partner application processing apparatus and an IP address of the communication partner application processing apparatus, the packet transfer processing section refers to the tunnel information to change a packet addressed to the virtual IP address of the second application from the first application into a packet addressed to the IP address of the communication partner application processing apparatus and transmits the packet to the communication partner application processing apparatus, the failover source application processing apparatus further includes an application communication information notification section to notify the virtual IP address of the second application, the redundancy managing apparatus includes a memory storing address information and a tunnel information update instruction section, the address information includes correspondences between IP addresses of the plurality of application processing apparatuses in the redundant failover system and virtual IP addresses of applications executed by the respective application processing apparatuses, the tunnel information update instruction section refers to the address information and notifies at least the virtual IP address of the second application and the IP address of the communication partner application processing apparatus corresponding to the virtual IP address to the failover destination application processing apparatus, the failover destination application processing apparatus further includes a tunnel information management section, and starts a process of the first application, irrespective of whether the first application transmits a packet to the virtual IP address of the second application, the tunnel information management section sets the virtual IP address of the second application and the IP address of the communication partner application processing apparatus correspondingly, which are notified from the redundancy managing apparatus, into the tunnel information.

According to the second solving means of this invention, there is provided an application processing apparatus in a redundant failover system which comprises a plurality of application processing apparatuses including a failover source application processing apparatus to execute a first application, a failover destination application processing apparatus to execute the first application instead of the failover source application processing apparatus, and a communication partner application processing apparatus to communicate with the failover source application processing apparatus and the failover destination application processing apparatus, and a redundancy managing apparatus, and in which, respective applications executed by the plurality of application processing apparatuses perform communication control, the redundancy managing apparatus includes address information in which correspondences between IP addresses of the plurality of application processing apparatuses in the redundant failover system and virtual IP addresses of applications executed by the respective application processing apparatuses are stored and, refers to the address information, and notifies at least the virtual IP address of the second application and the IP address of the communication partner application processing apparatus corresponding to the virtual IP address to the failover destination application processing apparatus, the application processing apparatus comprises:

a memory storing the first application and tunnel information, a packet transfer processing section;

an application communication information notification section; and a tunnel information management section, wherein the tunnel information includes a correspondence between the virtual IP address of a second application executed by the communication partner application processing apparatus and the IP address of the communication partner application processing apparatus, the packet transfer processing section refers to the tunnel information to change a packet addressed to the virtual IP address of the second application from the first application into a packet addressed to the IP address of the communication partner application processing apparatus and transmits the packet to the communication partner application processing apparatus, when the application processing apparatus operates as a failover source, the application communication information notification section notifies the virtual IP address of the second application, when the application processing apparatus operates as a failover destination, the application processing apparatus starts a process of the first application, and irrespective of whether the first application transmits a packet to the virtual IP address of the second application, the tunnel information management section sets the virtual IP address of the second application and the IP address of the communication partner application processing apparatus correspondingly, which are notified from the redundancy managing apparatus, into the tunnel information.

According to the third solving means of this invention, there is provided a redundancy managing apparatus in a redundant failover system which comprises a plurality of application processing apparatuses including a failover source application processing apparatus to execute a first application, a failover destination application processing apparatus to execute the first application instead of the failover source application processing apparatus, and a communication partner application processing apparatus to communicate with the failover source application processing apparatus and the failover destination application processing apparatus, and a redundancy managing apparatus, and in which, respective applications executed by the plurality of application processing apparatuses perform communication control, each of the failover source application processing apparatus and the failover destination application processing apparatus, stores a correspondence between a virtual IP address of a second application executed by the communication partner application processing apparatus and an IP address of the communication partner application processing apparatus into a tunnel information and, refers to the tunnel information to change a packet addressed to the virtual IP address of the second application from the first application into a packet addressed to the IP address of the communication partner application processing apparatus and transmits the packet to the communication partner application processing apparatus, the failover source application processing apparatus notifies the virtual IP address of the second application, the failover destination application processing apparatus starts a process of the first application in a case of receiving an instruction to start the process of the first application and, irrespective of whether the first application transmits a packet to the virtual IP address of the second application, sets the virtual IP address of the second application and the IP address of the communication partner application processing apparatus correspondingly, which are notified from the redundancy managing apparatus, into the tunnel information, the redundancy managing apparatus comprises:

a memory storing address information; and, a tunnel information update instruction section, wherein the address information includes correspondences between IP addresses of the plurality of application processing apparatuses in the redundant failover system and virtual IP addresses of applications executed by the respective application processing apparatuses, the tunnel information update instruction section refers to the address information and notifies at least the virtual IP address of the second application and the IP address of the communication partner application processing apparatus corresponding to the virtual IP address to the failover destination application processing apparatus.

According to the invention, it is possible to provide a redundant failover system, a redundancy managing apparatus and an application processing apparatus, in which a time required for redundant failover is made as short as possible in a communication system such as an independent wireless system. Besides, according to the invention, it is possible to shorten an interruption time of communication between applications. Besides, according to the invention, it is possible to dynamically move (switch) an application to an application processing apparatus of a different subnet in a communication system using an IP tunnel for communication between application processing apparatuses.

According to the invention, it is possible to quickly perform update of a tunnel table of each application processing apparatus. For example, according to the invention, it is possible to update a tunnel table after redundant failover without waiting for transmission of a packet by an application and to perform the quick update. Besides, according to the invention, it is possible to reduce a buffer for waiting for packets during update of a table.

BRIEF DESCRIPTION OF THE DRAWINGS

FIG. 4 is a view of an address table.

FIGS. 38A and 38B are views showing contents of tunnel tables of an application processing apparatus 1 and an application processing apparatus 4.

FIGS. 39A to 39C are views showing contents of a tunnel table of an application processing apparatus 2.

FIGS. 40A and 40B are views showing contents of a tunnel table of an application processing apparatus 3.

FIGS. 41A and 41B are views showing contents of an address table of a redundancy managing apparatus.

DETAILED DESCRIPTION OF THE INVENTION (System Structure)

Figure 1:
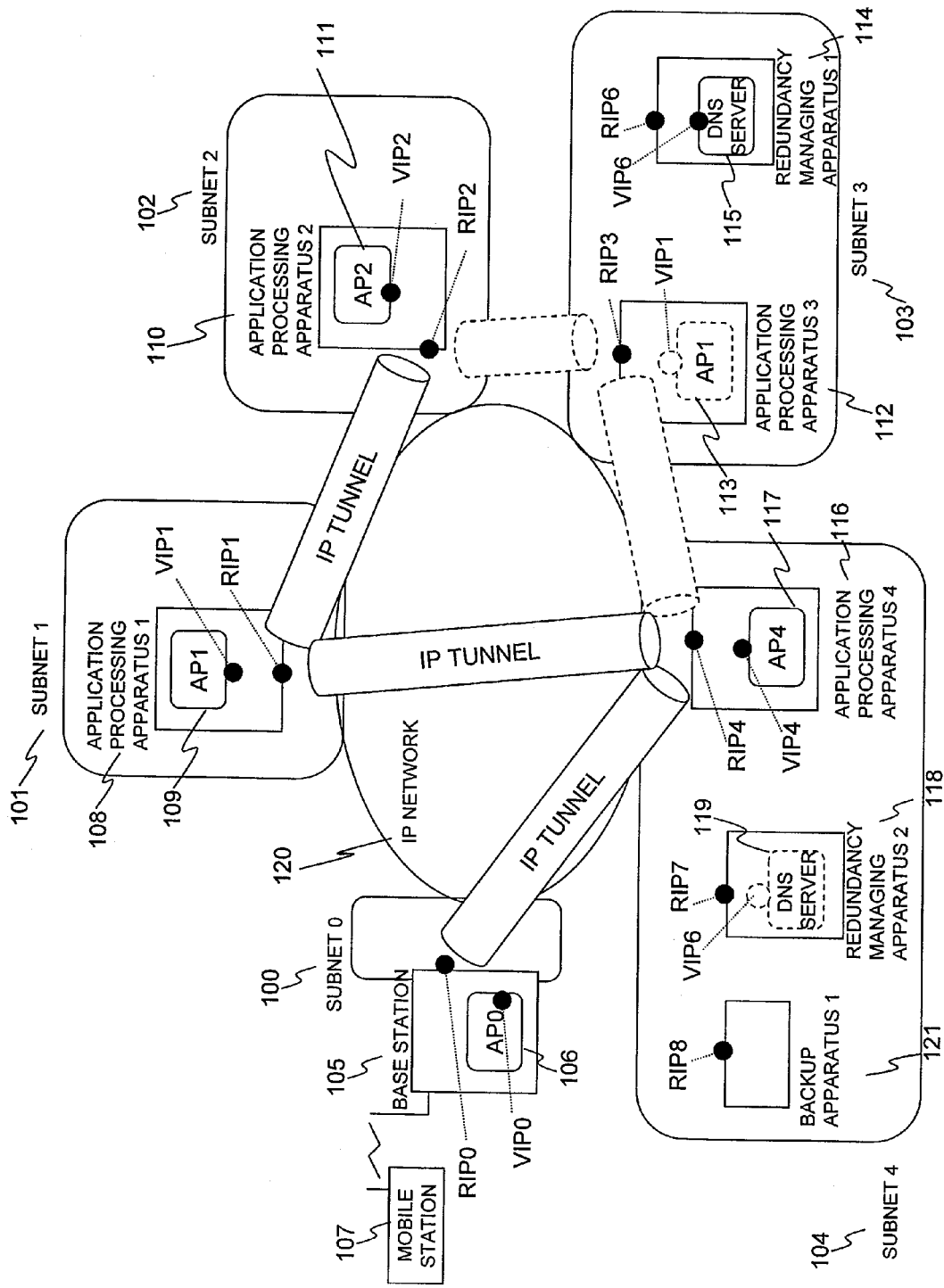
FIG. 1 is a view showing a network structure of an independent wireless system.

FIG. 1 shows a communication system to which an embodiment is applied.

The communication system includes a plurality of application processing apparatuses (108, 110, 112, 116), and redundancy managing apparatuses (114, 118). Besides, the communication system may further include a backup apparatus (121) and a base station (105).

An IP network 120 is connected with a subnet 0 (100), a subnet 1 (101), a subnet 2 (102), a subnet 3 (103) and a subnet 4 (104). For example, the base station 105 exists in the subnet 0 (100). In this embodiment, although a description will be given using, as an example, an independent wireless system, an appropriate communication system may be used irrespective of independence and wireless.

The base station 105 has RIP0 as an IP address for communicating with another apparatus through the subnet 0 (100). The base station 105 executes, for example, an AP0 (106) as an application for controlling the base station. AP0 (106) uses, for example, virtual IP address VIP0 to perform communication. The base station 105 communicates with a mobile station 107. Incidentally, here, an IP address assigned to a base station or an apparatus such as an application processing apparatus is denoted by RIP, and a virtual IP address assigned to an application is denoted by VIP. Incidentally, an appropriate address other than the IP address may be used.

An application processing apparatus for performing communication control of the independent wireless system exists in each of the subnet 1 (101), the subnet 2 (102), the subnet 3 (103) and the subnet 4 (104). The application processing apparatus 1 (108), the application processing apparatus 2 (110), the application processing apparatus 3 (112) and the application processing apparatus 4 (116) respectively have RIP1, RIP2, RIP3 and RIP4 as the IP address for communicating with another apparatus. Besides, the application processing apparatus 1 (108), the application processing apparatus 2 (110), and the application processing apparatus 4 (116) respectively execute AP1 (109), AP2 (111) and AP4 (117) as a communication control application of the independent wireless system. As an example of the communication control application, there is a communication control process in a gateway apparatus, an SIP server or the like. AP1 (109), AP2 (111) and AP4 (117) respectively perform communication by using virtual IP addresses VIP1, VIP2 and VIP4.

The application processing apparatus 3 (112) executes application AP1 (113) for taking over the process of AP1 (109) when a failure occurs in AP1 (109) of the application processing apparatus 1 (108). That is, with respect to AP1, AP1 (109) is active, and APE (113) is on standby. When AP1 (113) is placed in the active state from the standby state, AP1 (113) uses the same virtual IP address VIP1 as AP1 (109) and performs communication. By doing so, a communication partner application of AP1 (109) may be unconscious of the change of the address due to the redundant failover of AP1. However, while AP1 (109) is active and normally performs communication, VIP1 may not be made effective in the application processing apparatus 3 (112). This is because, when another application on the application processing apparatus 3 (112) transmits a packet addressed to the VIP1 in order to communicate with active AP1 (109), when VIP1 is made effective in the application processing apparatus 3 (112), the packet can not be transmitted to the outside of the apparatus.

The redundancy managing apparatus 1 (114) exists in the subnet 3 (103). An IP address by which the redundancy managing apparatus 1 (114) communicates with another apparatus is RIP6. The redundancy managing apparatus 1 (114) collectively manages a correspondence between the IP address of the application processing apparatus in the independent wireless system and the virtual IP address of the application executed on the application processing apparatus. Besides, a DNS server 115 is executed. The DNS server 115 performs communication by using virtual IP address VIP6.

The redundancy managing apparatus 2 (118) exists in the subnet 4 (104). An IP address by which the redundancy managing apparatus 2 (118) communicates with another apparatus is RIP7. The redundancy managing apparatus 2 (118) is on standby for the redundancy managing apparatus 1 (114). The redundancy managing apparatus 2 (118) executes a DNS server 19. The DNS server 119 uses the same virtual IP address VIP6 as the DNS server 115 of the redundancy managing apparatus 1 (114) to perform communication. However, during the standby, similarly to the application processing apparatus 3 (112), the virtual IP address VIP6 may not be made effective in the redundancy managing apparatus 2 (119).

The backup apparatus 1 (121) exists in the subnet 4 (104). The backup apparatus 1 (121) stores information (hereinafter referred to as transport communication information) relating to transport communication executed by AP0 (106), AP1 (109), AP2 (111) and AP4 (117), respectively. The transport communication information includes, for example, with respect to an application, its own virtual IP address, its own transport layer port number, a virtual IP address of a communication partner application, and a transport layer port number of the communication partner application. Then, for example, when a failure occurs in the application processing apparatus 1 (108), the application processing apparatus 3 (112) of the failover destination of AP1 inquires of the backup apparatus 1 (121) about the transport communication information of AP1 (109), and continuously executes the process of AP1 based on the received content. Incidentally, the redundancy managing apparatus 1 (114) is made to store the transport communication information of the application in the independent wireless system, and the backup apparatus 1 (121) can be omitted. Besides, the backup apparatus 1 (121) may store information intrinsic to the application and necessary for continuation execution of the application other than the transport communication information, together with the transport communication information. An IP address by which the backup apparatus 1 (121) communicates with another apparatus is RIP8.

When AP0 (106) of the base station 105 and AP4 (117) of the application processing apparatus 4 (116) communicate with each other, an IP tunnel is used in which both ends are RIP0 and the RIP4. Similarly, when AP4 (117) of the application processing apparatus 4 (116) and AP1 (109) of the application processing apparatus 1 (108) communicates with each other, an IP tunnel is used in which both ends are RIP4 and RIP1. When AP1 (109) of the application processing apparatus 1 (108) and AP2 (111) of the application processing apparatus 2 (110) communicates with each other, an IP tunnel is used in which both ends are RIP1 and the RIP2.

In this embodiment, for example, when a failure occurs in the application processing apparatus 1 (108) of the subnet 1 (101), AP1 (109) is switched to AP1 (113) of the application processing apparatus 3 (112) of the subnet 3 (103), and communication between AP2 and AP1 and communication between AP1 and AP4 are quickly restored. Incidentally, in the following description, "movement of application" or "taking over of application process" has the same meaning as failover of application.

Figure 2:
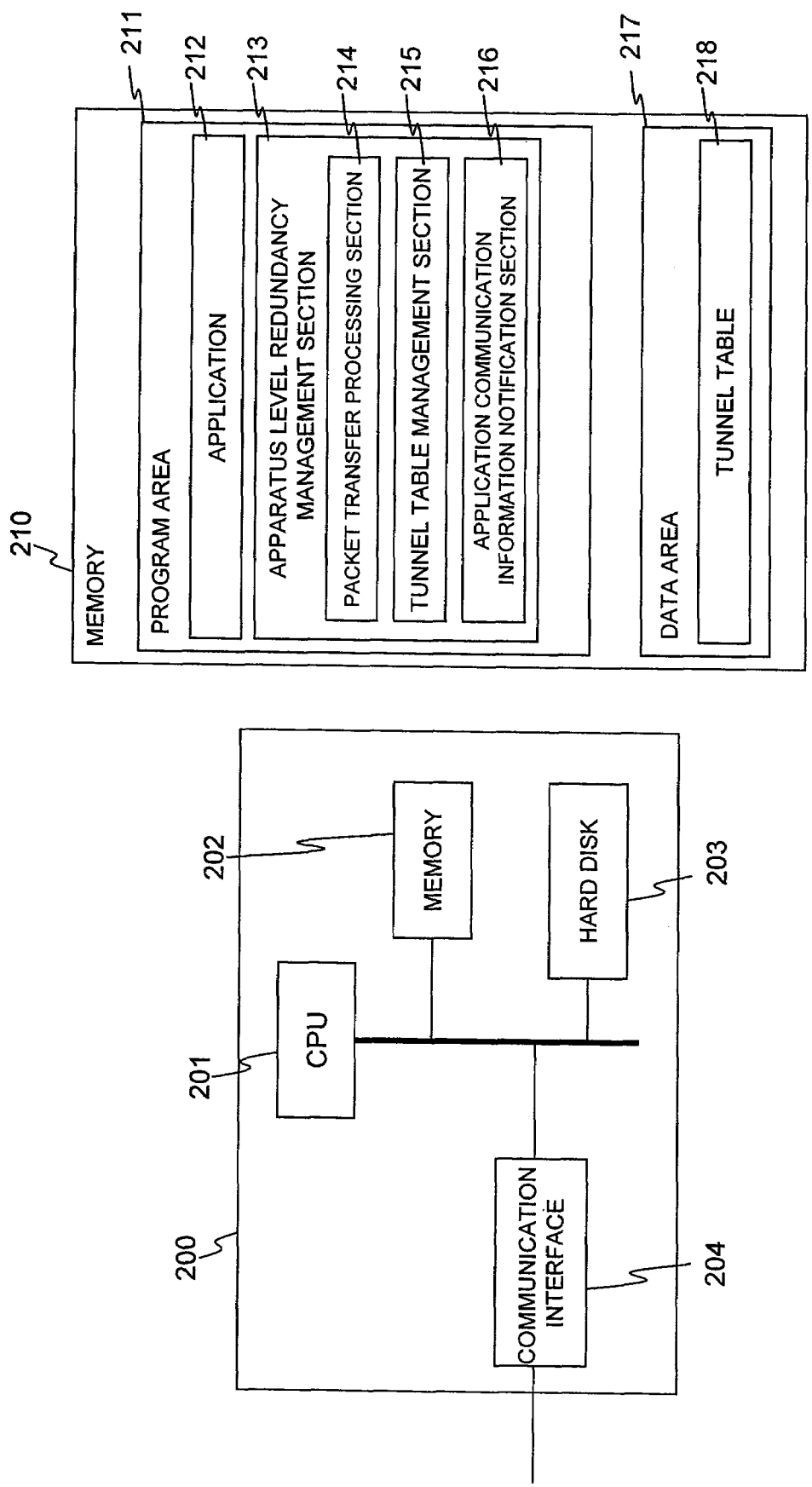
FIG. 2 is a view showing a structure of an application processing apparatus.

FIG. 2 is a structural view of the application processing apparatus 1 (108).

An application processing apparatus 200 includes, for example, a CPU 201, a memory 202, a hard disk 203 and a communication interface 204. The CPU 201 is a central processing unit to execute a program in the memory 202. The hard disk 203 stores data to be held irrespective of power ON/OFF of the apparatus. The communication interface 204 is an interface circuit for communicating with the other application processing apparatus 2 (110) or the redundancy managing apparatus 1 (114). Incidentally, the other application processing apparatus 2 (110), 3 (112), or 4 (116) has the same structure.

A memory 210 of FIG. 2 shows the content of the memory 202.

The memory 210 includes a program area 211 and a data area 217. The program area 211 includes an application 212 for performing communication control of the independent wireless system, and an apparatus level redundancy management section 213 for managing an IP tunnel through which the application 212 communicates with the application of the other apparatus. The apparatus level redundancy management section 213 includes a packet transfer processing section 214, a tunnel table management section 215 and an application communication information notification section 216. The packet transfer processing section 214 encapsulates a packet addressed to a virtual IP address transmitted by the application 212 by a packet addressed to an IP address of a suitable application processing apparatus, and transmits it to the outside of the apparatus. Besides, when an encapsulated packet is received from the outside of the apparatus, the packet is decapsulated and is transferred to the application 212. The tunnel table management section 215 updates a tunnel table 218 to which reference is made when the packet transfer processing section 214 performs the encapsulating process. The application communication information notification section 216 notifies the virtual IP address of the communication partner application of the application 212 and the transport communication information (virtual IP address of the application 212 and port number, virtual IP address of the communication partner application and port number) of the application 212 to the redundancy managing apparatus 1 (114) or the application processing apparatus or the backup apparatus 121 which is the failover destination of the application 212. The data area 217 includes the tunnel table 218.

The tunnel table 218 will be described by use of FIG. 38A. The tunnel table 218 stores a virtual IP address 3801, a state 3802, an apparatus IP address 3803, and a registration period 3804 which are made to correspond to each other. The virtual IP address 3801 is a virtual IP address of a communication partner application of AP1 (109) on the application processing apparatus 1 (108). The apparatus IP address 3803 is an IP address of an application processing apparatus to execute the communication partner application and a redundancy managing apparatus. The state 3802 represents the state of the communication partner application, for example, Active, Standby, or Failure for each apparatus IP address 3803. The registration period 3804 represents a period in which the apparatus IP address 3803 is held in the tunnel table 218. For example, in FIG. 38A, the virtual IP address VIP4 of AP4 (117) is made to correspond to the IP address RIP4 of the application processing apparatus 4 (116), and this correspondence is scheduled to be deleted after 3600 seconds. Besides, with respect to the virtual IP address VIP6 of the redundancy managing apparatus 1 (114), the IP address RIP6 of the active redundancy managing apparatus 1 (114) and the IP address RIP7 of the standby redundancy managing apparatus 2 (118) are respectively registered indefinitely.

Figure 3:
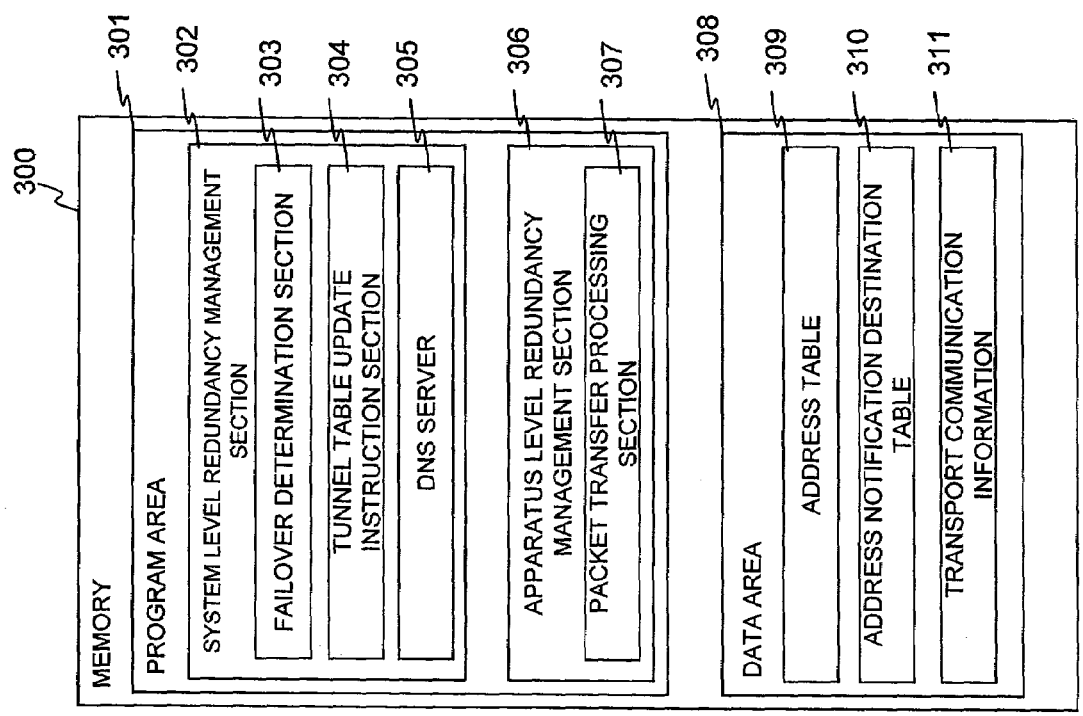
FIG. 3 is a view showing memory contents of a redundancy managing apparatus.

Next, a structure of the redundancy managing apparatus 1 (114) will be described. The physical structure thereof is the same as the application processing apparatus 200 shown in FIG. 2. FIG. 3 shows the content of a memory 202. A memory 300 includes a program area 301 and a data area 308.

The program area 301 includes a system level redundancy management section 302, and an apparatus level redundancy management section 306. The system level redundancy management section 302 includes a failover determination section 303, a tunnel table update instruction section 304, and a DNS server 305. The failover determination section 303 determines that when a failure occurs in an application processing apparatus in the independent wireless system, which application processing apparatus takes over the application process executed by the application processing apparatus, and instructs the taking-over destination application processing apparatus to place the application in the active state from the standby state. The tunnel table update instruction section 304 instructs the application processing apparatus to update the tunnel table based on an address table 309 storing a correspondence between an IP address of an application processing apparatus in the independent wireless system and a virtual IP address of an application. The DNS server 305 processes a DNS query from the application of the application processing apparatus, and sends back a DNS response. The apparatus level redundancy management section 306 includes a packet transfer processing section 307. When the DNS server 305 and the application of the application processing apparatus communicate with each other, the packet transfer processing section 307 performs encapsulation and decapsulation of a packet. The data area 308 includes the address table 309, an address notification destination table 310 and a transport communication information 311.

FIG. 4 is an explanatory view of the address table 309.

Although the address table 309 is similar to the tunnel table 218, the tunnel table 218 stores the correspondence between the virtual IP address relating to the communication partner of the application on the application processing apparatus to manage it and the apparatus IP address, while the address table 309 stores the correspondence between the virtual IP address relating to all applications in the independent wireless system and the apparatus IP address. The address table 309 stores a virtual IP address 401, a state 402, an apparatus IP address 403, and a subnet mask 404 which are made to correspond to each other.

The virtual IP address 401 represents the virtual IP address used by the application in the independent wireless system. The apparatus IP address 403 represents the IP address of the application processing apparatus to execute the application using the virtual IP address 401 and the redundancy managing apparatus. The state 402 represents the state of the application using the virtual IP address 401, for example, Active, Standby or Failure for each apparatus IP address 403. The subnet mask 404 is used to obtain the subnet address of the apparatus IP address 403.

The address notification destination table 310 of FIG. 3 is a table for storing failure report from the application processing apparatus, and the details will be described later.

The transport communication information 311 is identification information of transport communication performed by the application on the application processing apparatus. For example, when AP1 (109) communicates with AP4 (117), a set of VIP1, transport layer port number of AP1 (109), VIP4, and transport layer port number of AP4 (117) is stored. When AP1 (109) starts to communicate with AP4 (117), this identification information is notified from the application processing apparatus 1 (108) to the redundancy managing apparatus 1 (114). When a failure occurs in AP1 (109) and AP1 (113) takes over the process instead, the information is notified from the redundancy managing apparatus 1 (114) to the application processing apparatus 3 (112). AP1 (113) takes over the communication performed by AP1 (109) based on the notified transport communication information.

Figure 33:
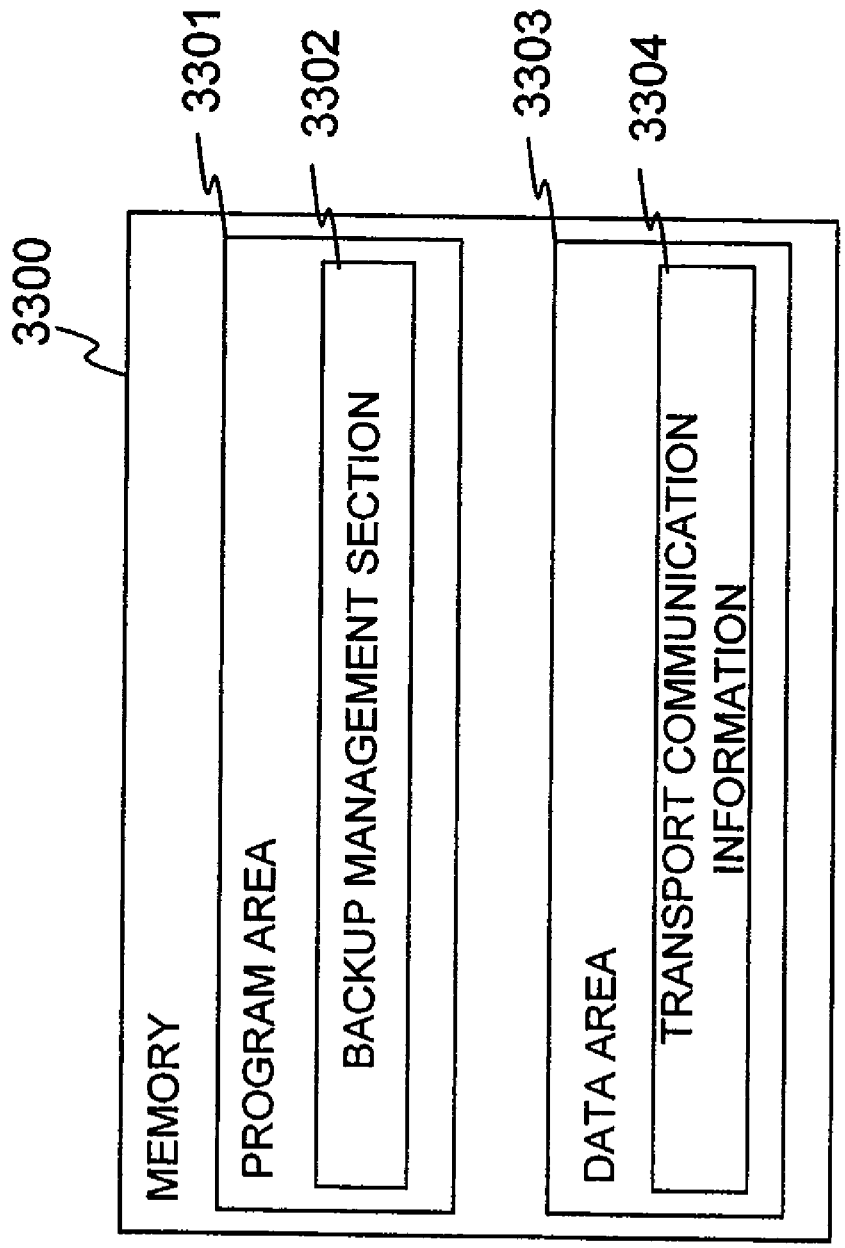
FIG. 33 is a view showing memory contents of the backup apparatus.

Next, the structure of the backup apparatus 1 (121) will be described. The physical structure is similar to the application processing apparatus 200 shown in FIG. 2. FIG. 33 shows the content of a memory 202. A memory 3300 includes a program area 3301 and a data area 3303. A transport communication information 3304 in the data area 3303 is similar to the transport communication information 311. A backup management section 3302 in the program area 3301 performs the process, which is performed by the redundancy managing apparatus 1 (114) for the transport communication information 311, for the transport communication information 3304. That is, the management of the transport communication information can be executed instead of the redundancy managing apparatus.

Figure 5:
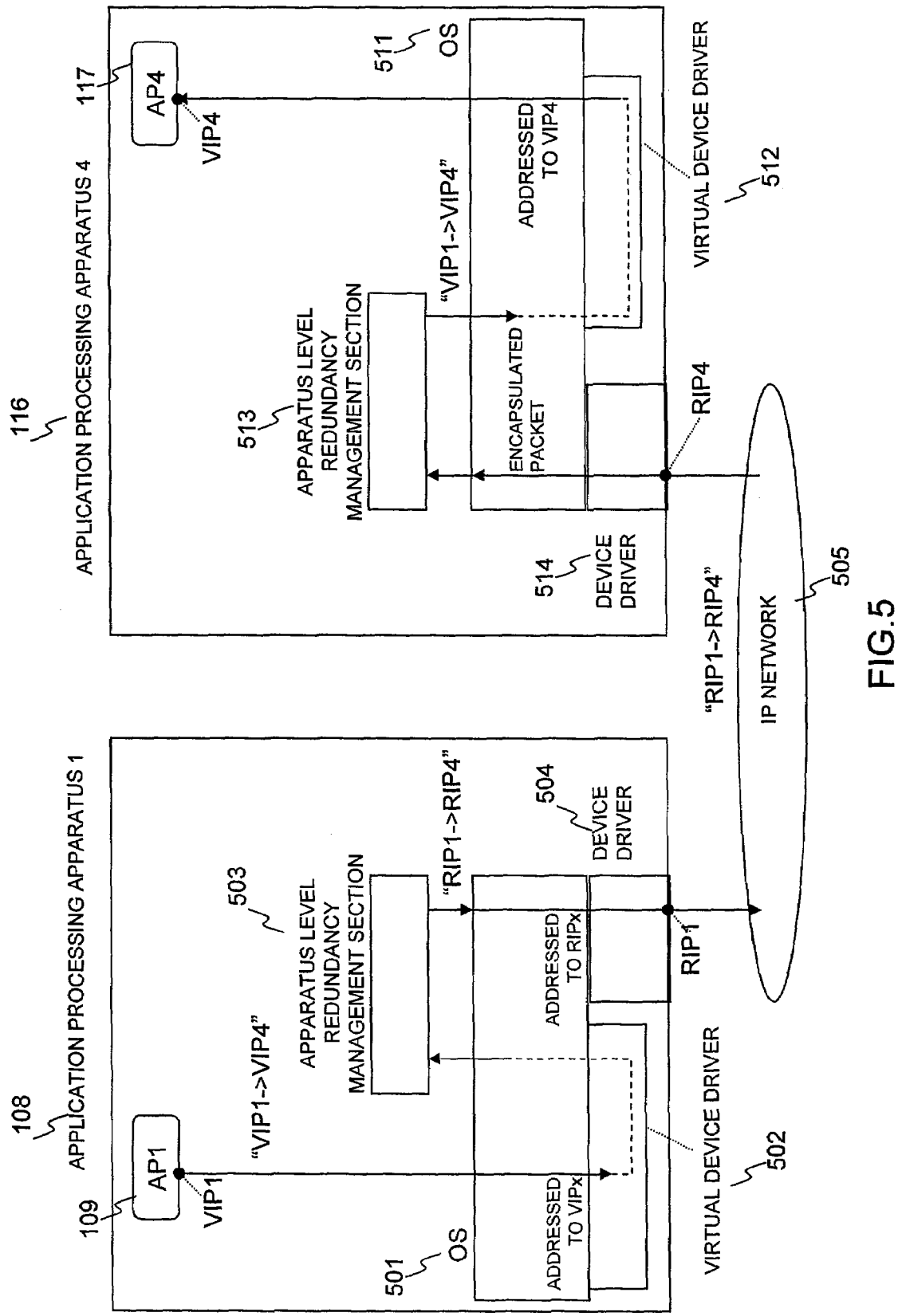
FIG. 5 is a view showing a flow of a packet in a case where the packet is transmitted and received between applications.
Figure 6:
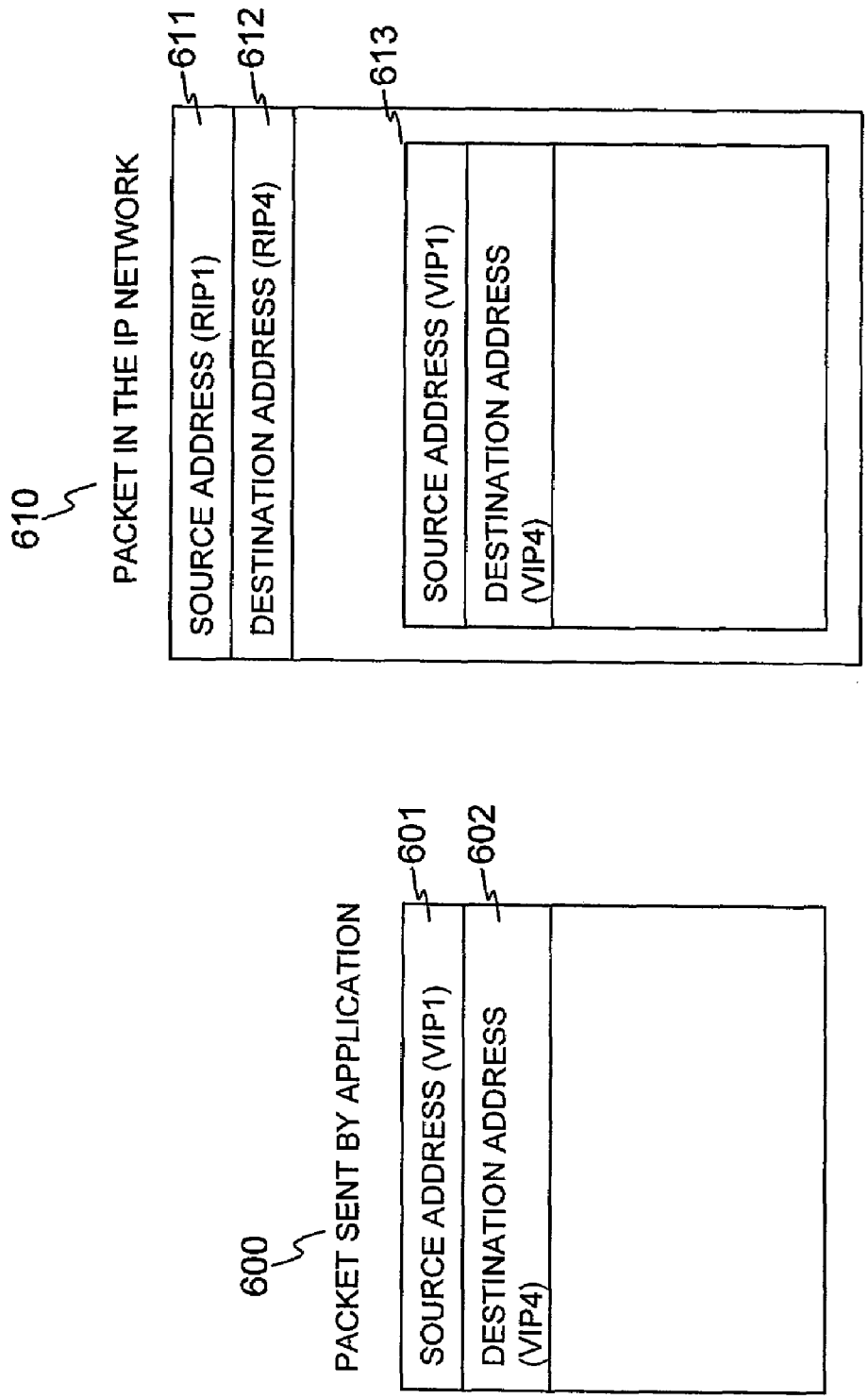
FIG. 6 is a view showing a format of a packet in a case where the packet is transmitted and received between applications.

Next, a packet delivery procedure will be described with reference to FIG. 5, taking, as an example, a case where AP1 (109) of the application processing apparatus 1 (108) transmits a packet to AP4 (117) of the application processing apparatus 4 (116). First, AP1 (109) transmits an application transmission packet 600 of FIG. 6. A source address 601 is the virtual IP address VIP1 of AP1 (109). A destination address 602 is the virtual IP address VIP4 of AP4 (117). This packet is routed to a virtual device driver 502 in an OS 501. The virtual device driver 502 inputs the received packet into an apparatus level redundancy management section 503. The apparatus level redundancy management section 503 refers to the tunnel table 218. FIG. 38A shows the tunnel table 218 included in the application processing apparatus 1 (108). Since the destination address 602 of the received packet 600 is VIP4, the apparatus level redundancy management section 503 searches a record in which the virtual IP address 3801 is VIP4, and obtains the apparatus IP address 3803. Here, since RIP4 is obtained, the application transmission packet 600 is encapsulated by a packet addressed to RIP4, and a packet 610 during IP network transfer is created (see FIG. 6). A source address 611 is the IP address RIP1 of the application processing apparatus 1 (108). When the packet 610 is delivered to the OS 501, the OS 501 routes it to a device driver 504. The device driver 504 sends the packet 610 to an IP network 505. The IP network 505 routes the packet 610 to the application processing apparatus 4 (116).

When receiving the packet 610, a device driver 514 of the application processing apparatus 4 (116) delivers it to an OS 511. Since the packet 610 is the IP encapsulated packet, the OS 511 transfers it to an apparatus level redundancy management section 513. The apparatus level redundancy management section 513 decapsulates the packet 610, and inputs the packet 600 to a virtual device driver 512. The virtual device driver 512 delivers the packet 600 to the OS 511. Since the destination address 602 of the packet 600 is the virtual IP address VIP4 of AP4 (117), the OS 511 transfers it to AP4 (117).

As stated above, in order to perform communication between applications, it is important that the tunnel table 218 correctly stores the correspondence between the virtual IP address 3801 and the apparatus IP address 3803.

(Setting of the Address Table)

Next, a description will be made on how the address table 309 of the redundancy managing apparatus 1 (114), which stores information to be set in the tunnel table 218, is prepared.

Figure 7:
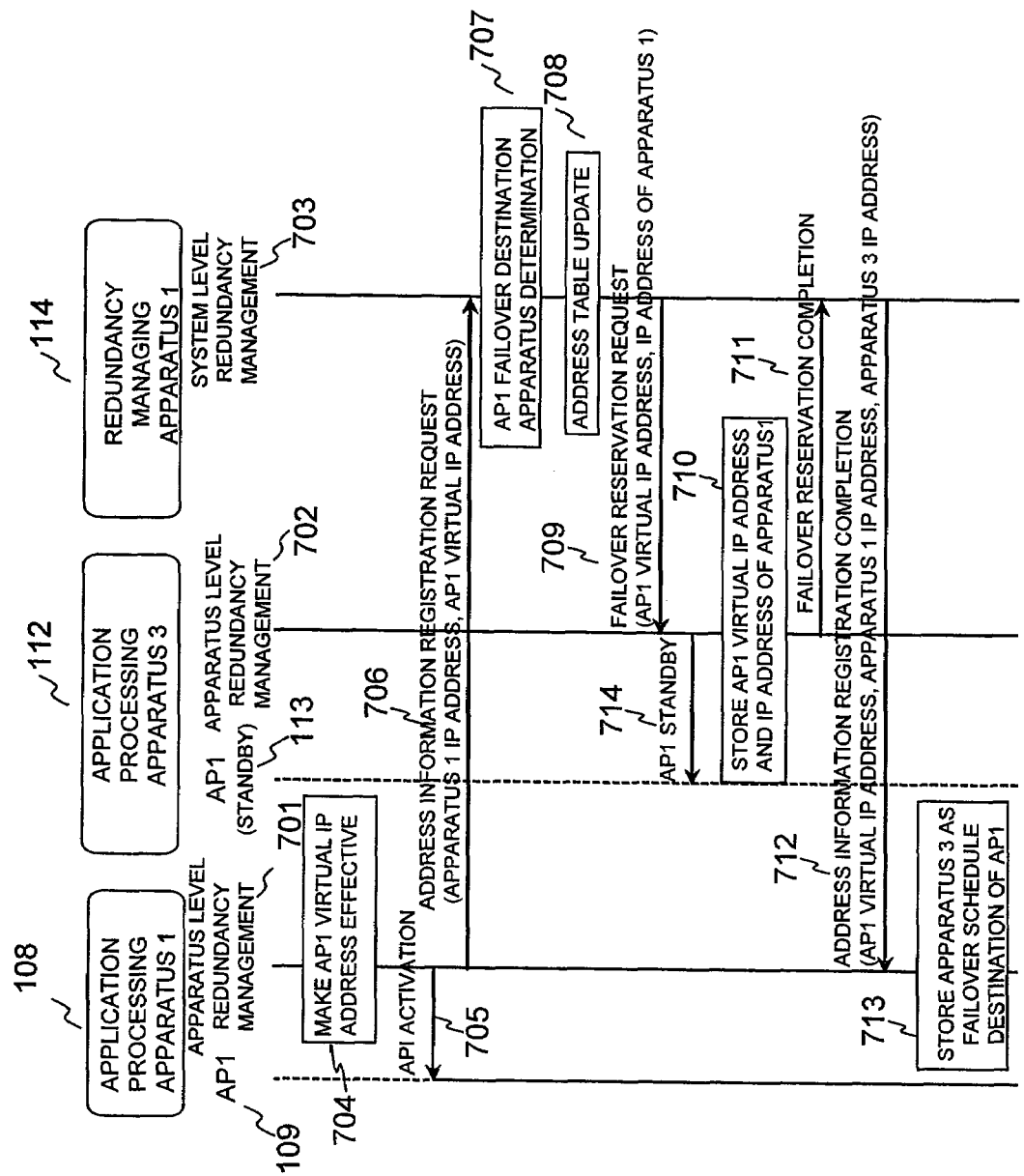
FIG. 7 is a sequence view of initial registration of an application.

FIG. 7 is a sequence view in a case where AP1 (109) is placed in the active state and is started to operate on the application processing apparatus 1 (108).

An apparatus level redundancy management section 701 of the application processing apparatus 1 (108) makes the virtual IP address VIP1 used by AP1 (109) effective (step 704). AP1 (109) is instructed to be activated (step 705). Specifically, when AP1 (109) is not started, it is started, and the process in the active state is started. Then, an address information registration request is transmitted to the redundancy managing apparatus 1 (114) (step 706). A format of the address information registration request message is shown as a format 1000 of FIG. 10. A source address 1001 is the IP address RIP1 of the application processing apparatus 1 (108). A destination address 1002 is the IP address RIP6 of the redundancy managing apparatus. 1 (114). An address information registration request 1003 is a message identifier. VIP1 (1004), RIP1 (1005) and M1 (1006) are respectively the virtual IP address of AP1 (109), the IP address of the application processing apparatus 1 (108), and the subnet mask of the IP address of the application processing apparatus 1 (108). A failover destination reservation desire 1007 represents that when a failure occurs in the application processing apparatus 1 (108), an application processing apparatus to execute AP1 instead thereof is desired to be reserved.

Return is made to FIG. 7. When a system level redundancy management section 703 of the redundancy managing apparatus 1 (114) receives the message shown in the format 1000, it is determined that when a failure occurs in the application processing apparatus 1 (108), the application using the virtual IP address VIP1, that is, AP1 (109) is moved to which application processing apparatus (step 707). Here, it is assumed that the application processing apparatus 3 is determined. Then, the IP address RIP3 of the application processing apparatus 3, together with VIP1 (1004) and RIP1 (1005) shown in the format 1000, is registered in the address table (step 708). The system level redundancy management section 703 transmits a failover reservation request to the application processing apparatus 3 (112) (step 709). The format of the failover reservation request message is similar to the format 1000 of the address information registration request message. The differences are that in the case of the failover reservation request message, the source address 1001 is the IP address RIP6 of the redundancy managing apparatus 1 (114), the destination address 1002 is the IP address RIP3 of the application processing apparatus 3 (112) determined as the failover destination, the address information registration request 1003 is the identifier of the failover reservation request message, and M1 (1006) and the failover destination reservation desire 1007 are not included.

Return is made to FIG. 7. When receiving the failover reservation request 709, an apparatus level redundancy management section 702 of the application processing apparatus 3 (112) instructs AP1 (113) to be on standby (step 714). Specifically, when AP1 (113) is not yet started, it is started, and is placed in the state of standby for failover. Then, the virtual IP address VIP1 of the failover object and the IP address RIP1 of the application processing apparatus 1 (108) are stored (step 710). Then, the apparatus level redundancy management section 702 transmits failover reservation completion to the redundancy managing apparatus 1 (114) (step 711). The format of the failover reservation completion message is similar to the format 1000 of the address information registration request message. The differences are that the source address 1001 is the IP address RIP3 of the application processing apparatus 3 (112), the address information registration request 1003 is the message identifier of the failover reservation completion, RIP1 (1005) is the IP address RIP3 of the application processing apparatus 3 (112), and M1 (1006) is the subnet mask M3 of RIP3.

Figure 10:
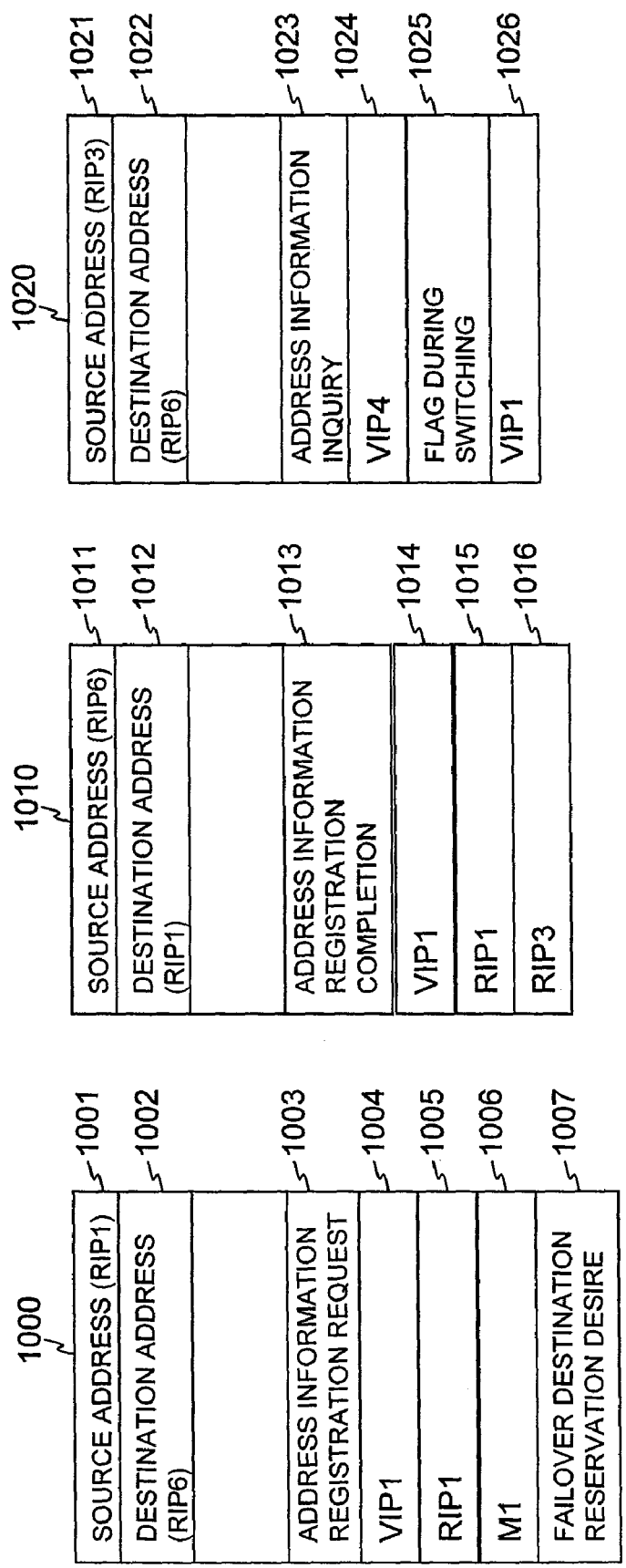
FIG. 10 is a view showing message formats of an address information registration request, registration completion, and inquiry.

Return is made to FIG. 7. At step 712, the system level redundancy management section 703 transmits the address information registration completion to the application processing apparatus 1 (108). A format 1010 of FIG. 10 is the format of the address information registration completion message. A source address 1011 is the IP address RIP6 of the redundancy managing apparatus 1 (114). A destination address 1012 is the IP address RIP1 of the application processing apparatus 1 (108). An address information registration completion 1013 is a message identifier. VIP1 (1014), RIP1 (1015) and RIP3 (1016) are respectively the virtual IP address VIP1 registered in the address table 309 of the redundancy managing apparatus 1 (114), the IP address RIP1 of the application processing apparatus 1 (108), and the IP address RIP3 of the application processing apparatus 3 (112).

Return is made to FIG. 7. When receiving the address information registration completion, the apparatus level redundancy management section 701 of the application processing apparatus 1 (108) stores the IP address RIP3 of the application processing apparatus 3 (112) as the application using VIP1, that is, the failover destination application processing apparatus of AP1 (109) (step 713).

Figure 8:
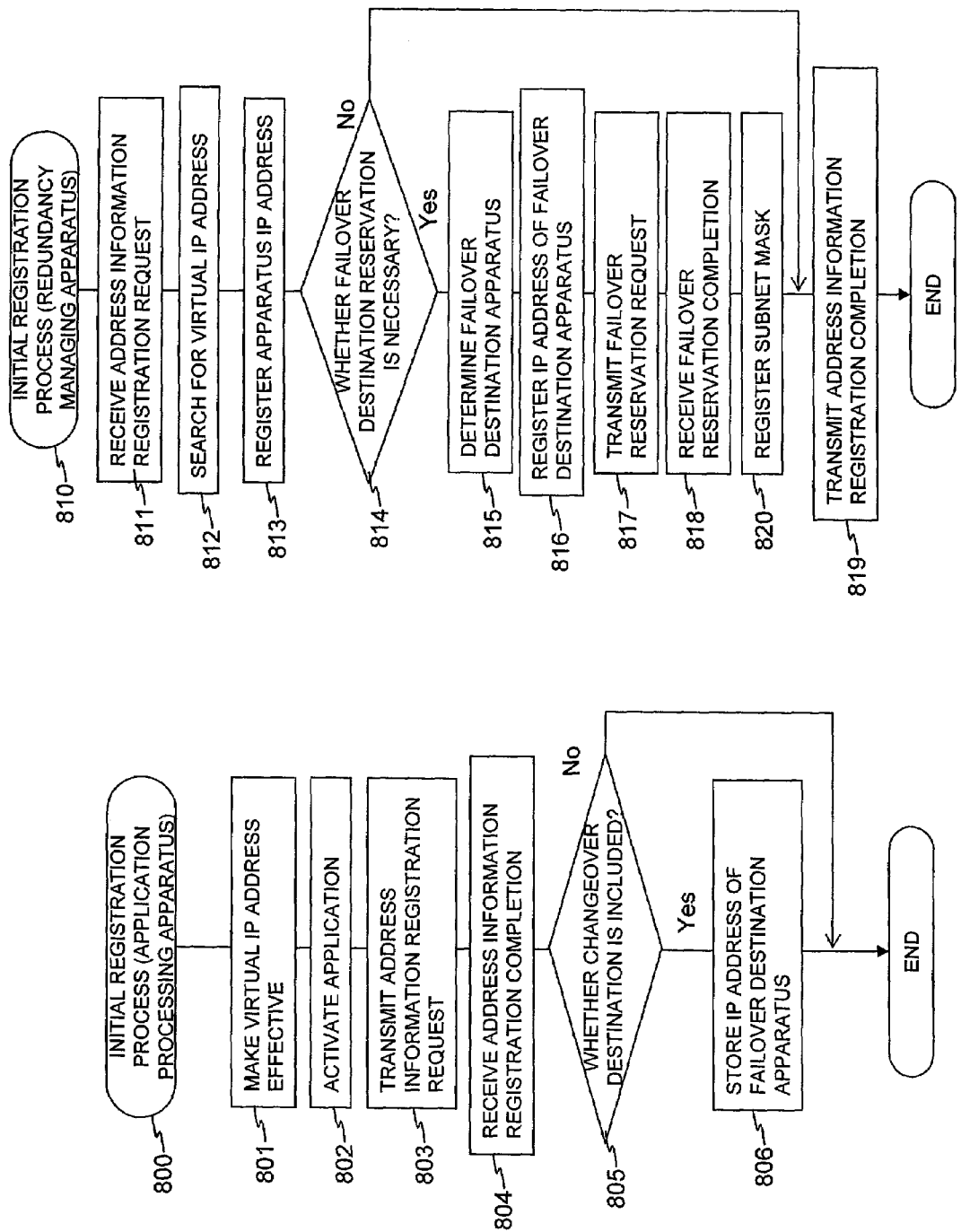
FIG. 8 is a flowchart of the initial registration of the application.

The flowchart of the apparatus level redundancy management section 701 of the sequence view of FIG. 7 is an initial registration process 800 of FIG. 8. Besides, the flowchart of the system level redundancy management section 703 is an initial registration process 810 of FIG. 8.

The initial registration process 800 will be described. First, the virtual IP address VIP1 used by AP1 (109) is made effective (step 801). Specifically, setting is performed so that the OS 501 recognizes VIP1 as its own IP address. At step 802, AP1 (109) is activated. Specifically, when AP1 (109) is not yet started, it is started, and the process in the active state is started. At step 803, the address information registration request is transmitted to the redundancy managing apparatus 1 (114). The virtual IP address VIP1 of AP1 (109), the IP address RIP1 of the application processing apparatus 1 (108), and the subnet mask M1 of RIP1 are set in the address information registration request. Besides, when a failure occurs in the application processing apparatus 1 (108), and when an application processing apparatus to execute AP1 instead is desired to be reserved, the failover destination reservation desire 1007 is set (see the format 1000). At step 804, the address information registration completion is received from the redundancy managing apparatus 1 (114). The virtual IP address VIP1 of AP1 (109), the IP address RIP1 of the application processing apparatus 1 (108), and the IP address RIP3 of the application processing apparatus 3 (112) as the failover destination are set in the address information registration completion (see the format 1010). At step 805, it is determined whether an IP address of an application processing apparatus other than RIP1, that is, RIP3 is set in the address information registration completion. In the example of FIG. 7, since RIP3 is included, shift is made to step 806, and RIP3 is stored as the IP address of the failover destination application processing apparatus. On the other hand, at step 805, when an IP address of an application processing apparatus other than RIP1 is not set in the address information registration completion, the process is ended.

Next, the initial registration process 810 of the system level redundancy management section 703 will be described. A description will be given using, as an example, a case where a portion surrounded by a thick frame in the address table 309 of FIG. 4 is set by this process.

At step 811, the address information registration request from the application processing apparatus 1 (108) is received. At step 812, a search is made for a record in which the virtual IP address 401 of the address table 309 is coincident with the virtual IP address VIP1 (1004). At step 813, "Active" is set in the state 402 of the found record, RIP1 is set in the apparatus IP address 403, and M1 is set in the subnet mask 404. At step 814, it is determined whether the failover destination reservation desire 1007 is included in the received address information registration request. When it is included, shift is made to step 815 in order to reserve the failover destination. At step 815, a failover destination apparatus is determined. As a determining method, for example, a list of IP addresses of all application processing apparatuses in the independent wireless system is prepared in advance, reference is made to the list, and an application processing apparatus not registered in the apparatus IP address 403 of the address table is made the failover destination apparatus. In FIG. 7, the application processing apparatus 3 (112) is made the failover destination. At step 816, the IP address of the failover destination apparatus, that is, RIP3 is set in the second apparatus IP address 403 relating to VIP1 of the address table 309. Besides, "Standby" is set in the state 402 corresponding thereto. At step 817, the failover reservation request is transmitted to the application processing apparatus 3 (112). VIP1 and RIP1 are set in the failover reservation request. At step 818, failover reservation completion is received. VIP1, RIP3 and the subnet mask M3 of RIP3 are set in the failover reservation completion. At step 820, the subnet mask M3 is set in the subnet mask 404 of the record in which the virtual IP address 401 of the address table is VIP1, and the apparatus IP address 403 is RIP3. Finally, address information registration completion is transmitted to the application processing apparatus 1 (108) (step 819). VIP1, RIP1 and RIP3 are set in the address information registration completion. On the other hand, at step 814, when the failover destination reservation desire 1007 is not included in the address information registration request, shift is made to step 819, and the address information registration completion is transmitted. The address information registration completion does not include RIP3 (1016) as the IP address of the failover destination application processing apparatus.

Figure 9:
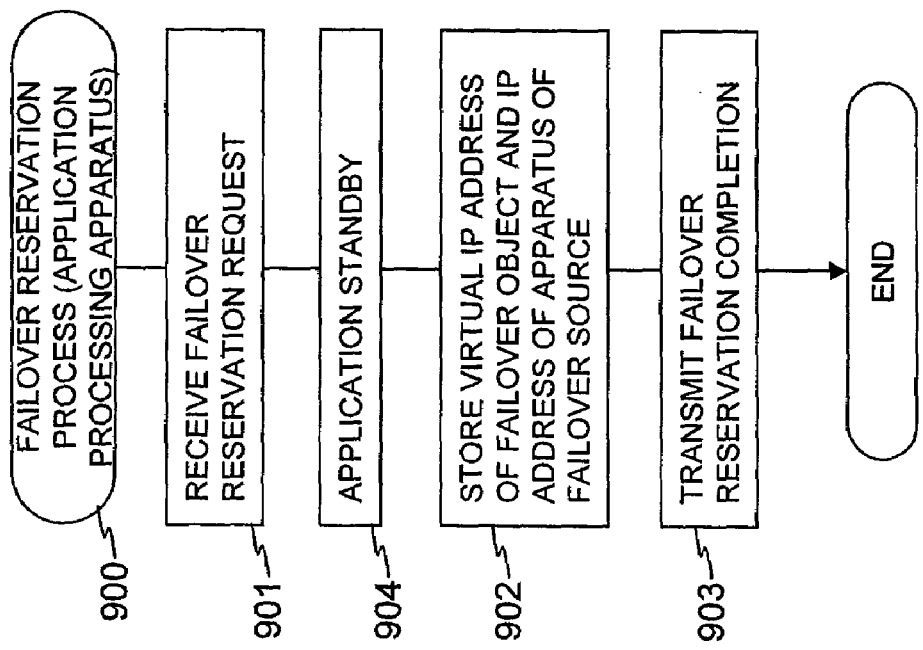
FIG. 9 is a flowchart of a failover reservation process of an application processing apparatus.

Next, the process of the apparatus level redundancy management section 702 of the application processing apparatus 3 (112) in the sequence view shown in FIG. 7 will be described by use of FIG. 9. In a failover reservation process 900, first, at step 901, a failover reservation request is received. VIP1 and RIP1 are set in the failover reservation request. At step 904, an application using VIP1, that is, AP1 (113) is placed in the standby state. Specifically, when AP1 (113) is not yet started, it is started and is placed in the state of standby for failover. Incidentally, a correspondence between an application and a virtual IP address used by the application is stored in, for example, the hard disk 203 in advance. At step 902, the virtual IP address VIP1 of the failover object and the IP address RIP1 of the application processing apparatus 1 (108) of the failover source are stored. At step 903, the failover reservation completion is transmitted to the redundancy managing apparatus 1 (114). VIP1, RIP3, and subnet mask M3 of RIP3 are set in the failover reservation completion.

The above is the description of the process for registering the virtual IP address of the application and the IP address of the application processing apparatus corresponding thereto into the address table 309 of the redundancy managing apparatus 1 (114).

(Setting of the Tunnel Table)

Next, a description will be made on how the tunnel table 218 of the application processing apparatus is configured. The description will be made on two cases sequentially, that is, a case where an application transmits a DNS query before communication, and a case where the application does not transmit it. First, the former will be described.

Figure 11:
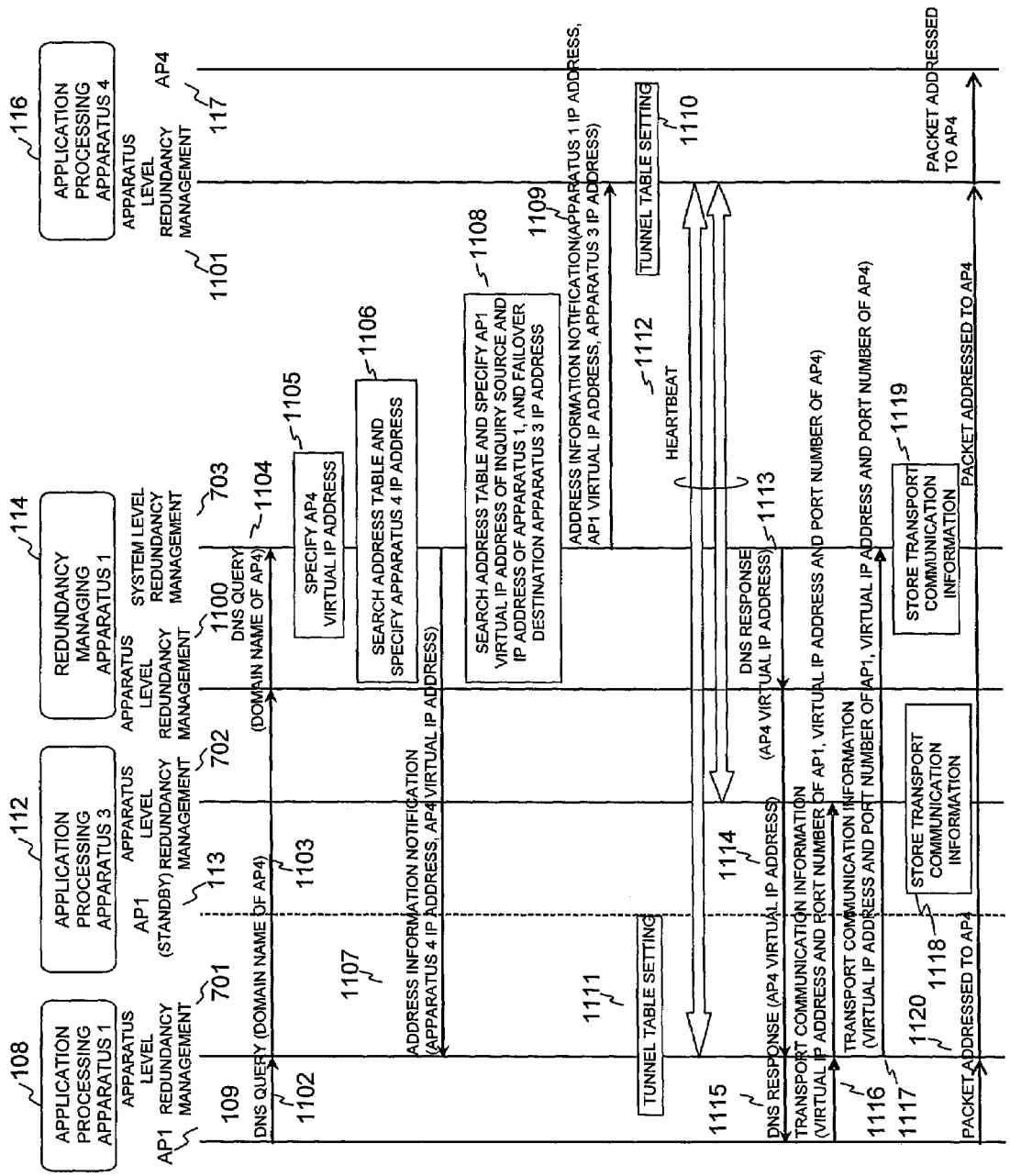
FIG. 11 is a sequence view in a case where a DNS query is transmitted and application communication is started.

FIG. 11 is a sequence view of a case where AP1 (109) of the application processing apparatus 1 (108) starts to communicate with AP4 (117) of the application processing apparatus 4 (116). When this sequence is executed, the tunnel table 218 shown in FIG. 38A can be set in the application processing apparatus 1 (108), and the tunnel table 218 shown in FIG. 11B can be set in the application processing apparatus 4 (116). Incidentally, portions surrounded by thick frames in FIGS. 38A and 38B are portions added by the sequence of FIG. 11, and a record of VIP6 (correspondence between the virtual IP address VIP6 of the DNS server 115 and the IP address RIP6 of the redundancy managing apparatus 1 (114)) can be set in the respective tunnel tables 218 in advance (by, for example, a command by a maintenance person).

First, AP1 (109) sets a domain name of AP4 (117) in a DNS query and transmits it (step 1102). The destination IP address of a packet of the DNS query is the virtual IP address VIP6 of the DNS server (115) of the redundancy managing apparatus 1 (114). The apparatus level redundancy management section 701 searches for a record in which the virtual IP address 3801 of the tunnel table 218 (FIG. 38A) is VIP6, and obtains the corresponding apparatus IP address 3803. Since RIP 6 is obtained, the DNS query is encapsulated by a packet addressed to RIP6, and is transmitted (step 1103). When receiving the encapsulated packet, the apparatus level redundancy management section 1100 of the redundancy managing apparatus 1 (114) decapsulates it, and transmits the DNS query to the system level redundancy management section 703 (step 1104). At step 1105, an IP address corresponding to the domain name set in the DNS query is checked. This is the same process as a general DNS server. In FIG. 11, the virtual IP address VIP4 of AP4 (117) is obtained. At step 1106, a search is made in the address table 309 (FIG. 4), and the apparatus IP address 403 of the record in which the virtual IP address 401 is VIP4 is checked. With respect to VIP4, only RIP4 is registered. The address information notification is transmitted to the application processing apparatus 1 (108) (step 1107). The message format of the address information notification is similar to the address information registration completion. The differences are that the address information registration completion 1013 becomes the message identifier of the address information notification, VIP1 (1014) becomes the virtual IP address VIP4 of AP4 (117), RIP1 (1015) becomes the IP address RIP4 of the application processing apparatus 4 (116), and RIP3 (1016) is not included. When receiving the address information notification, the apparatus level redundancy management section 701 of the application processing apparatus 1 (108) sets VIP4 and RIP4 in the tunnel table 218 (FIG. 38A). Then, a heartbeat packet is started to be transmitted to the IP address RIP4 of the application processing apparatus 4 (116) (step 1112).

On the other hand, at step 1108, the system level redundancy management section 703 of the redundancy managing apparatus 1 (114) searches the address table 309 (FIG. 4) to specify the IP address RIP1 of the application processing apparatus 1 (108) of AP1 (109) of the DNS query transmission source and the IP address RIP3 of the application processing apparatus 3 (112) reserved as the failover destination of AP1 (109). The address information notification is transmitted to the application processing apparatus 4 (116) (step 1109). The differences between the address information notification and the message format 1010 are that the destination address 1012 becomes the IP address RIP4 of the application processing apparatus 4, and the address information registration completion 1013 becomes the message identifier of the address information notification. When receiving the address information notification, the apparatus level redundancy management section 1101 of the application processing apparatus 4 (116) sets VIP1, RIP1 and RIP3 in the tunnel table 218 (FIG. 38B) (step 1110). By this, even when AP4 (117) receives the packet addressed to AP4 from AP1 (109) (step 1120), and sends back a response packet, the apparatus level redundancy management section 1101 can immediately create an encapsulated packet without inquiring of the redundancy managing apparatus 1 (114) about the IP address of the application processing apparatus 1 (108) at that time point. When setting of the tunnel table 218 (FIG. 38B) is completed, the apparatus level redundancy management section 1101 starts to transmit the heartbeat packet to the IP address RIP1 of the application processing apparatus 1 (109) and the IP address RIP3 of the application processing apparatus 3 (112) (step 1112).

Figure 16:
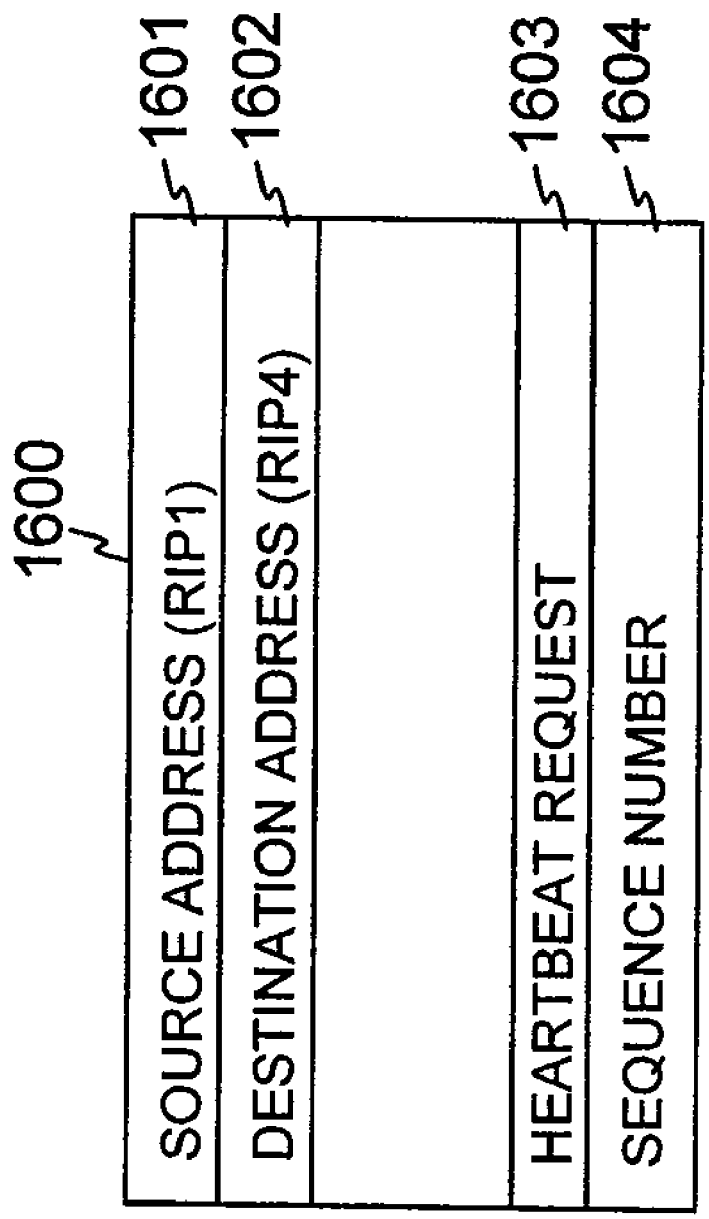
FIG. 16 is a view showing a format of a heartbeat request message.

FIG. 16 shows a format of a heartbeat request packet. The heartbeat request packet is a packet transmitted to an IP address registered in the tunnel table 218. In FIG. 16, it is assumed that the application processing apparatus 1 (108) transmits. A source address 1601 is the IP address RIP1 of the application processing apparatus 1 (108). A destination address 1602 is the IP address RIP4 of the application processing apparatus 4 (116). A heartbeat request 1603 is an identifier of a packet. A sequence number 1604 is a number for taking correlation when the application processing apparatus 1 (108) receives a heartbeat response packet to the heartbeat request packet, and a value incremented each time the heartbeat request packet is transmitted is set.

When receiving the heartbeat request packet, the application processing apparatus 4 (116) transmits the heartbeat response packet. The format of the heartbeat response packet is similar to the heartbeat request packet. When a description is made while using the format 1600, the destination address 1602 of the heartbeat request packet and the source address 1601 are respectively set in the source address 1601 and the destination address 1602. Besides, the identifier 1603 of the packet is the heartbeat response. The same value as the heartbeat request packet is set in the sequence number 1604. The heartbeat request and the heartbeat response are transmitted and received, so that the confirmation of existence of the apparatus and the detection of failure occurrence can be performed.

Return is made to FIG. 11. The system level redundancy management section 703 of the redundancy managing apparatus 1 (114) transmits the DNS response at step 1113. The virtual IP address VIP4 of AP4 (117) is set in the DNS response. The apparatus level redundancy management section 1100 encapsulates the DNS response by the packet addressed to the IP address RIP1 of the application processing apparatus 1 (108) and transmits it (step 1114). The apparatus level redundancy management section 701 of the application processing apparatus 1 (108) decapsulates the received packet, and transmits the inside DNS response to AP1 (109) (step 1115). When starting the transport communication with AP4 (117), AP1 (109) outputs the transport communication information to the apparatus level redundancy management section 701 (step 1116). The transport communication information includes the virtual IP address VIP1 of AP1 (109), the port number of AP1 (109), the virtual IP address VIP4 of AP4 (117), and the port number of AP4 (117). The apparatus level redundancy management section 701 transmits the transport communication information to the application processing apparatus 3 (112) as the failover schedule destination of AP1 (109) stored in step 713 in FIG. 7.

Figure 15:
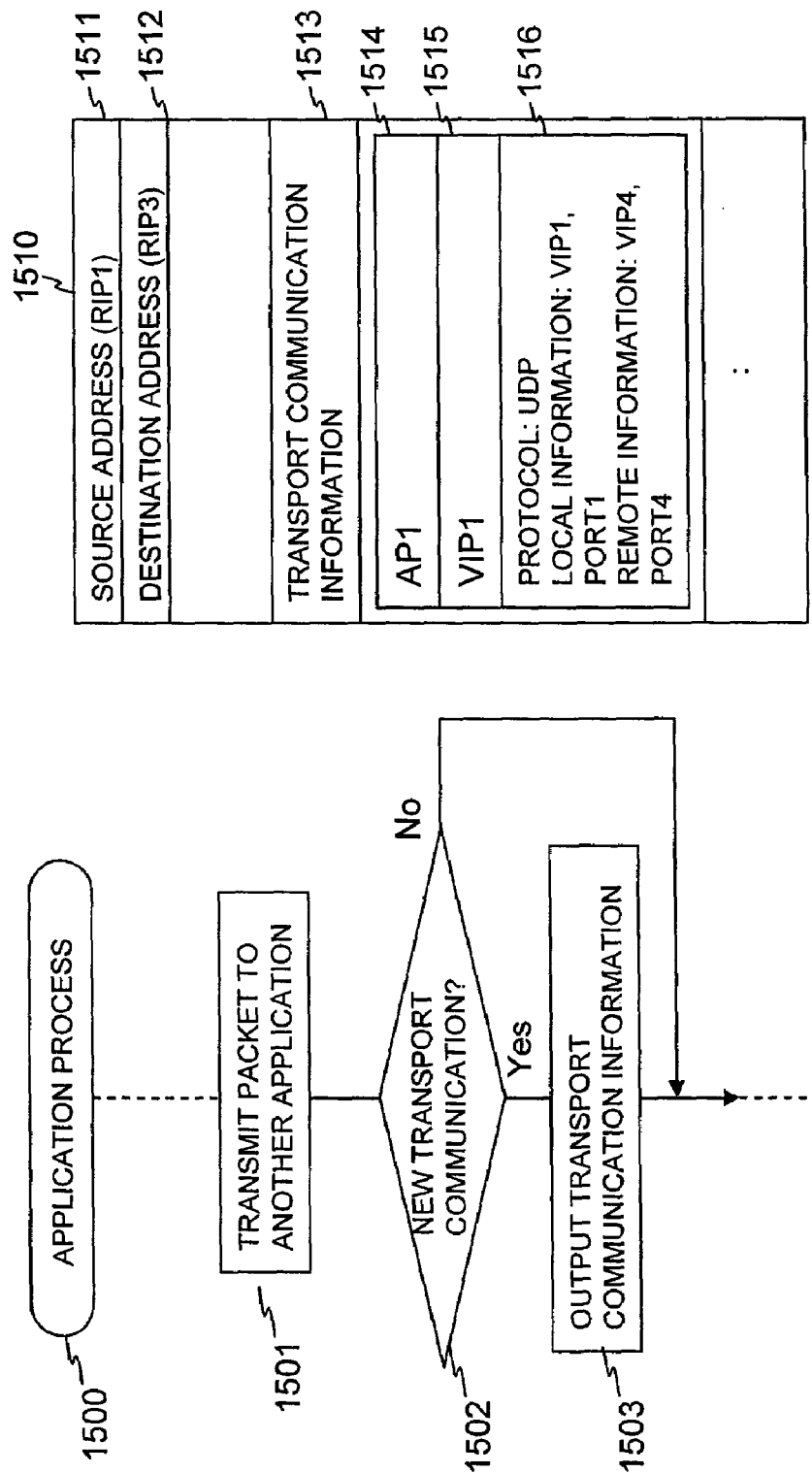
FIG. 15 is a view showing a flowchart of a process in which an application outputs transport communication information and a format of a transport communication information message.

A message format 1510 of FIG. 15 is the format of the transport communication information. A source address 1511 is the IP address RIP1 of the application processing apparatus 1 (108). A destination address 1512 is the IP address RIP3 of the application processing apparatus 3 (112). A transport communication information 1513 is a message identifier. AP1 (1514), VIP1 (1515), and an area 1516 denote an indicate identifier of AP1 (109), a virtual IP address of AP1 (109), and protocol information of communication to be started. The threes form a set, and when AP1 (113) becomes active in the application processing apparatus 3 (112), they are used for restoring the communication with AP4 (117).

The apparatus level redundancy management section 701 transmits the transport communication information also to the system level redundancy management section 703 of the redundancy managing apparatus 1 (114) (step 1117). The destination address 1512 at this time is the IP address RIP6 of the redundancy managing apparatus 1 (114). The apparatus level redundancy management section 702 and the system level redundancy management section 703 respectively store the received transport communication information (step 1118, step 1119). Finally, AP1 (109) starts to transmit the user packet addressed to the virtual IP address VIP4 of AP4 (117) (step 1120). Incidentally, the transport communication information may be transmitted to the backup apparatus 121 and may be stored.

Next, the respective processes of FIG. 11 will be described by use of flowcharts.

Figure 12:
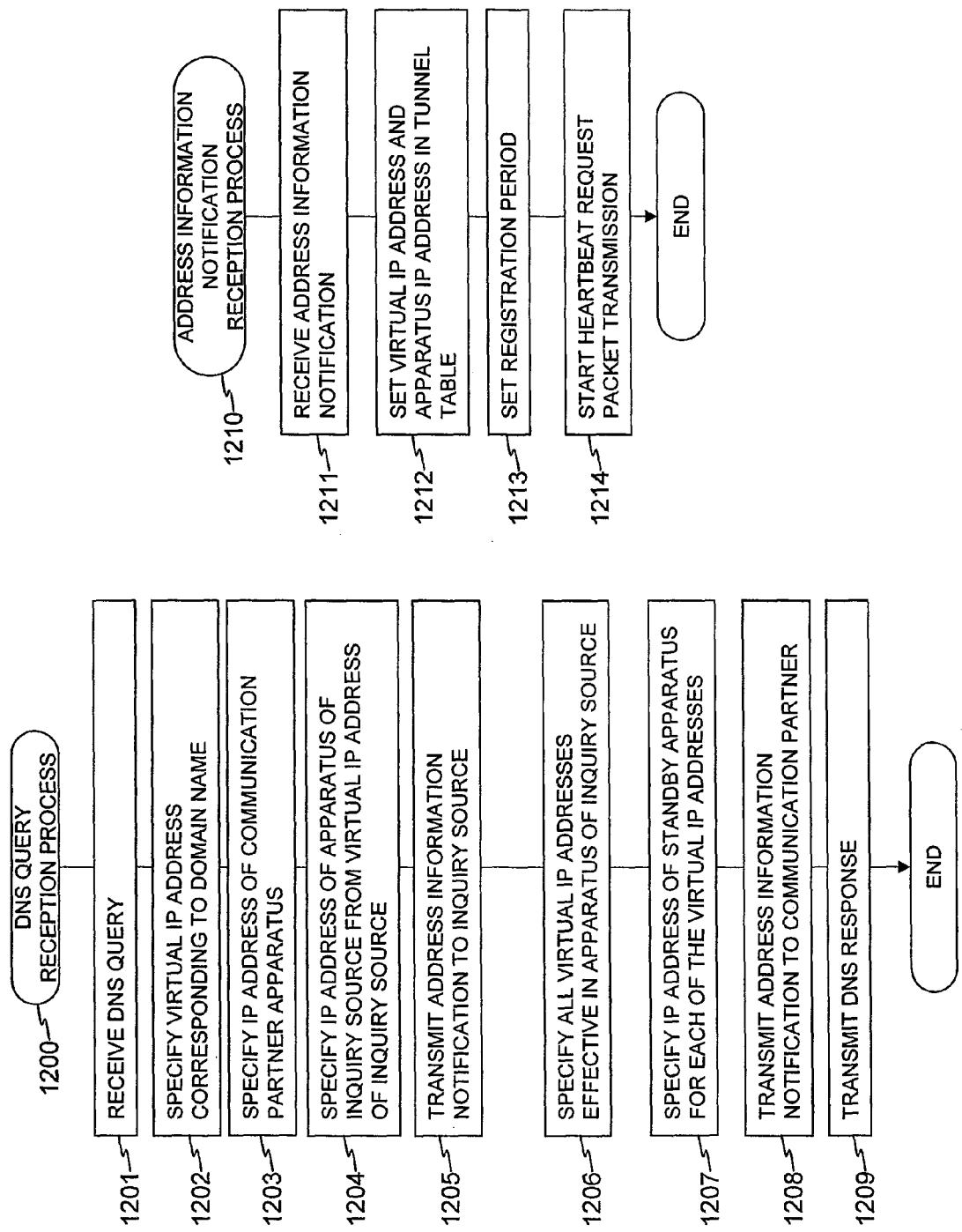
FIG. 12 is a flowchart of a DNS query reception process and an address information notification reception process.

A DNS query reception process 1200 of FIG. 12 is a flowchart of the system level redundancy management section 703 of the redundancy managing apparatus 1 (114).

First, at step 1201, a DNS query is received. At step 1202, a virtual IP address corresponding to a domain name set in the DNS query is obtained. In the example of FIG. 11, the virtual IP address VIP4 of AP4 (117) is obtained. This process is the same as a process of a general DNS server. Next, at step 1203, a search is made for a record in which the virtual IP address 401 of the address table 309 (FIG. 4) is VIP4, and the IP address RIP4 of the application processing apparatus 4 (116) is specified by referring to the apparatus IP address 403. At step 1204, a search is made for a record in which the virtual IP address 401 of the address table 309 is coincident with the transmission source IP address (virtual IP address VIP1 of AP1 (109) in the example of FIG. 11) of the DNS query. The IP address RIP1 of the application processing apparatus 1 (108) is specified by referring to the apparatus IP address 403. At step 1205, the address information notification is transmitted to RIP1. The set of VIP4 and RIP4 obtained at step 1203 is set in the address information notification. Next, at step 1206, the address table is searched in order to obtain all virtual IP addresses on the application processing apparatus 1 (108) of the DNS query transmission source. Specifically, the virtual IP address 401 is obtained in all records in which the apparatus IP address 403 of the address table 309 is RIP1, and the state 402 is "Active". In this example, only VIP1 is pertinent. Here, the case where a plurality of addresses are pertinent is the case where a plurality of applications respectively use different virtual IP addresses on the application processing apparatus 1 (108). At step 1207, for each of the obtained virtual IP addresses, the apparatus IP address 403 corresponding to the state 402 of "Standby" is obtained. In this example, RIP3 is obtained for VIP1. At step 1208, the address information notification is transmitted to the application processing apparatus 4 (116). The virtual IP address (that is, VIP1) relating to all applications on the application processing apparatus 1 (108), the active apparatus IP address (that is, RIP1), and the standby apparatus IP address (that is, RIP3) are set in the address information notification. Here, the reason why all virtual IP addresses on the application processing apparatus 1 (108) are made objects is that when an application other than AP1 (109) exists on the application processing apparatus 1 (108), information relating to the application is also made to be set in the tunnel table 218 of the application processing apparatus 4 (116). At the time point when such an application X starts to communicate with AP4 (117), when AP1 (109) already communicates with AP4 (117), and the OS of the application processing apparatus 1 (108) holds DNS cash of VIP4, a new DNS query may not be transmitted, and consequently, a record corresponding to the virtual IP address of the application X may not be generated in the application processing apparatus 4 (116).

A virtual IP address, an active apparatus IP address, and a standby apparatus IP address are set in the address information notification and, for example, in this order. Incidentally, when information relating to a plurality of virtual IP addresses is set, a plurality of sets each including the virtual IP address, the active apparatus IP address, and the standby apparatus IP address are set. At step 1209, the virtual IP address VIP4 of AP4 (117) obtained at step 1202 is set in the DNS response and is transmitted. The source address of the DNS response and the destination address are the destination address of the DNS query and the source address, respectively.

Next, a description will be given of a case where the apparatus level redundancy management section 701 of the application processing apparatus 1 (108) and the apparatus level redundancy management section 1101 of the application processing apparatus 4 (116) receive the address information notification.

FIG. 12 shows an address information notification reception process 1210. Hereinafter, the description will be given using, as an example, a case where the apparatus level redundancy management section 1101 of the application processing apparatus 4 (116) receives the address information notification at step 1109 of FIG. 11, and generates a thick frame portion of the tunnel table 218 shown in FIG. 38B.

First, at step 1211, the address information notification is received. VIP1, RIP1 and RIP3 are set in the address information notification. At step 1212, VIP1 is set in the virtual IP address 3801 of the tunnel table 218, and RIP1 and RIP3 are set in the apparatus IP address 3803. "Active" is set in the state 3802 corresponding to RIP1, and "Standby" is set in the state 3802 corresponding to RIP3. At step 1213, the registration period 3804 is set. For example, as the initial value, 3600 seconds are set in the registration period 3804 corresponding to RIP1, and "dependency" is set in the registration period 3804 corresponding to RIP3. When "dependency" is set, it is meant that when RIP1 is deleted, RIP3 is also deleted. At step 1214, the transmission of a heartbeat request packet is started.

As stated above, the apparatus level redundancy management section 1101 of the application processing apparatus 4 (116) configures the tunnel table 218 shown in FIG. 38B. Similarly, the apparatus level redundancy management section 701 of the application processing apparatus 1 (108) configures the tunnel table 218 shown in FIG. 38A.

Next, the update of the registration period 3804 and the process in the case where the period expires will be described by use of the flowchart of FIG. 13. These processes are performed by the apparatus level redundancy management sections 213 of all application processing apparatuses.

A registration period check process 1300 is a process of deleting a record whose registration period expires from the tunnel table 218. This process is performed periodically (for example, every second) on all records stored in the tunnel table 218. With respect to a record, at step 1301, it is checked whether the registration period 3804 is "infinite" or "dependency". When the registration period is "infinite" or "dependency", the record is not deleted and the process is ended, or shift is made to a next record. When the registration period is neither "infinite" nor "dependency", at step 1302, 1 is subtracted from the value of the registration period 3804. At step 1303, it is determined whether the subtraction result becomes negative, and when it becomes negative, the DNS cash is deleted at step 1304. By this, when the application executes the process of checking the virtual IP address for the domain name, the DNS query is always transmitted, and consequently, the tunnel table 218 can be set again. At step 1305, the object record of the tunnel table 218 is deleted. Here, when there is a record dependent on the record to be deleted (record which relates to the same virtual IP address 3801 and in which the registration period 3804 is "dependency"), those are collectively deleted. At step 1306, the transmission of the heartbeat request packet is ended. Incidentally, at step 1303, when the subtraction result is not negative, the process is ended, or shift is made to a next record.

A packet reception process 1310 from an application is a process in which the apparatus level redundancy management section 213 of the application processing apparatus creates an encapsulated packet and transmits it. In this, the registration period 3804 of the record to which reference is made to encapsulate the packet is extended. Hereinafter, a description will be given using, as an example, a case where the tunnel table 218 of the application processing apparatus 1 (108) is the content shown in FIG. 38A and a packet 600 is received from AP1 (109).

First, at step 1311, the packet 600 from AP1 (109) is received. At step 1312, it is checked whether a destination address 602 of the received packet is registered in the virtual IP address 3801 of the tunnel table 218. Since it is registered, at step 1314, an encapsulated packet 610 is created which is addressed to an apparatus IP address 3803 (that is, RIP4) corresponding to the state 3802 of "Active". Further, when there is an apparatus IP address 3803 corresponding to the state 3802 of "Bicast", an encapsulated packet addressed to the apparatus IP address 3803 is separately formed. That is, the two encapsulated packets 610 whose destination addresses 612 are different from each other are formed from the one received packet 600. The state 3802 becomes "Bicast" when for example, redundant failover of an application is being executed. The details will be described later. At step 1315, the created packet 610 is transmitted. Finally, at step 1316, the value of the registration period 3804 is updated to, for example, 3600 seconds of the initial value.

On the other hand, at step 1312, when the destination address 602 of the received packet 600 from the application is not registered in the tunnel table 218, at step 1317, an inquiry is made to the redundancy managing apparatus 1 (114). A message format 1020 of FIG. 10 is a format of address information inquiry. A source address 1021 is an IP address of an application processing apparatus of an inquiry source. Although the drawing shows RIP3, the address here is RIP1. A destination address 1022 is the IP address RIP6 of the redundancy managing apparatus 1 (114). An address information inquiry 1023 is a message identifier. VIP4 (1024) is the destination address 602 of the received packet 600. A flag 1025 during switching and VIP1 (1026) are set when the address information inquiry occurs during the failover process of the application. Accordingly, they are not included in the address information inquiry transmitted at step 1317. Incidentally, VIP1 (1026) is a virtual IP address effective in the application processing apparatus of the inquiry source, and when there are a plurality of addresses, all are listed.

The inquired virtual IP address and the IP address of the corresponding application processing apparatus are set in the address information notification transmitted as the response to the address information inquiry by the redundancy managing apparatus 1 (114). At step 1313, they are set in the tunnel table.

Next, a process of step 1116 of FIG. 11, that is, a process in which AP1 (109) outputs transport communication information will be described by use of FIG. 15. AP1 (109) executes various processes, and when a packet is transmitted to another application, for example, AP4 (117) (step 1501), it is determined whether the communication is new transport communication (step 1502). In the case of the new transport communication, at step 1503, transport communication information is outputted to the apparatus level redundancy management section 701. For example, as shown in FIG. 15, the output content is AP1 (1514), VIP1 (1515) and area 1516 of the format 1510 of the transport communication information message transmitted to the other apparatus by the apparatus level redundancy management section 701. In the determination of step 1502 of the application process 1500, when the packet transmission is not the new transport communication, step 1503 is not executed. The transport communication information outputted in this way is transmitted as the message indicated in the format 1510 to the application processing apparatus 3 (112) and the redundancy managing apparatus 1 (114).

The heartbeat process of step 1112 of FIG. 11, together with the failure detection process of the application processing apparatus, will be described later. The above is the configuration method of the tunnel table 218 in the case where the application transmits the DNS query before communication.

Next, a configuration method of the tunnel table 218 in the case where the application starts communication without transmitting a DNS query will be described.

Figure 36:
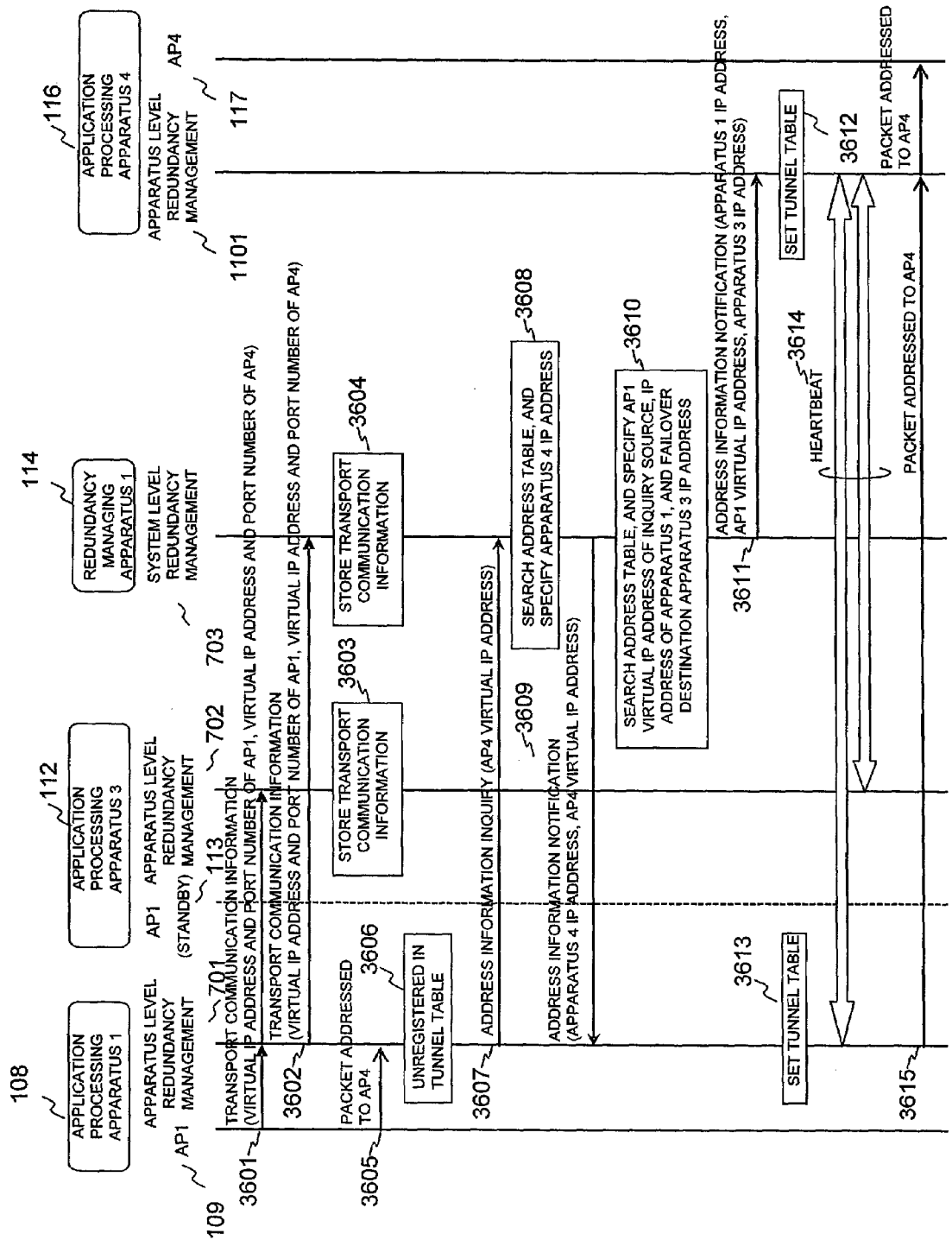
FIG. 36 is a sequence view in a case where application communication is started without transmitting a DNS query.

FIG. 36 is a sequence view in the case where AP1 (109) of the application processing apparatus 1 (108) starts communication with AP4 (117) of the application processing apparatus 4 (116) without transmitting a DNS query. As described in the application process 1500 of FIG. 15, AP1 (109)

executes various processes, and when a packet is transmitted to AP4 (117), it is determined whether the communication is new transport communication, and in the case of the new transport communication, AP1 (109) outputs transport communication information to the apparatus level redundancy management section 701 (step 3601). The apparatus level redundancy management section 701 transmits the transport communication information to the application processing apparatus 3 (112) as the failover destination at the time of failure of AP1 (109). The apparatus level redundancy management section 702 of the application processing apparatus 3 (112) stores the transport communication information (step 3603). Similarly, the apparatus level redundancy management section 701 of the application processing apparatus 1 (108) transmits the transport communication information to the redundancy managing apparatus 1 (114) as well. The system level redundancy management section 703 of the redundancy managing apparatus 1 (114) stores the received transport communication information (step 3604).

Figure 13:
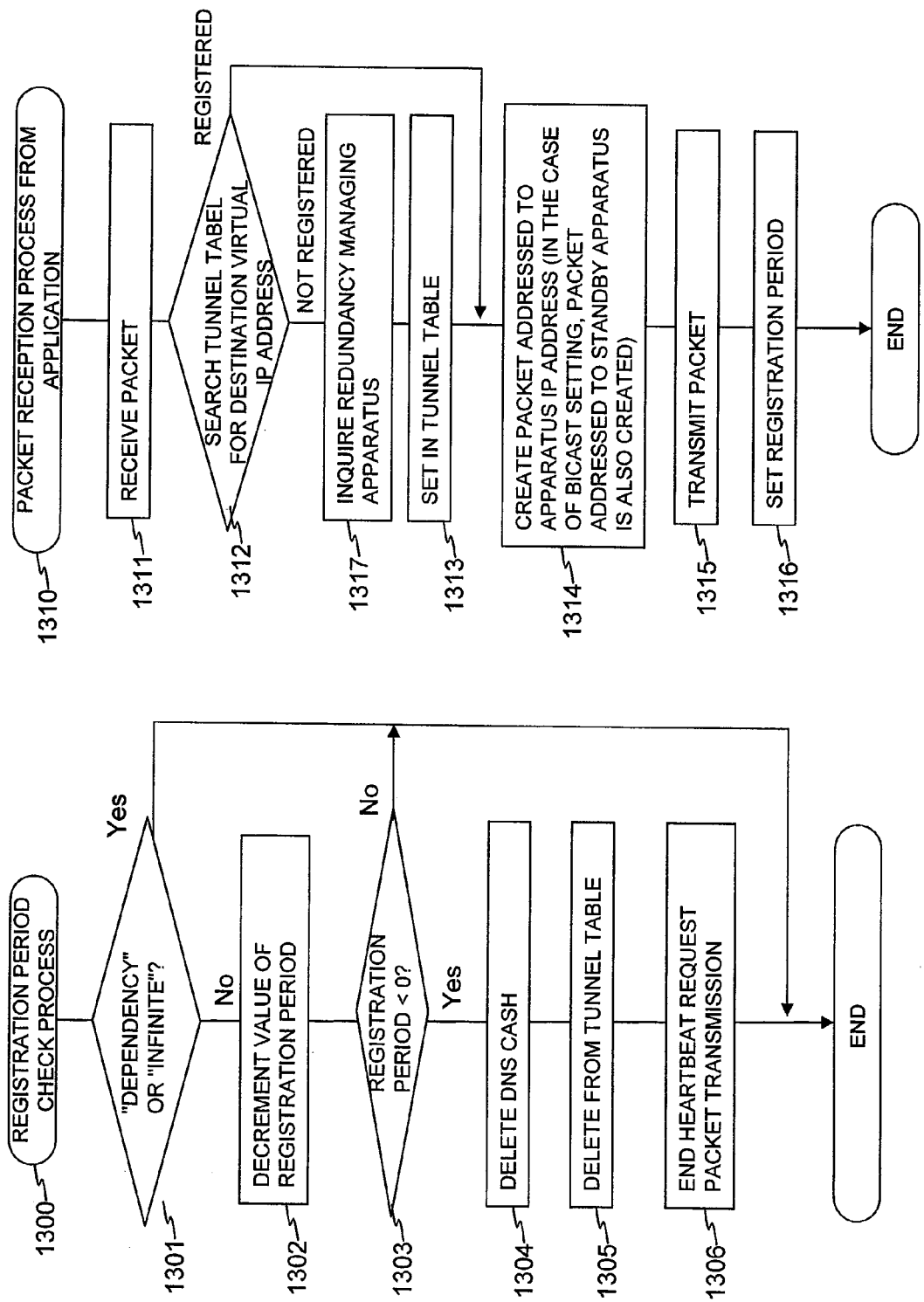
FIG. 13 is a flowchart of a registration period check process and a packet reception process from an application.

On the other hand, when the apparatus level redundancy management section 701 receives the packet 600 addressed to VIP4 transmitted by AP1 (109) (step 3605), as described in the flowchart 1310 of FIG. 13, it is determined whether VIP4 is registered in the tunnel table 218. When it is not registered (step 3606), in order to inquire about the IP address of the application processing apparatus corresponding to VIP4, the address information inquiry is transmitted to the redundancy managing apparatus 1 (114) (step 3607). The message format of the address information inquiry is the format 1020 of FIG. 10. However, the source address 1021 is RIP1, and the flag 1025 during switching and VIP4 (1026) are not included. The system level redundancy management section 703 of the redundancy managing apparatus 1 (114) searches the address table 309 (FIG. 4) to specify the IP address RIP4 of the application processing apparatus 4 (116) corresponding to VIP4 set in the address information inquiry (step 3608). A pair of VIP4 and RIP4 is set in the address information notification, and is transmitted to the application processing apparatus 1 (108) (step 3609). The apparatus level redundancy management section 701 of the application processing apparatus 1 (108) sets the tunnel table 218 based on the received address information notification (step 3613). On the other hand, the system level redundancy management section 703 of the redundancy managing apparatus 1 (114) searches the address table 309 while the source address 1021 of the address information inquiry received at step 3607, that is, RIP1 is used as a key, and specifies the virtual IP address VIP1 which is effective (that is, the state 402 is Active) on the application processing apparatus 1 (108). Then, the IP address RIP3 of the application processing apparatus 3 (112) as the failover destination of AP1 (109) using VIP1 is specified (step 3610). The system level redundancy management section 703 sets VIP1, RIP1 and RIP3 in the address information notification, and transmits them to the application processing apparatus 4 (116) (step 3611). The apparatus level redundancy management section 1101 of the application processing apparatus 4 (116) sets a set of VIP1, RIP1 and RIP3 in the tunnel table (step 3612). By this, the heartbeat communication is started (step 3614).

Besides, the apparatus level redundancy management section 701 of the application processing apparatus 1 (108) encapsulates the packet 600 addressed to VIP 4 received at step 3605 into a packet 610 addressed to RIP4 by referring to the tunnel table, and transmits it to the application processing apparatus 4 (116) (step 3615). The encapsulating process and the packet transmission process are performed at steps 1314 and 1315 of the flowchart 1310.

Figure 37:
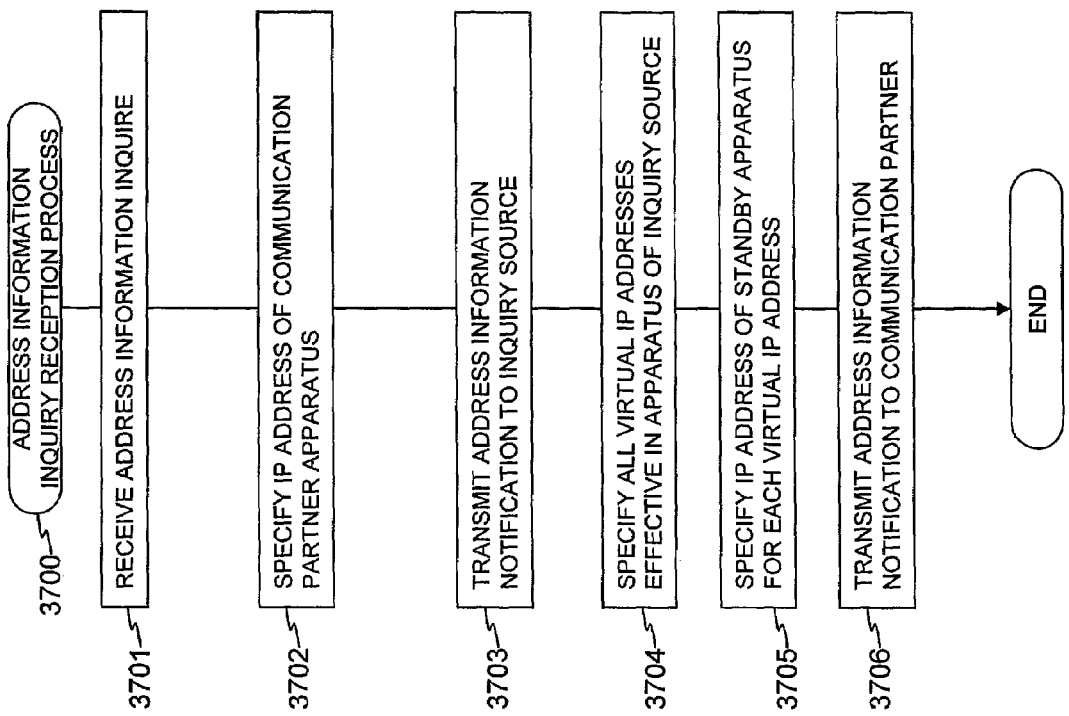
FIG. 37 is a flowchart of an address information inquiry reception process.

In the sequence of FIG. 36, the process executed by the system level redundancy management section 703 of the redundancy managing apparatus 1 (114) will be described by use of a flowchart of FIG. 37.

In an address information inquiry reception process 3700, first, at step 3701, an address information inquiry is received. At step 3702, a search is made for a record in which the virtual IP address 401 of the address table 309 (FIG. 4) is identical to VIP4 (1024) set in the address information inquiry, and the IP address RIP4 of the application processing apparatus 4 (116) is specified by referring to the apparatus IP address 403. At step 3703, a pair of VIP4 and RIP4 is set in the address information notification, and is transmitted to the application processing apparatus 1 (108). At step 3704, reference is made to the virtual IP address 401 of a record in which the apparatus IP address 403 of the address table 309 (FIG. 4) is RIP1 as the source address of the address information inquiry, and the state 402 is Active, and all effective virtual IP addresses on the application processing apparatus 1 (108) are specified. In the example of FIG. 4, VIP1 is obtained. At step 3705, the address table 309 is searched with respect to each of the specified virtual IP addresses to obtain the apparatus IP address 403 corresponding to the state 402 of Standby in the record of the virtual IP address 401 (that is, the IP address of the application processing apparatus of the failover destination of the application). In the example of FIG. 4, RIP3 is obtained. Incidentally, with respect to all virtual IP addresses specified at step 3704, the application processing apparatus which is executing (that is, Active) the application using those addresses is the application processing apparatus 1 (108) of the transmission source of the address information inquiry. Accordingly, at step 3706, a set of the virtual IP address VIP1, RIP1 as the IP address of the application processing apparatus which is executing the application, and RIP3 as the IP address of the application processing apparatus of the failover destination is set in the address information notification. Then, the address information notification is transmitted to the IP address (that is, RIP4) of the communication partner apparatus obtained at step 3702.

(Redundant Failover)

Figure 18:
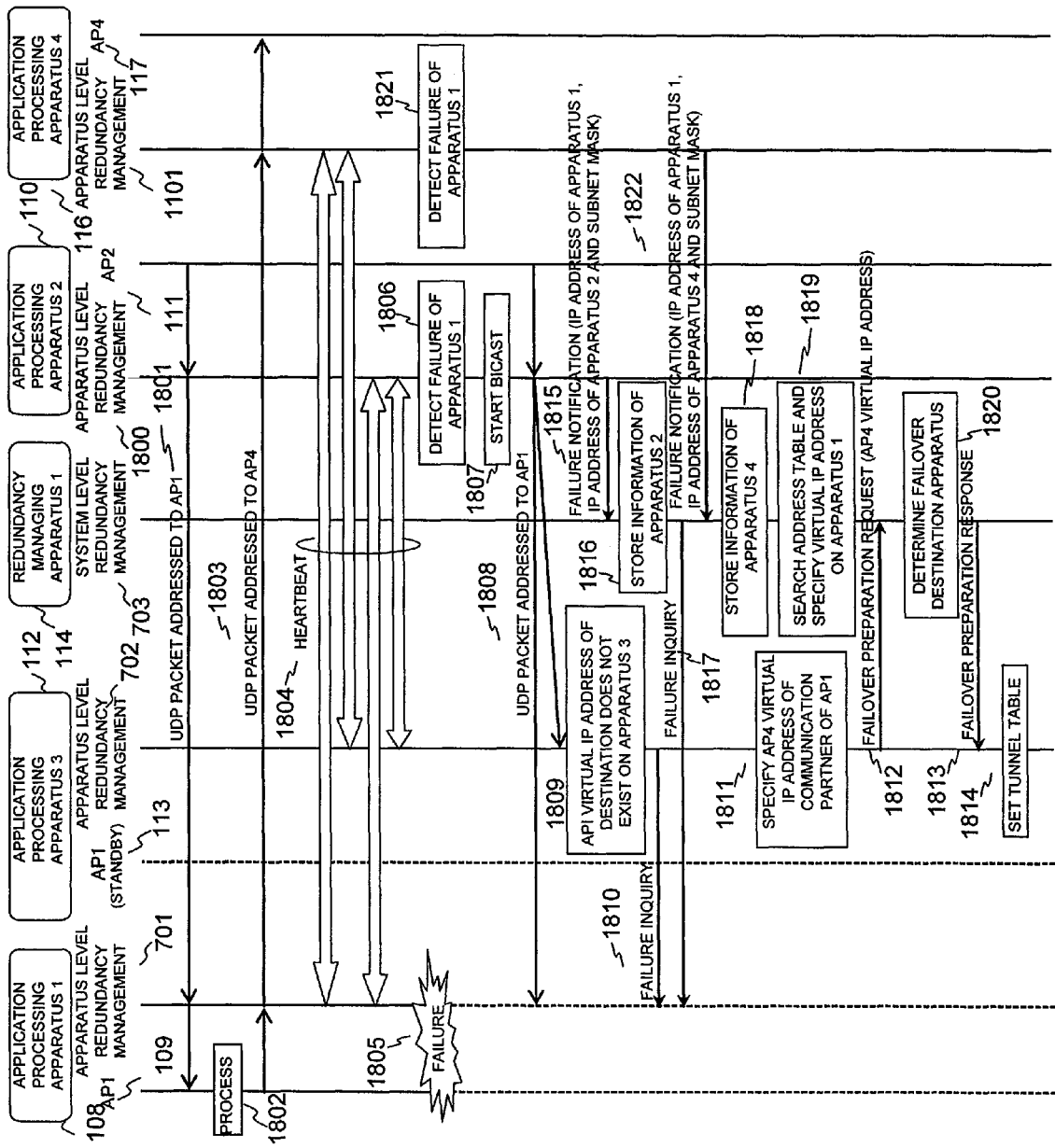
FIG. 18 is a sequence view of the first half of redundant failover of a UDP application.

FIG. 18 is a sequence view in a case where redundant failover of an application is performed during communication of the application.

In FIG. 18, it is assumed that AP2 (111) of the application processing apparatus 2 (110) continuously transmits a UDP packet to AP1 (109) of the application processing apparatus 1 (108) (step 1801), and AP1 (109) processes the received packet on a packet-by-packet basis (step 1802) and transmits it to AP4 (117) of the application processing apparatus 4 (116) (step 1803). Besides, FIG. 38B shows the tunnel table 218 of the apparatus level redundancy management section (1800) of the application processing apparatus 2 (110) and the apparatus level redundancy management section (1101) of the application processing apparatus 4 (117). The apparatus level redundancy management section (1101) of the application processing apparatus 4 (116) performs the heartbeat communication with the apparatus level redundancy management section (701) of the application processing apparatus 1 (108). Besides, the heartbeat communication is performed also with the apparatus level redundancy management section (702) of the application processing apparatus 3 (112). Similarly, the apparatus level redundancy management section 1800 of the application processing apparatus 2 (110) also performs the heartbeat communication with each of the apparatus level redundancy management section (701) and the apparatus level redundancy management section (702) (step 1804).

Figure 31:
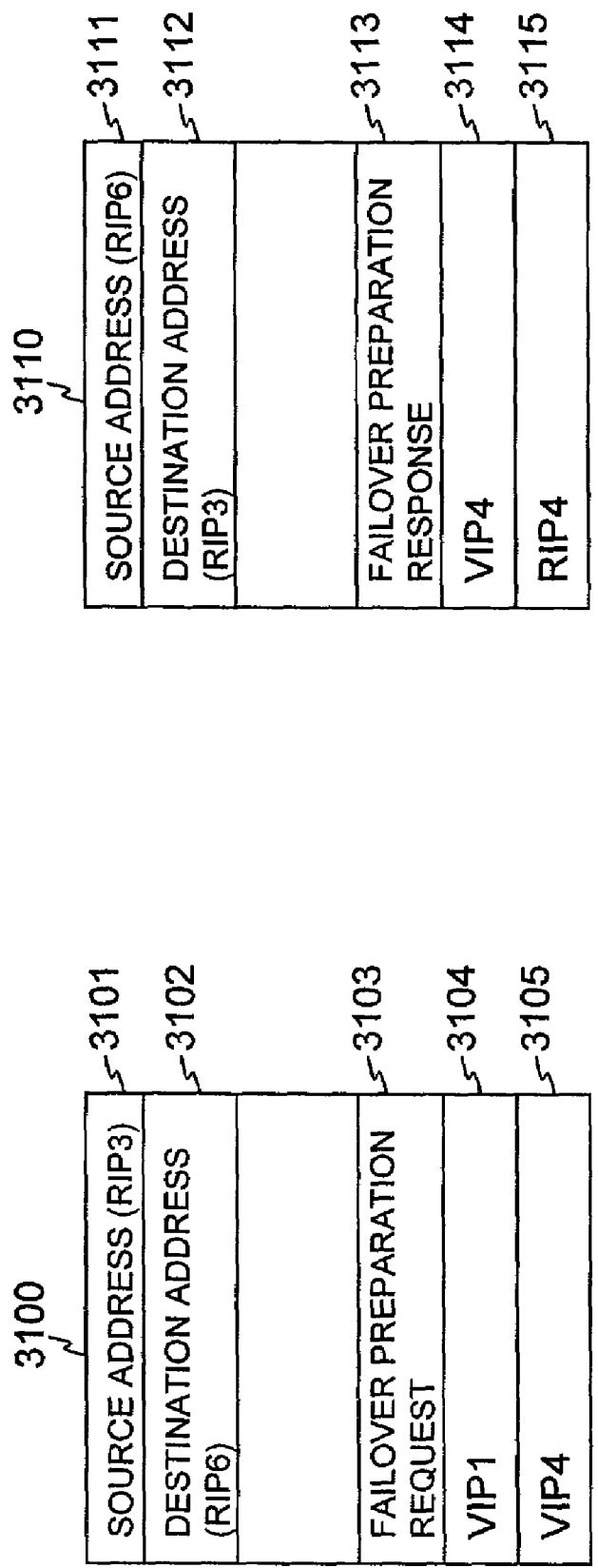
FIG. 31 is a format of a failover preparation request message and a failover preparation response message.

Here, it is assumed that the application processing apparatus 1 (108) is down (step 1805). Since the application processing apparatus 1 (108) does not respond to the heartbeat, the application processing apparatus 2 (1800) detects the failure (step 1806). At step 1807, the state 3802 of the tunnel table is updated to "Bicast", and the packet transmitted by AP2 (111) is encapsulated into two packets, that is, a packet addressed to the application processing apparatus 1 (108) and a packet addressed to the application processing apparatus 3 (112) (step 1807, step 1808). The apparatus level redundancy management section (702) of the application processing apparatus 3 (112) decapsulates the received packet, and makes a failure inquiry to the application processing apparatus 1 (108) (step 1810) since the destination address of the inside packet, that is, the virtual IP address VIP1 of AP1 (109) is not effective on the application processing apparatus 3 (112) (step 1809). Further, reference is made to the transport communication information relating to AP1 (109) stored at step 1118 of FIG. 11, and the address of the packet transmission destination of AP1 (109), that is, the virtual IP address VIP4 of AP4 (117) is specified (step 1811). Then, a failover preparation request is transmitted to the redundancy managing apparatus 1 (114) (step 1812). A format 3100 of FIG. 31 is a message format of the failover preparation request. A source address 3101 is the IP address RIP3 of the application processing apparatus 3 (112). A destination address 3102 is the IP address RIP6 of the redundancy managing apparatus 1 (114). A failover preparation request 3103 is a message identifier. VIP1 (3104) sets an application of a failover object, that is, the virtual IP address VIP1 of AP1 (109). VIP4 (3105) sets a virtual IP address to be set in the tunnel table 218, that is, the virtual IP address VIP4 of AP4 (117).

Figure 17:
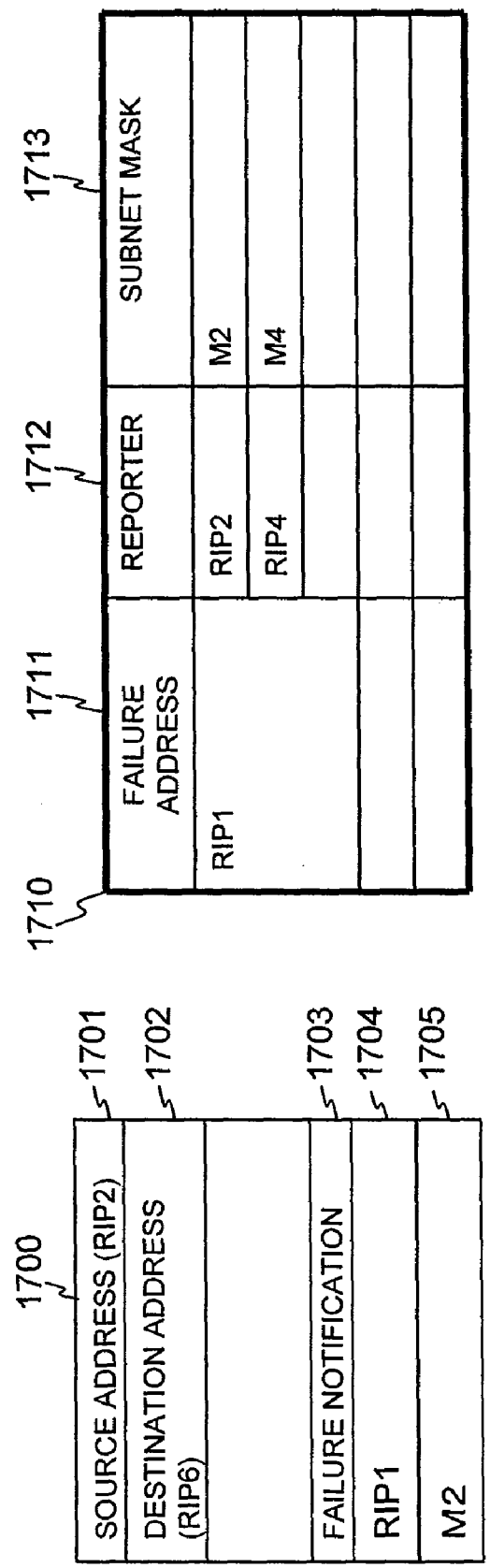
FIG. 17 is a view showing a format of a failure notification message and an address notification destination table.

On the other hand, the apparatus level redundancy management section 1800 of the application processing apparatus 2 (110) which starts bicasting at step 1807 transmits a failure notification to the redundancy managing apparatus 1 (114) (step 1815). A format 1700 of FIG. 17 is a format of a failure notification message. A source address 1701 is the IP address RIP2 of the application processing apparatus 2 (110). A destination address 1702 is the IP address RIP6 of the redundancy managing apparatus 1 (114). A failure notification 1703 is a message identifier. RIP1 (1704) is the IP address RIP1 of the application processing apparatus 1 (108) in which the response of the heartbeat disappears. M2 (1705) is a subnet mask of the IP address RIP2 of the application processing apparatus 2 (110) which detects the failure. The system level redundancy management section 703 stores, in the address notification destination table 310, that the application processing apparatus 2 (110) reports the failure of the application processing apparatus 1 (108) (step 1816). Then, a failure inquiry is transmitted to the application processing apparatus 1 (108) (step 1817).

Incidentally, the apparatus level redundancy management section 1101 of the application processing apparatus 4 (116) also detects the failure from the fact that the heartbeat response is not sent from the application processing apparatus 1 (108) (step 1821), and notifies the failure notification to the redundancy managing apparatus 1 (114) (step 1822). Similarly to step 1816, the system level redundancy management section (703) of the redundancy managing apparatus 1 (114) stores, in the address notification destination table 310, that the application processing apparatus 4 (116) reports the failure of the application processing apparatus 1 (108) (step 1818). Since the failure inquiry to the application processing apparatus 1 (108) is already performed at step 1817, the inquiry may not be performed at this time. At step 1819, the virtual IP address VIP1 of the active AP1 (109) executed by the application processing apparatus 1 (108) in which the failure appears to occur is specified using the address table 309.

Here, when receiving the failover preparation request (step 1812), it is determined that the application processing apparatus 3 (112) as the transmission source is made the failover destination (step 1820), and a failover preparation response is transmitted to the application processing apparatus 3 (112) (step 1813). A format 3110 of FIG. 31 is a message format of the failover preparation response. A source address 3111 is the IP address RIP6 of the redundancy managing apparatus 1 (114). A destination address 3112 is the IP address RIP3 of the application processing apparatus 3 (112). A failover preparation response 3113 is a message identifier. VIP4 (3114) and RIP4 (3115) are the virtual IP address of AP4 (117) and the IP address of the application processing apparatus 4 (116), which are set in the tunnel table 218 of the apparatus level redundancy management section 702 at step 1814.

Figure 19:
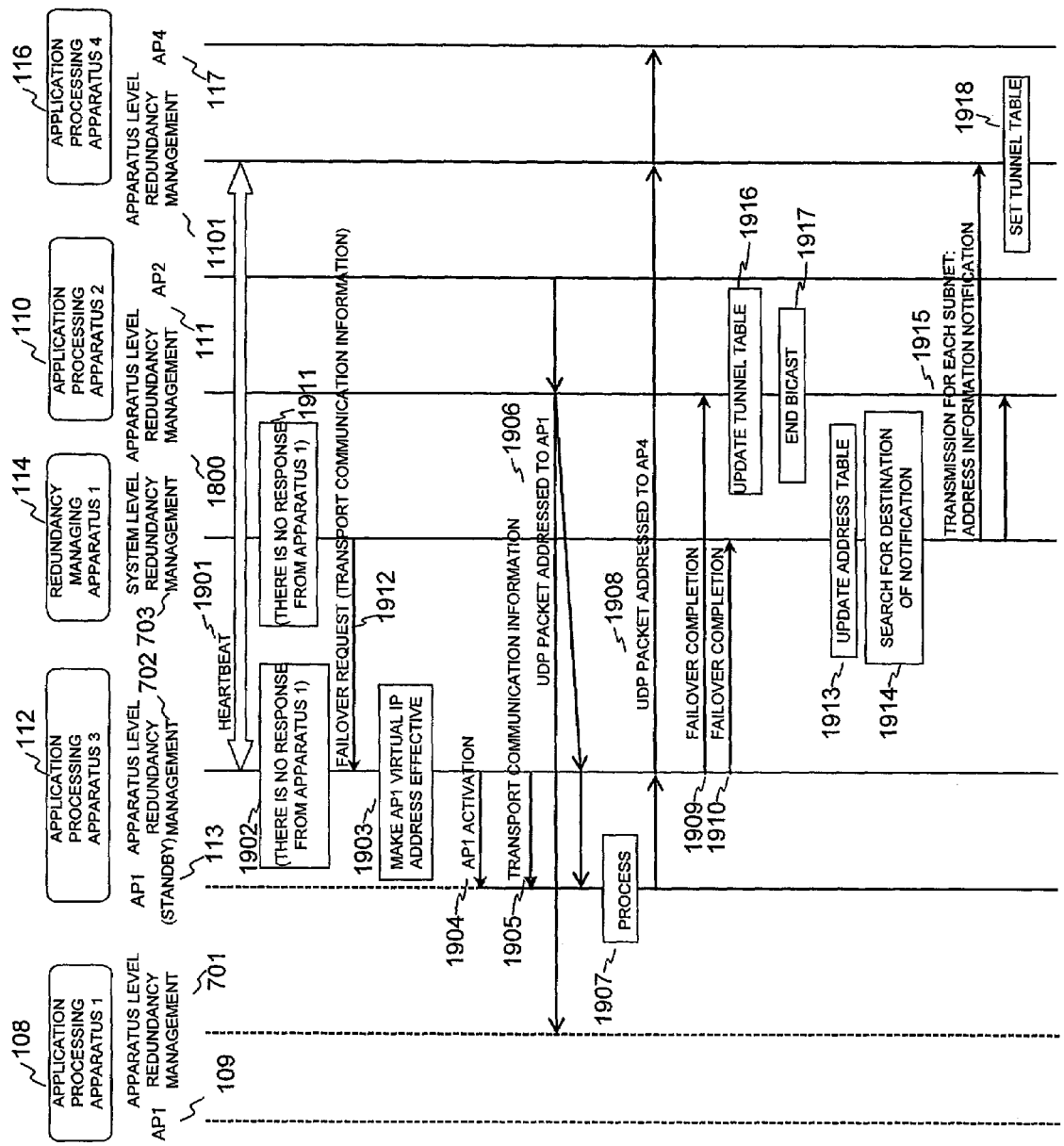
FIG. 19 is a sequence view of the latter half of the redundant failover of the UDP application.

FIG. 19 shows a subsequent sequence.

The apparatus level redundancy management section 702 of the application processing apparatus 3 (112) starts to transmit the heartbeat request to RIP4 set in the tunnel table 218 (step 1901).

Thereafter, when a response to the failure inquiry transmitted at step 1810 does not occur in a specific time (step 1902), redundant failover of AP1 is performed. First, the virtual IP address VIP1 of AP1 is made effective (step 1903). Then, AP1 (113) is activated and is placed in the active state (step 1904). AP1 (113) captures the transport communication information stored at step 1118 of FIG. 11 (step 1905), and prepares for communication with AP4 (117). When this is completed, the process of a UDP packet from AP2 (111) is started (step 1907), and the UDP packet is started to be transmitted to AP4 (117) (step 1908).

Figure 25:
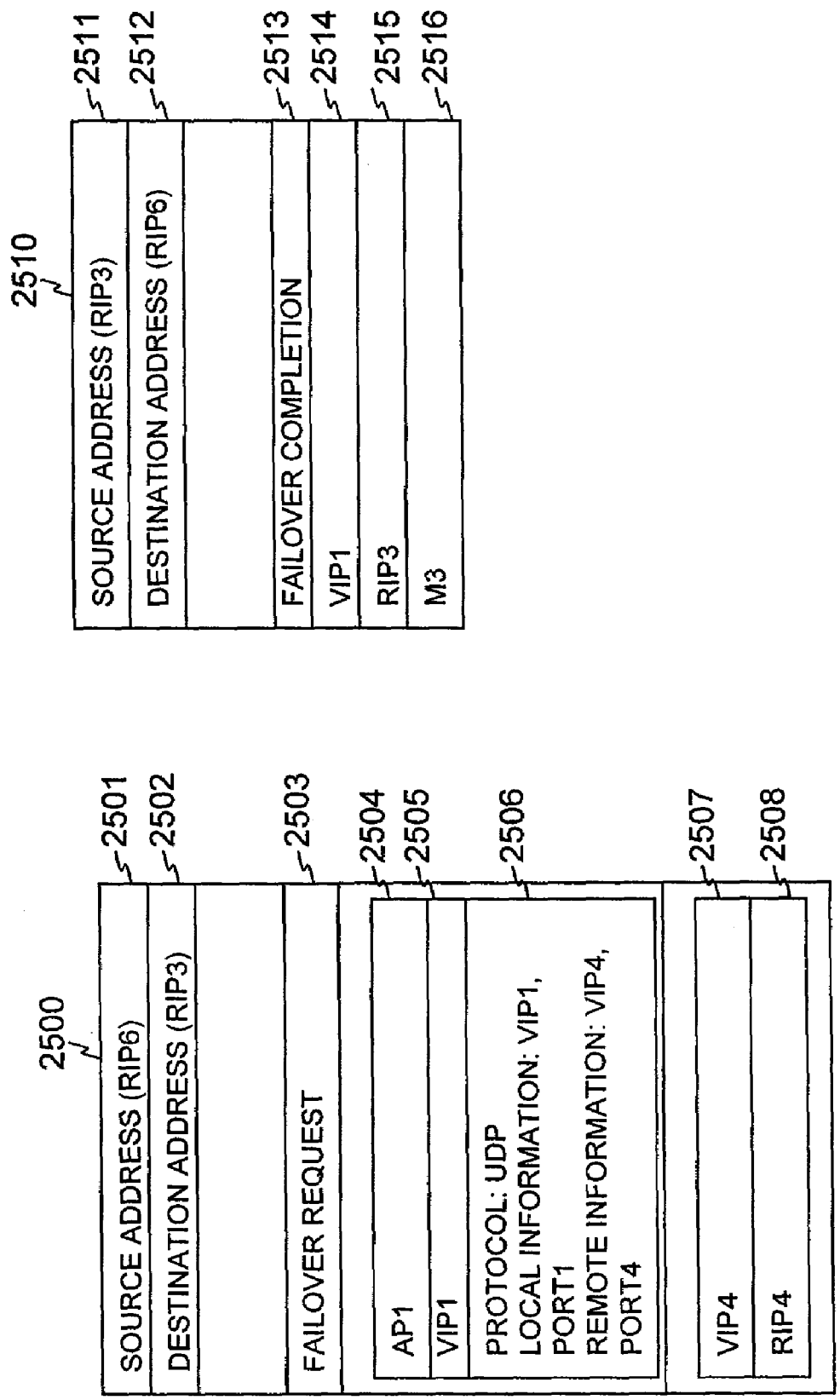
FIG. 25 is a format of a failover request message and a failover completion message.

On the other hand, when the response to the failure inquiry transmitted at step 1817 does not occur in a specific time (step 1911), the system level redundancy management section 703 of the redundancy managing apparatus 1 (114) also transmits a failover request to the application processing apparatus 3 (112) (step 1912). A message format of the failover request is a format 2500 of FIG. 25. A source address 2501 is the IP address RIP6 of the redundancy managing apparatus 1 (114). A destination address 2502 is the IP address RIP3 of the application processing apparatus 3 (112). A failover request 2503 is a message identifier. AP1 (2504), VIP1 (2505) and an area 2506 are the same as AP1 (1514), VIP1 (1515) and the area 1516 of the transport communication information message 1510 of FIG. 15. That is, they are the transport communication information of AP1 stored at step 1119 of FIG. 11. VIP4 (2507) and RIP4 (2508) are the virtual IP address of AP4 (117) as the packet transmission destination of AP1 and the IP address of the application processing apparatus 4 (116). In the example of FIG. 18 and FIG. 19, since the application processing apparatus 3 (112) switches AP1 when the packet addressed to AP1 (109) from the application processing apparatus 2 (110) is received, it is not necessary to receive a failover request. However, by providing a procedure in which the redundancy managing apparatus 1 (114) transmits the failover request, an application processing apparatus in which a standby application for a failed application is not previously prepared can also be made to execute an application as an active system.

Thereafter, the apparatus level redundancy management section 702 of the application processing apparatus 3 (112) transmits failover completion to the application processing apparatus 2 (110) as the transmission source of the UDP packet addressed to AP1 at step 1808 and the redundancy managing apparatus 1 (114) (step 1909, step 1910). A format of a failover completion message is a format 2510 of FIG. 25. This drawing shows an example in which transmission is performed to the redundancy managing apparatus 1 (114). A source address 2511 is the IP address RIP3 of the application processing apparatus 3 (112). A destination address 2512 is the IP address RIP6 of the redundancy managing apparatus 1 (114). A failover completion 2513 is a message identifier. VIP1 (2514) is a virtual IP address of an application in which failover is performed, that is, AP1 (113). RIP3 (2515) is the IP address of the application processing apparatus 3 (112) to execute AP1 (113) after failover. M3 is the subnet mask of RIP3.

The apparatus level redundancy management section 1800 of the application processing apparatus 2 (110) updates the tunnel table 218 based on the failover completion (step 1916), and stops to encapsulate a packet transmitted by AP2 (111) into a packet addressed to the application processing apparatus 1 (108) (step 1917).

The system level redundancy management section 703 having received the failover completion at step 1910 updates the address table based on the failover completion (step 1913). At step 1914, the address notification destination table 1710 is searched to specify the subnet of the application processing apparatus which transmitted the failure notification at step 1815 and step 1822. At step 1915, address information notification is transmitted by broadcast in the subnet. A format of the address information notification will be described with reference to the format 1010 of FIG. 10. The source address 1011 is the IP address RIP6 of the redundancy managing apparatus 1 (114). The destination address 1012 is, for example, the logical NOT of M4 and logical OR of RIP4 when the broadcast is addressed to the subnet of the application processing apparatus 4 (116). A message identifier of the address information notification is set in the address information registration completion 1013. RIP3 is set in the area (1015) of RIP1. The area (1016) of RIP3 is not included.

At step 1918, the apparatus level redundancy management section 1101 of the application processing apparatus 4 (116) sets the tunnel table 218 based on the content of the address information notification.

The above is the description of the sequence in the case where AP1 (109) of the application processing apparatus 1 (108) is switched to AP1 (113) of the application processing apparatus 3 (112).

Next, the details of processes of FIG. 18 and FIG. 19 will be described by use of flowcharts.

Figure 14:
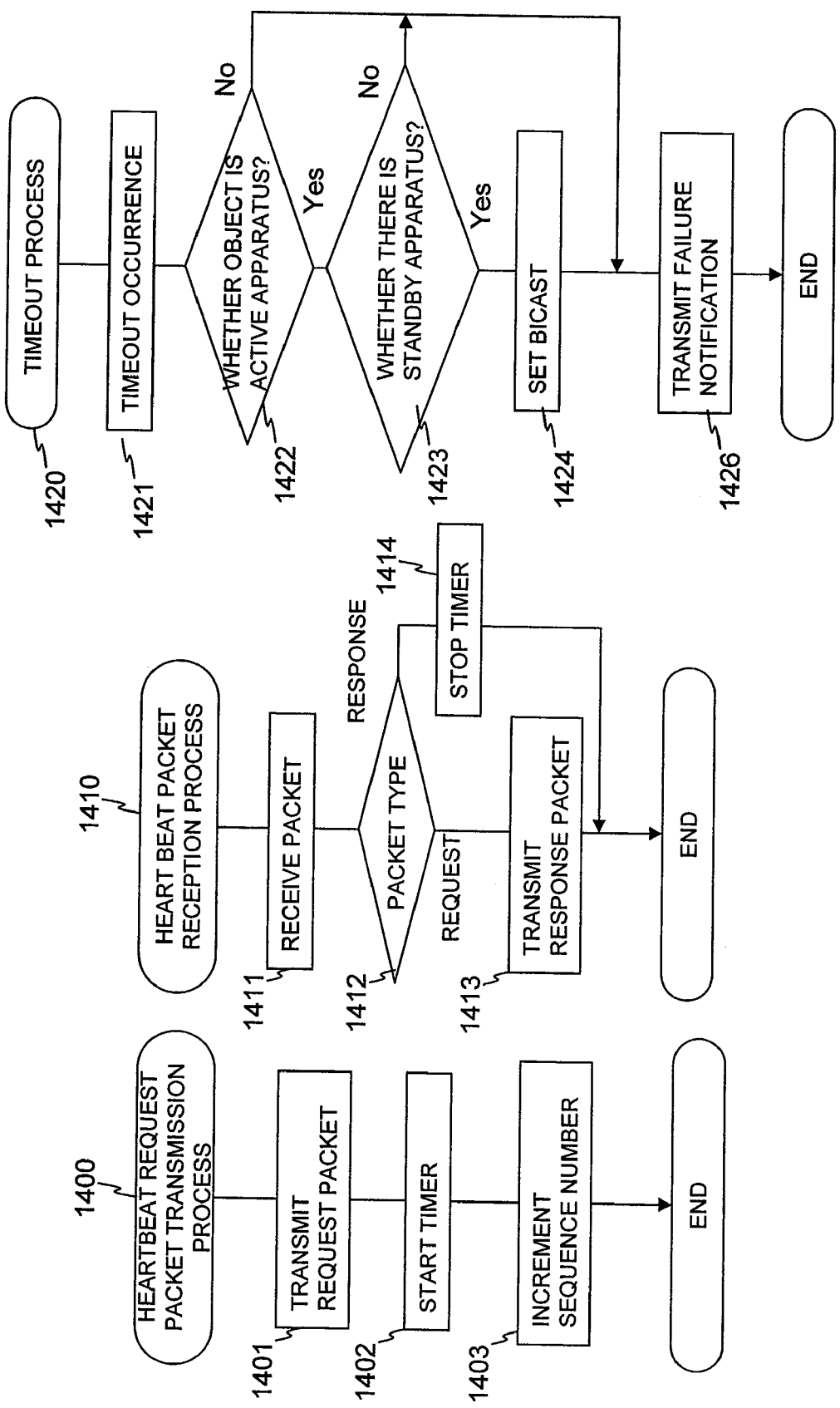
FIG. 14 is a flowchart of a heartbeat communication relevant process.

First, the heartbeat process of step 1804 of FIG. 18 will be described by use of FIG. 14. A process of FIG. 14 is executed by the apparatus level redundancy management section of the application processing apparatus.

A heartbeat request packet transmission process 1400 is performed on all IP addresses registered in the apparatus IP address 3803 of the tunnel table 218 of the application processing apparatus. Further, the process is repeatedly executed at a constant period. For example, it is assumed that the apparatus level redundancy management section 701 of the application processing apparatus 1 (108) performs heartbeat to the IP address RIP4 of the application processing apparatus 4 (116). Then, at step 1401, a packet of the format 1600 of FIG. 16 is transmitted. At step 1402, the sequence number 1604 is made an index and a timer is started, and it is correlated with the destination address 1602 of the transmission packet and is stored. At step 1403, the sequence number is incremented. This value is set in the packet at the time of next transmission of the heartbeat request packet 1600.

Next, a heartbeat packet reception process 1410 will be described. First, at step 1411, a heartbeat packet is received. At step 1412, a packet identifier 1603 is determined. When the packet is a heartbeat request packet, a heartbeat response packet is transmitted at step 1413. The heartbeat response packet is such that the source address 1601 and the destination address 1602 of the received heartbeat request packet are exchanged, and the heartbeat request 1603 is made the packet identifier of the heartbeat response. At step 1412, when the packet type is the heartbeat response packet, reference is made to the sequence number in the packet, and the corresponding timer (timer started at step 1402) is stopped (step 1414).

Next, a description will be given of a process 1420 in a case where the timer started at step 1402 of the heartbeat request packet transmission process 1400 is timed out. A description will be given using, as an example, a case where the apparatus level redundancy management section 1800 of the application processing apparatus 2 (110) detects timeout in the sequence of FIG. 18. FIG. 39A shows the tunnel table 218 of the application processing apparatus 2 (110) before timeout detection.

First, at step 1421, a timeout occurs. At step 1422, from an index of a timer in which the timeout occurs, an IP address correlated with the index and stored is checked. It is assumed that this is the IP address RIP1 of the application processing apparatus 1 (108). A record in which the apparatus IP address 3803 of the tunnel table 218 is RIP1 is searched, and it is determined whether the state 3802 is "Active". In the case of "Active", at step 1423, it is determined whether the apparatus IP address 3803 exists under the condition that the virtual IP address 3801 is common (that is, VIP1) and the state 3802 is "Standby". Here, since a state of RIP3 is Standby, at step 1424, the state 3802 of RIP3 is changed from "Standby" to "Bicast". As a result, the tunnel table 218 becomes as shown in FIG. 39B. By this, a packet transmitted by AP2 (111) is encapsulated and transmitted to the IP address RIP3 of the application processing apparatus 3 (112) as well. At step 1426, failure notification is transmitted to the redundancy managing apparatus 1 (114). As shown in the format 1700 of FIG. 17, the address of RIP1 and the subnet mask M2 of RIP2 are set in the failure notification. On the other hand, when the apparatus in which the timeout occurs at step 1422 is not the active apparatus, and when there is no standby apparatus for the apparatus in which the timeout occurs at step 1423, shift is made to step 1426.

Figure 24:
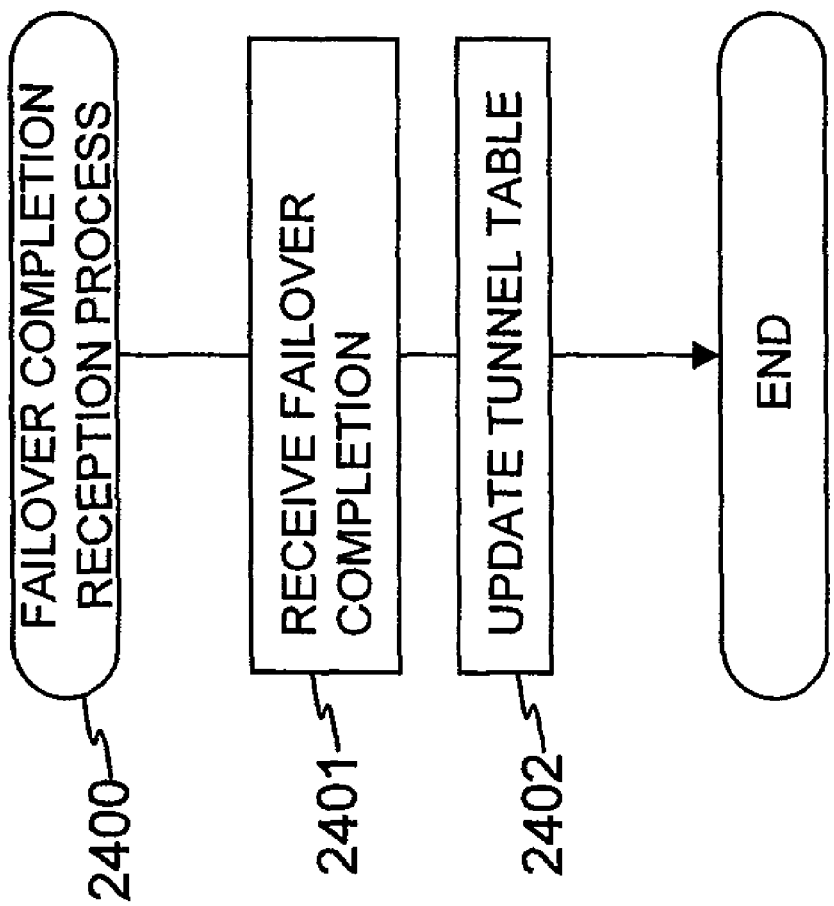
FIG. 24 is a flowchart of a failover completion reception process.

Next, a process in a case where the apparatus level redundancy management section 1800 of the application processing apparatus 2 (110) receives the failover completion at step 1909 of FIG. 19 will be described with reference to a flowchart 2400 of FIG. 24.

First, the tunnel table 218 of the application processing apparatus 2 (110) is as shown in FIG. 39B. At step 2401, the failover completion is received. VIP1 and RIP3 are set in the failover completion. At step 2402, in the tunnel table 218, when the virtual IP address 3801 is VIP1 and the apparatus IP address 3803 is RIP3, the state 3802 is changed from "Bicast" to "Active", and the registration period 3804 is set to, for example, 3600 seconds of the initial value. Further, when the virtual IP address 3801 is VIP1 and the apparatus IP address 3803 is RIP1, the state 3802 is changed from "Active" to "Failure", and the registration period is made "Dependency". As a result, the tunnel table 218 becomes as shown in FIG. 39C. By this, the packet transmitted by AP2 (111) is encapsulated and transmitted to only the IP address RIP3 of the application processing apparatus 3 (112).

Figure 20:
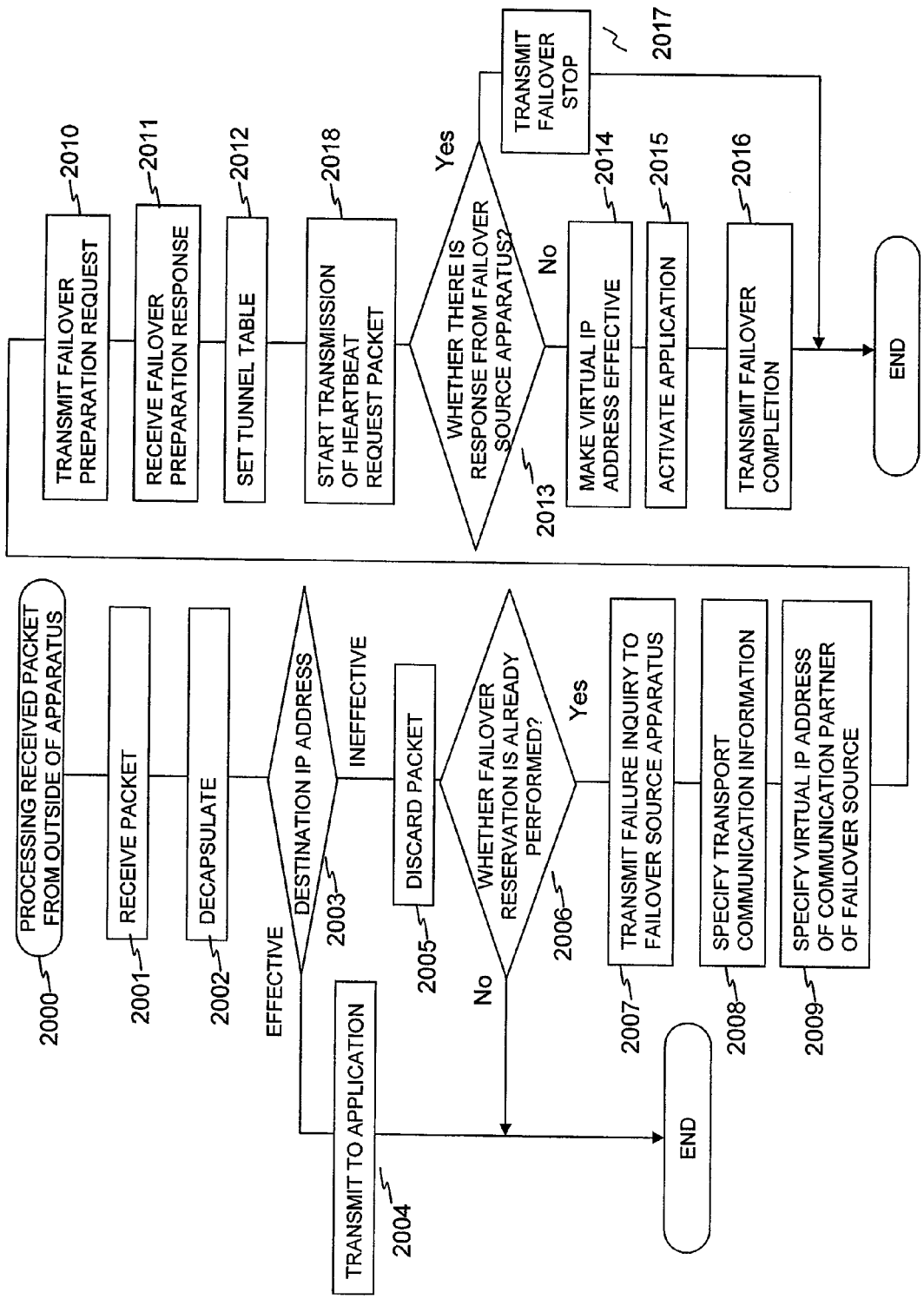
FIG. 20 is a flowchart of a packet reception process from the outside of an apparatus.

Next, a process in a case where the apparatus level redundancy management section 702 of the application processing apparatus 3 (112) in FIG. 18 receives a UDP packet addressed to AP1 at step 1808 will be described by use of a flowchart of FIG. 20.

First, the tunnel table 218 of the application processing apparatus 3 (112) is as shown in FIG. 40A. At step 2001, the packet is received. At step 2002, the received packet is decapsulated. At step 2003, it is determined whether the destination address of the packet after decapsulation is effective in the application processing apparatus 3 (112). In the example of FIG. 18, the destination address is the virtual IP address VIP1 of AP1 (109), and is ineffective in the application processing apparatus 3 (112). Accordingly, at step 2005, the packet is discarded, and at step 2006, it is determined whether the destination address, that is, VIP1 is coincident with the virtual IP address stored at step 710 of FIG. 7. In the example of FIG. 18, since they are coincident with each other, at step 2007, a failure inquiry is transmitted to the failover source application processing apparatus, that is, the IP address RIP1 of the application processing apparatus 1 (108) stored at step 710 of FIG. 7. Hereinafter, failover preparation of AP1 is performed.

First, at step 2008, the transport communication information stored at step 1118 of FIG. 11 is specified. It has VIP1 in the local information of the area 1516. At step 2009, the virtual IP address included in the remote information of the transport communication information is extracted. The virtual IP address VIP4 of AP4 (117) of the communication partner of AP1 (109) is extracted. At step 2010, the failover preparation request is transmitted to the redundancy managing apparatus 1 (114). An object thereof is to inquire about the IP address of the application processing apparatus which executes the application using VIP4 at the present time point, that is, AP4 (117). As shown in the format 3100 of FIG. 31, the virtual IP address VIP1 of AP1 (109) of the failover object and the virtual IP address VIP4 of the partner AP4 (117) to which AP1 (109) transmits the packet are set in the failover preparation request. At step 2011, the failover preparation response is received. As shown in the format 3110 of FIG. 31, the virtual IP address VIP4 of AP4 (117) and the IP address RIP4 of the application processing apparatus 4 (116) are set in the failover preparation response. At step 2012, VIP4 is set in the virtual IP address 3801 of the tunnel table 218, RIP4 is set in the apparatus IP address 3803, "Active" is set in the state 3802, and for example, 3600 seconds are set in the registration period 3804. As a result, the tunnel table 218 becomes as shown in FIG. 40B. At step 2018, transmission of a heartbeat request packet is started. At step 2013, it is determined whether a response to the failure inquiry transmitted at step 2007 is sent from the application processing apparatus 1 (108). When not, the virtual IP address VIP1 used by AP1 (113) is made effective at step 2014. At step 2015, AP1 (113) is activated. At step 2016, the failover completion is transmitted to the redundancy managing apparatus 1 (114). The failover completion is transmitted also to the application processing apparatus 2 (110) as the transmission source of the encapsulated packet received at step 2001. On the other hand, when there is a response from the failover source apparatus (application processing apparatus 1 (108)) at step 2103, a failover stop is transmitted to the application processing apparatus 2 (110), and "Bicast" of the state 3802 of the tunnel table 218 (FIG. 39B) of the application processing apparatus 2 (110) is returned to "Standby" (step 2017). Incidentally, at step 2003, when the destination address of the received packet is effective on the application processing apparatus 3 (112), the packet is transferred to the application using it (step 2004). Besides, at step 2006, when the destination address is not coincident with the virtual IP address stored at step 710 of FIG. 7, the process is ended.

Figure 21:
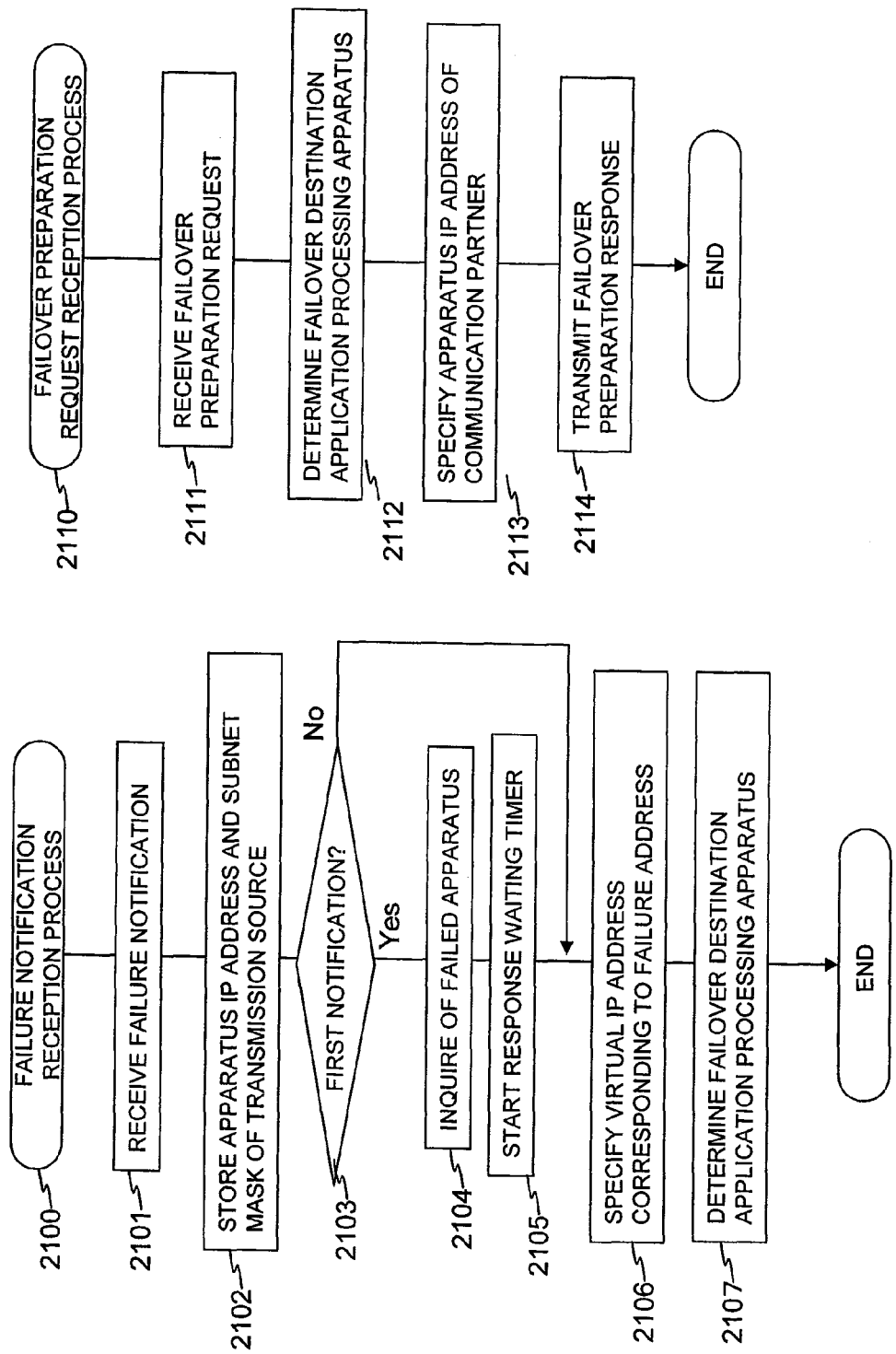
FIG. 21 is a flowchart of a failure notification reception process and a failover preparation request reception process.

Next, in FIG. 18, a process in the case where the system level redundancy management section 703 receives the failure notification at step 1815 will be described by use of a flowchart 2100 of FIG. 21. First, the address table 309 is as shown in FIG. 4. At step 2101, the failure notification is received from the application processing apparatus 2 (110). As shown in the format 1700 of FIG. 17, the IP address RIP1 of the application processing apparatus 1 (108) in which a failure occurs and the subnet mask M2 of the application processing apparatus 2 (110) are set in the failure notification. At step 2102, RIP1 is set in a failure address 1711 of an address notification destination table 1710, the source address RIP2 of the failure notification is set in a reporter 1712, and M2 is set in a subnet mask 1713. At step 2103, it is determined whether RIP1 is first registered in the failure address 1711. In the case of Yes, shift is made to step 2104, and a failure inquiry is transmitted to RIP1 (that is, the application processing apparatus 1 (108)). At step 2105, a timer waiting for a response from the application processing apparatus 1 (108) is started. At step 2106, a record in which the apparatus IP address 403 of the address table 309 is RIP1 and the state 402 is "Active" is searched, and the corresponding virtual IP address 401 is obtained. VIP1 is obtained. Further, the state 402 of the record in which the virtual IP address 401 is VIP1 and the apparatus IP address 403 is RIP1 is changed to "Failure". At step 2107, the failover destination application processing apparatus is determined. For example, the apparatus IP address 403 corresponding to the state 402 of Standby exists in the record in which the virtual IP address 401 of the address table 309 is VIP1. That is, since it is understood that RIP3 is reserved for failover, the state 402 is changed from "Standby" to "Failover schedule". When the apparatus IP address 403 corresponding to the state 402 of Standby does not exist in the record of VIP1 (that is, failover reservation is not made), for example, the apparatus IP address 403 of a record in which the state 402 of the address table 309 is not "Failure" is selected as the failover destination, and a record in which the state 402 is "Failover schedule" and the apparatus IP address 403 is the IP address of the selected application processing apparatus is added to a record in which the virtual IP address 401 is VIP1. As a result, the address table 309 becomes as shown in FIG. 41A.

On the other hand, when the failure notification is received at step 1822 of FIG. 18, since RIP1 is already registered in the failure address 1711, the determination of step 2103 becomes No and the process is ended.

Incidentally, in the example, although RIP1 as the information of the apparatus in which the failure occurs is set in the failure notification transmitted by the application processing apparatus 2 (110), there is also a method in which the virtual address VIP1 of AP1 (109) is set instead of RIP1. In this case, in the application processing apparatus 2 (110) for transmitting the failure notification, it is necessary that reference is made to the tunnel table 218 (FIG. 39A) to specify the virtual address VIP1 corresponding to RIP1. Instead, the process of step 2106 becomes simple for the system level redundancy management section 703.

Next, the process in the case where the system level redundancy management section 703 receives the failover preparation request at step 1812 will be described by use of a flowchart 2110 of FIG. 21.

First, at step 2111, the failover preparation request is received. As shown in the format 3100 of FIG. 31, the virtual IP address VIP1 of the application AP1 (109) as the failover object and the virtual IP address VIP4 of AP4 (117) as the packet transmission destination of AP1 (109) are set in the failover preparation request. At step 2112, the apparatus IP address 403 of a record in which the virtual IP address 401 of the address table 309 (FIG. 41A) is VIP1 and the state 402 is "Failover schedule" is updated to the source address 3101 of the failover preparation request. That is, when there is an application processing apparatus having transmitted the failover preparation request, switching is always made to the application processing apparatus. At step 2113, the apparatus IP address 403 of a record in which the virtual IP address 401 of the address table 309 is VIP4 and the state 402 is "Active" is obtained. RIP4 is obtained. When there is no record in which the state 402 is "Active" (when a failure occurs also in the application processing apparatus 4 (116) and the state 402 is "Failure"), the apparatus IP address 403 corresponding to the state 402 of "Failover schedule" is obtained. At step 2114, the failover preparation response is transmitted to the application processing apparatus 3 (112) as the transmission source of the failover preparation request. A pair of the apparatus IP address (RIP4) obtained at step 2113 and VIP4 is set in the failover preparation response (see the format 3110 of FIG. 31).

As stated above, the correspondence between the virtual IP address VIP4 relating to the communication partner of AP1 (109) and the IP address RIP4 of the application processing apparatus is notified to the application processing apparatus 3 (112) based on the address table 309 at the time point when the application processing apparatus 3 (112) transmits the failover preparation request to the redundancy managing apparatus 1 (114). Thus, this is more accurate than, for example, a case where the tunnel table of the application processing apparatus 3 (112) is set based on the information of the tunnel table held before a failure occurs in the application processing apparatus 1 (108). This is advantageous in quickly restoring communication between applications when the failure simultaneously occurs in a plurality of application processing apparatuses.

Figure 22:
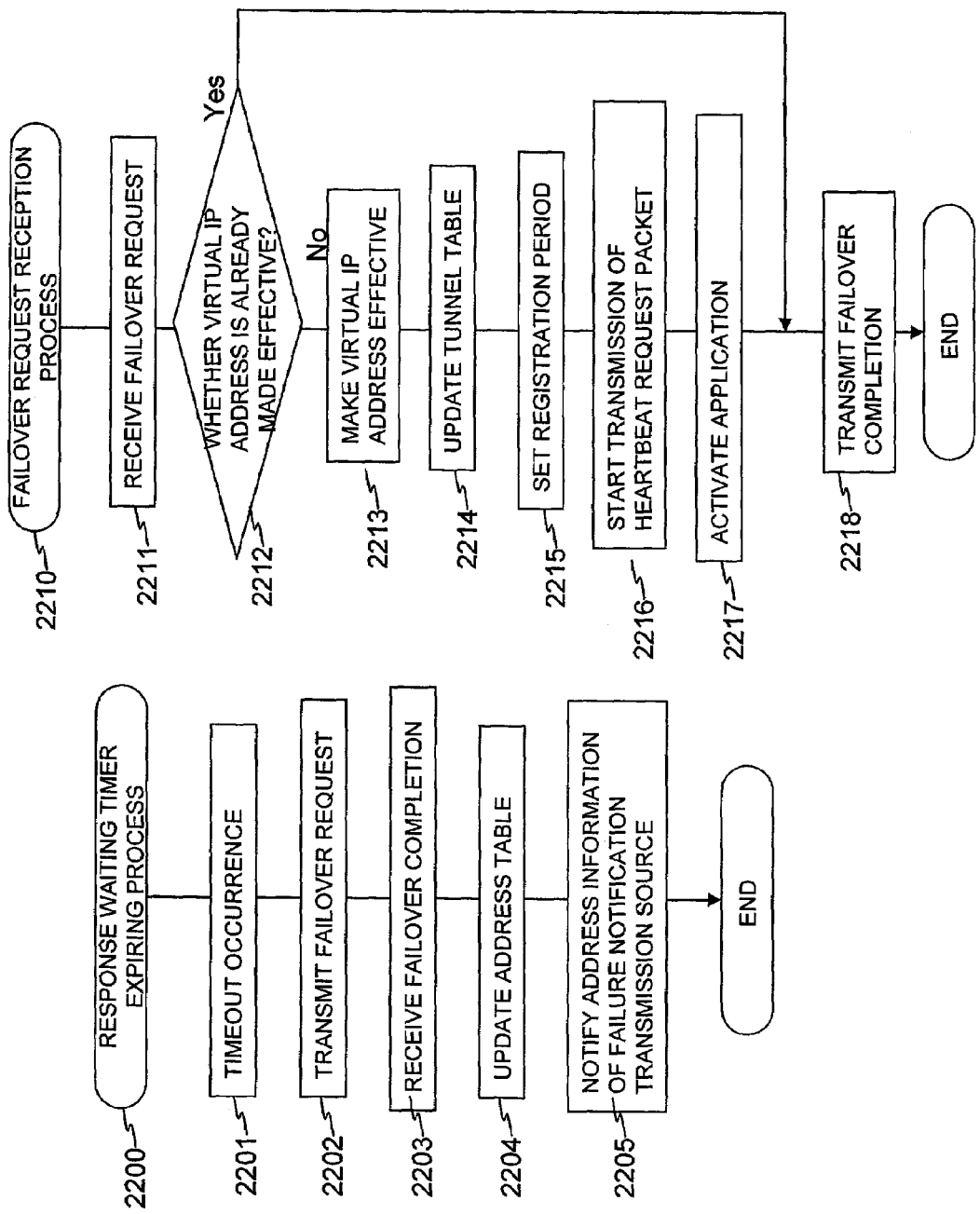
FIG. 22 is a flowchart of a response waiting timer expiration process and a failover request reception process.

Next, a process of the system level redundancy management section 703 in a case where the response waiting timer started at step 2105 of the failure notification reception process 2100 is timed out will be described by use of a flowchart 2200 of FIG. 22. First, the address table 309 is as shown in FIG. 41A. It is assumed that a timeout occurs at step 2201. At step 2202, a failover request is transmitted to the apparatus IP address 403 of a record in which the virtual IP address 401 is VIP1 and the state 402 is "Failover schedule" (that is, to the application processing apparatus 3 (112)) The format of the failover request is the format 2500 of FIG. 25. Here, VIP4 (2507) is the IP address of the remote information included in the transport communication information of AP1 (109). RIP4 (2508) is the apparatus IP address 403 of the address table 309 in which the virtual IP address 401 is VIP4 and the state 402 is "Active". When there is no apparatus IP address 403 of a record in which the state 402 is "Active", it is the apparatus IP address 403 of a record in which the state 402 is "Failover schedule".

At step 2203, failover completion is received from the application processing apparatus 3 (112). The format of the failover completion is the format 2510 of FIG. 25. At step 2204, "Active" is set in the state 402 of a record in which the virtual IP address 401 of the address table 309 is VIP1 (2514), and the apparatus IP address 403 is RIP3 (2515). As a result, the address table 309 becomes as shown in FIG. 41B. At step 2205, since the apparatus IP address 403 of the record in which the virtual IP address 401 of the address table 309 is VIP1 (2514), and the state 402 is Failure is RIP1, a search is made for the record in which the failure address 1711 of the address notification destination table 1710 is RIP1. The address information notification is transmitted to all reporters 1712 of the record. However, broadcast for each subnet is performed using the reporter 1712 and the subnet mask 1713. The notification is made to the plurality of reporters 1712 belonging to the same subnet by one broadcast. VIP1 and RIP3 are set in the address information notification.

Next, a description will be given of the case where the apparatus level redundancy management section 702 of the application processing apparatus 3 (112) receives the failover request at step 1912. In a failover request reception process 2210 of FIG. 22, first, at step 2211, the failover request is received. The format of the failover request is the format 2500 of FIG. 25. At step 2212, it is determined whether VIP1 (2505) is effective in the application processing apparatus 3 (112). In the example of FIG. 19, since it is already made effective at step 2014 of the packet reception process 2000 from the outside of the apparatus, shift is made to step 2118, and failover completion is transmitted to the redundancy managing apparatus 1 (114). The format of the failover completion is shown in the format 2510 of FIG. 25.

At step 2212, when VIP1 is not effective, at step 2213, VIP1 is made effective. At this time, the tunnel table 218 is as shown in FIG. 40A. At step 2214, VIP4 (2507) is set in the virtual IP address 3801 of the tunnel table 218, RIP4 (2508) is set in the apparatus IP address 3803, and "Active" is set in the state 3802. At step 2215, for example, 3600 seconds as the initial value are set in the registration period 3804. As a result, the tunnel table 218 becomes as shown in FIG. 40B. At step 2216, transmission of a heartbeat request packet is started. At step 2217, AP1 (113) is activated. Then, shift is made to step 2218.

Incidentally, at step 1117 of FIG. 11, there is also a method in which the transport communication information transmitted by the apparatus level redundancy management section 701 of the application processing apparatus 1 (108) is transmitted to the backup apparatus 1 (121), not the redundancy managing apparatus 1 (114), and the backup apparatus 1 (121) stores the transport communication information. A sequence in that case will be described below.

Figure 32:
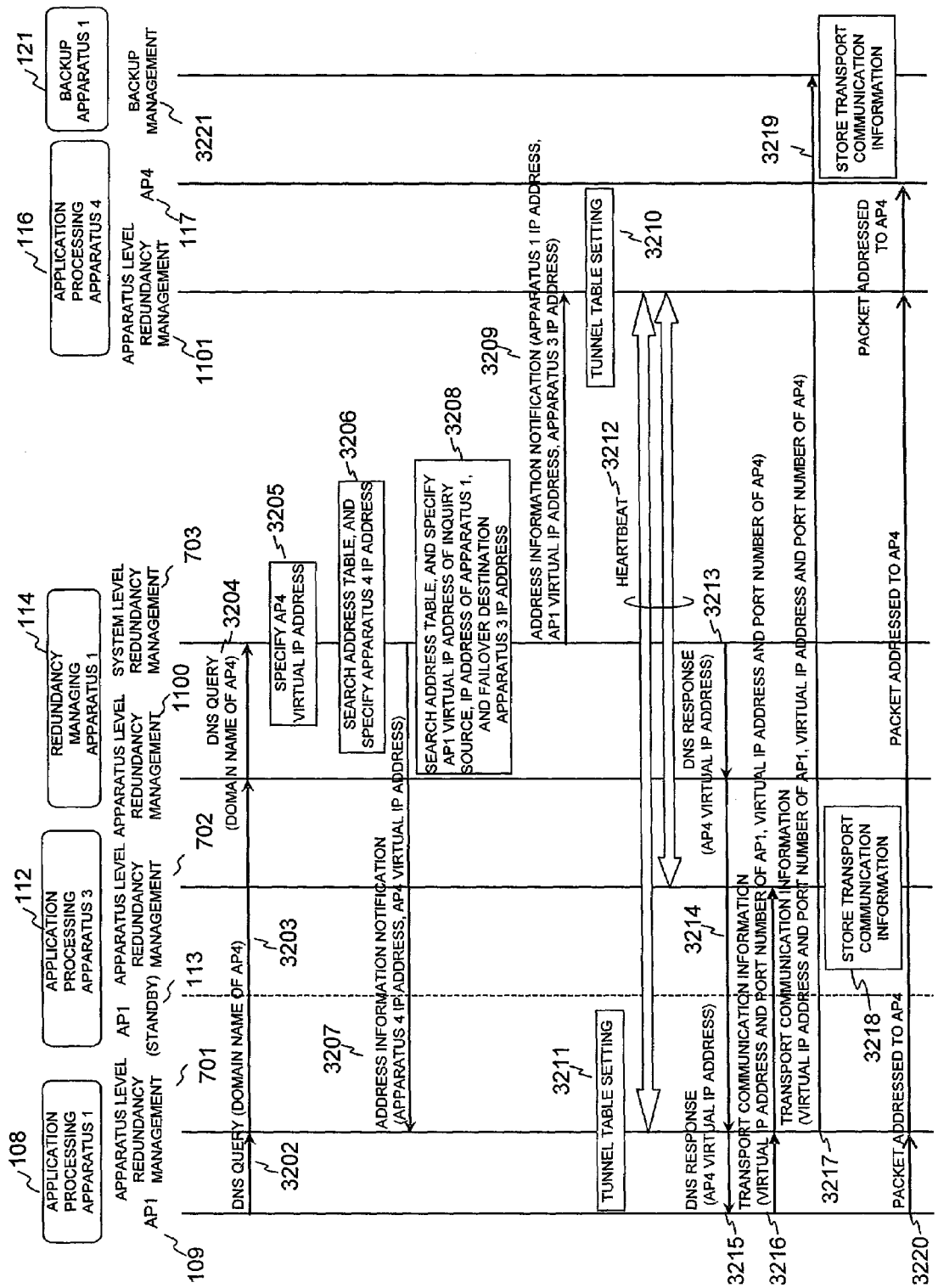
FIG. 32 is a sequence view of application communication start in a case where transport communication information is stored in a backup apparatus.

FIG. 32 is a sequence view in a case where AP1 (109) of the application processing apparatus 1 (108) starts to communicate with AP4 (117) of the application processing apparatus 4 (116).

Step 3202 to step 3216 are the same as step 1102 to step 1116 of FIG. 11. At step 3217, the apparatus level redundancy management section 701 of the application processing apparatus 1 (108) transmits the transport communication information to the backup apparatus 1 (121). A backup management section 3221 of the backup apparatus 1 (121) stores the received transport communication information (step 3219). Step 3218 and step 3220 are the same as step 1118 and step 1120 of FIG. 11.

A procedure of switching AP1 (109) to AP1 (113) of the application processing apparatus 3 (112) after AP1 (109) and AP4 (117) start to communicate with each other in this way will be described by use of FIG. 34 and FIG. 35. Incidentally, the drawing shows the example in the case where the application processing apparatus 3 (112) is not reserved as the failover destination of AP1 (109).

Figure 34:
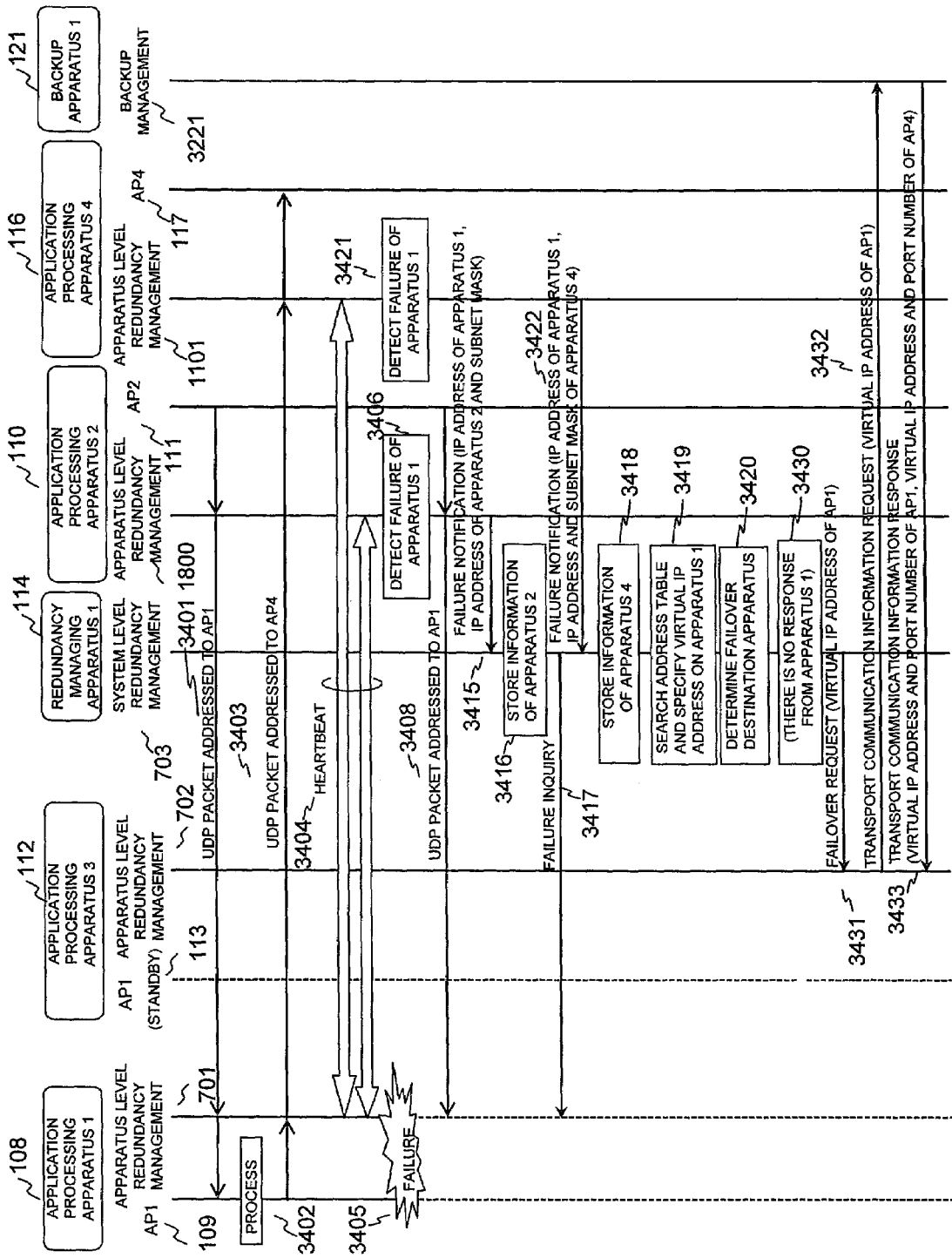
FIG. 34 is a sequence view of the first half of redundant failover in a case where transport communication information is stored in the backup apparatus.
Figure 35:
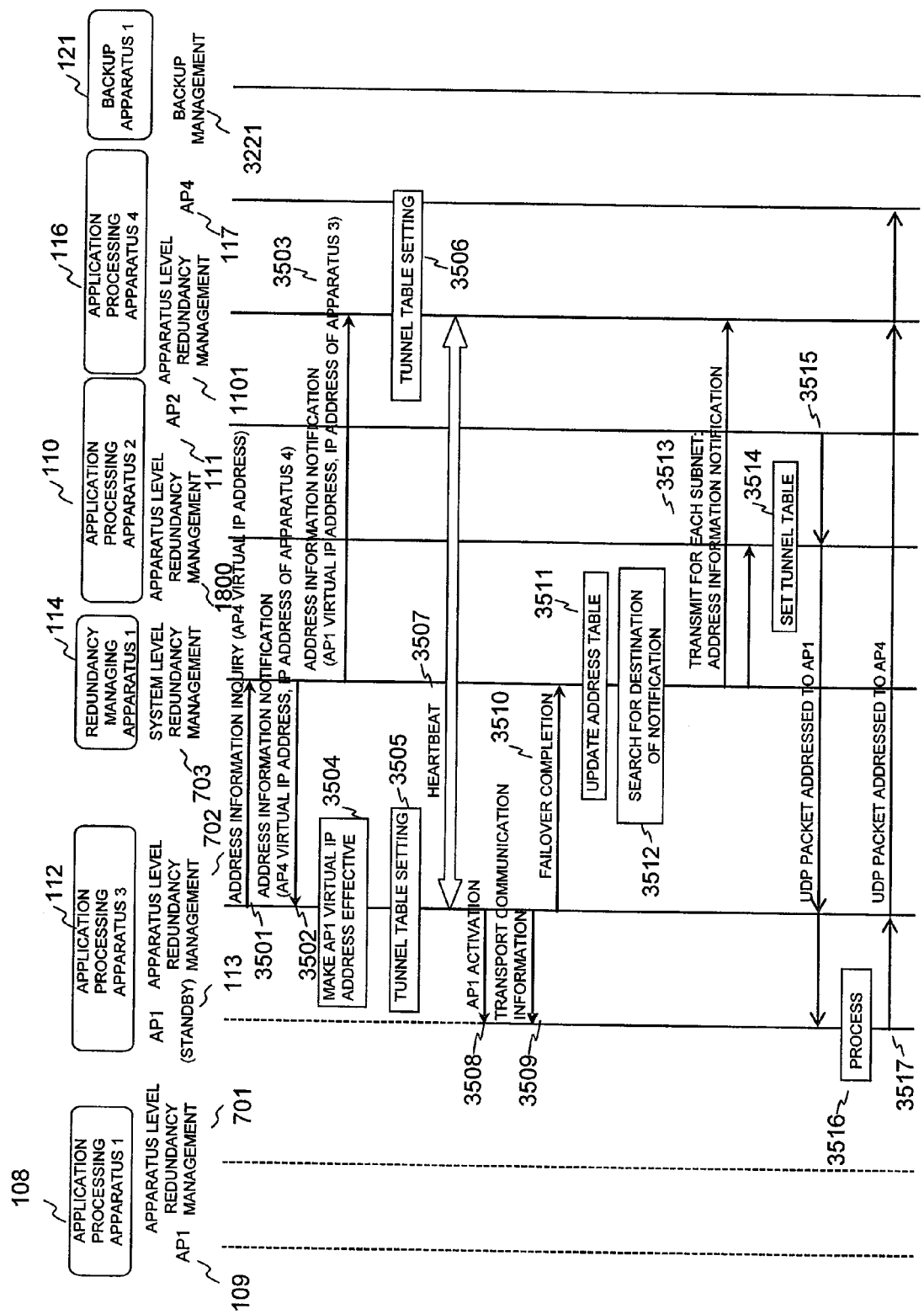
FIG. 35 is a sequence view of the latter half of the redundant failover in the case where the transport communication information is stored in the backup apparatus.

In FIG. 34, step 3401 to step 3406 are the same as step 1801 to step 1806 of FIG. 18. At step 3406, when the apparatus level redundancy management section (1800) of the application processing apparatus 2 (110) detects a failure, since the application processing apparatus 3 (112) is not registered as the failover destination in the tunnel table 218 (in FIG. 39B, there is no record in which the apparatus IP address 3803 is RIP3), a packet addressed to VIP1 transmitted by AP2 (111) is delivered only to the application processing apparatus 1 (108) (step 3408). The apparatus level redundancy management section 1800 transmits the failure notification to the system level redundancy management section 703 of the redundancy managing apparatus 1 (114) (step 3415). The system level redundancy management section 703 stores, in the address notification destination table 310, that the application processing apparatus 2 (110) reports the failure of the application processing apparatus 1 (108) (step 3416). Then, the failure inquiry is transmitted to the application processing apparatus 1 (108) (step 3417). Also in the case where the apparatus level redundancy management section 1101 of the application processing apparatus 4 (116) detects the failure (step 3421), the failure notification is transmitted to the system level redundancy management section 703 (step 3422). The system level redundancy management section 703 stores, in the address notification destination table 310, that the application processing apparatus 4 (116) reports the failure of the application processing apparatus 1 (108) (step 3418). At step 3419, the virtual IP address VIP1 of the active AP1 (109) executed by the application processing apparatus 1 (108) in which the failure appears to occur is specified by using the address table 309. Then, for example, the application processing apparatus 3 (112) is determined as the failover destination of AP1 (109) (step 3420). The address table 309 becomes as shown in FIG. 41A. Thereafter, since a response to the failure inquiry transmitted at step 3417 does not occur in a specific time period (step 3430), a failover request is transmitted to the application processing apparatus 3 (112) (step 3431). A message format of the failover request transmitted here will be described by use of the format 2500 of FIG. 25. The source address 2501 is the IP address RIP6 of the redundancy managing apparatus 1 (114). The destination address 2502 is the IP address RIP3 of the application processing apparatus 3 (112). The failover request 2503 is a message identifier. AP1 (2504) is not included. VIP1 (2505) is the address specified at step 3419. The area 2506, VIP4 (2507) and RIP4 (2508) are not included.

Return is made to FIG. 34. When receiving the failover request, the apparatus level redundancy management section 702 of the application processing apparatus 3 (112) transmits a transport communication information request to the backup apparatus 1 (121) (step 3432). VIP1 included in the failover request is set in the transport communication information request. The backup management section 3221 of the backup apparatus 1 (121) uses, as a key, VIP1 set in the transport communication information request and specifies the transport communication information stored at step 3219 of FIG. 32, that is, a set of the IP address VIP1 of AP1 (109), the transport layer port number of AP1 (109), the IP address VIP4 of AP4 (117), and the transport layer port number of AP4 (117). That is set in the transport communication information response, and is transmitted to the application processing apparatus 3 (112) (step 3433). The procedure is continued to FIG. 35.

Based on the received transport communication information, the apparatus level redundancy management section 702 of the application processing apparatus 3 (112) inquires of the redundancy managing apparatus 1 (114) about the IP address of the application processing apparatus 4 (116) which is executing AP4 (117) (step 3501). The format of the address information inquiry is the format 1020 of FIG. 10. Here, since the failover process of the application is being performed, the flag 1025 during switching and VIP1 (1026) are included. VIP1 (1026) is VIP1 (2505) received at step 3431. The reason why VIP1 (1026) is set in the address information inquiry during the failover process is to enable the redundancy managing apparatus 1 (114) to notify the correspondence between VIP1 and RIP3 (source address 1021 of address information inquiry) to the application processing apparatus 4 (116) without searching the address table 309.

The system level redundancy management section 703 of the redundancy managing apparatus 1 (114) searches the address table 309 (FIG. 41A), sets RIP4 corresponding to VIP4 into the address information notification, and transmits it to the application processing apparatus 3 (112) (step 3502). The apparatus level redundancy management section 702 of the application processing apparatus 3 (112) makes VIP1 effective (step 3504). Further, a pair of VIP4 and RIP4 is set in the tunnel table 218 (step 3505). As a result, the tunnel table 218 becomes as shown in FIG. 40B. On the other hand, the system level redundancy management section 703 transmits the source address (1021) of the address information inquiry received at step 3501, that is, the pair of RIP3 and VIP1 (1026) to the application processing apparatus 4 (116) (step 3503). The apparatus level redundancy management section (1101) of the application processing apparatus 4 (116) sets the pair of VIP1 and RIP3 in the tunnel table 218 (step 3506). Then, heartbeat communication starts (step 3507).

The execution of step 3503 as stated above is intended to conform to the flow in which the redundancy managing apparatus 1 (114) transmits the address information notification to the application processing apparatus 4 (116) in response to the address information inquiry at step 3607 of FIG. 36. Accordingly, when the policy of the conforming is not adopted, step 3503 may not be performed. In this case, similarly to FIG. 19, the tunnel table setting process (step 3506) of the application processing apparatus 4 (116) is performed after step 3513.

The apparatus level redundancy management section 702 of the application processing apparatus 3 (112) activates AP1 (113) at step 3508. Then, the failover completion is transmitted to the redundancy managing apparatus 1 (114) (step 3510). The message format of the failover completion is the format 2510. The system level redundancy management section 703 of the redundancy managing apparatus 1 (114) sets VIP1 (2514), RIP3 (2515) and M3 (2516) in the address table 309 at step 3511. As a result, the address table 309 becomes as shown in FIG. 41B.

Step 3512 and step 3513 are the same as step 1914 and step 1915 of FIG. 19. VIP1 and RIP3 are set in the address information notification. At step 3514, the apparatus level redundancy management section 1800 of the application processing apparatus 2 (110) sets a pair of VIP1 and RIP3 in the tunnel table 218. As a result, in FIG. 39C, there occurs a state where there is no record in which the apparatus IP address 3803 is RIP1. From the above, a UDP packet transmitted by AP2 (111) is encapsulated into a packet addressed to the application processing apparatus 3 (112) (step 3515).

On the other hand, AP1 (113) captures the transport communication information received from the backup apparatus 1 (121) at step 3433 of FIG. 34 (step 3509), and prepares for communication with AP4 (117). When this is completed, the process of a UDP packet from AP2 (111) is started (step 3516), and the UDP packet is started to be transmitted to AP4 (117) (step 3517).

Figure 23:
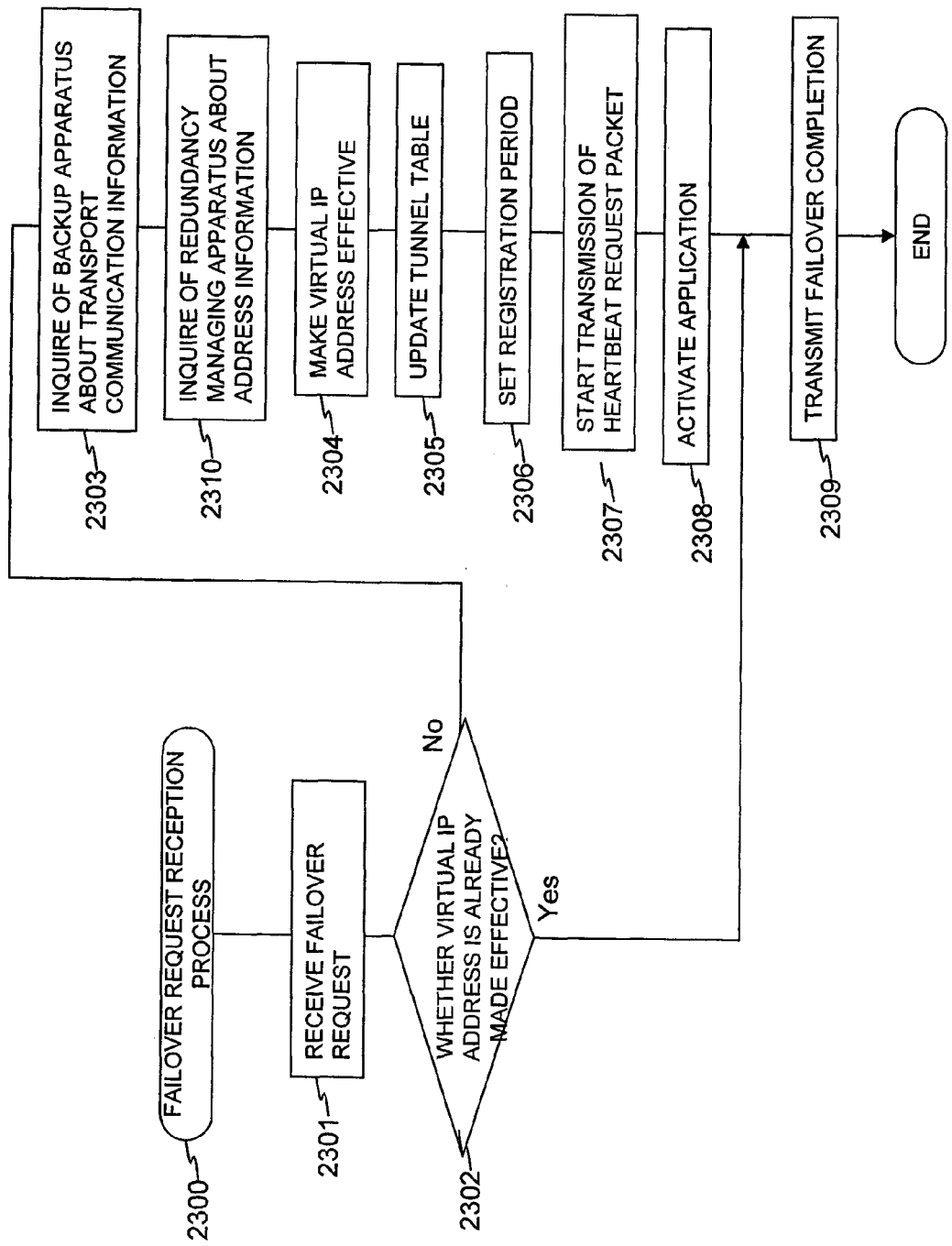
FIG. 23 is a flowchart of a failover request reception process in a case where communication partner information is acquired from a backup apparatus.

Next, a process in the case where the apparatus level redundancy management section 702 of the application processing apparatus 3 (112) receives the failover request at step 3431 will be described by use of FIG. 23.

Although a failover request reception process 2300 is almost the same as the failover request reception process 2210, the differences are that in the failover request reception process 2300, at step 2303, an inquiry is made to the backup apparatus 1 (121) about the transport communication information, and further, at step 2310, an inquiry is made to the redundancy managing apparatus 1 (114) about the address information of the communication partner application for setting in the tunnel table 218.

As stated above, one of the features of this embodiment is that when redundant failover is performed during the communication of an application, even if the application does not transmit a packet to a communication partner application, the tunnel table can be set.

Besides, one of the features of this embodiment is that when the tunnel table is set by the application processing apparatus of failover destination, the IP address of the application processing apparatus corresponding to the virtual IP address of the communication partner is not notified from the application processing apparatus of the failover source, but is inquired to the redundancy managing apparatus. Even if the IP address of the application processing apparatus of the communication partner, together with the transport communication information, is acquired from the failover source, when a failure occurs also in the communication partner at the time point when the redundant failover occurs, the acquired information must not be set in the tunnel table. Thus, newest information at the time point when redundant failover is performed is inquired to the redundancy managing apparatus for collectively managing the correspondence between the virtual IP address in the independent wireless system and the IP address of the application processing apparatus.

Hereinafter, a case where a TCP application is switched will be described.

Figure 27:
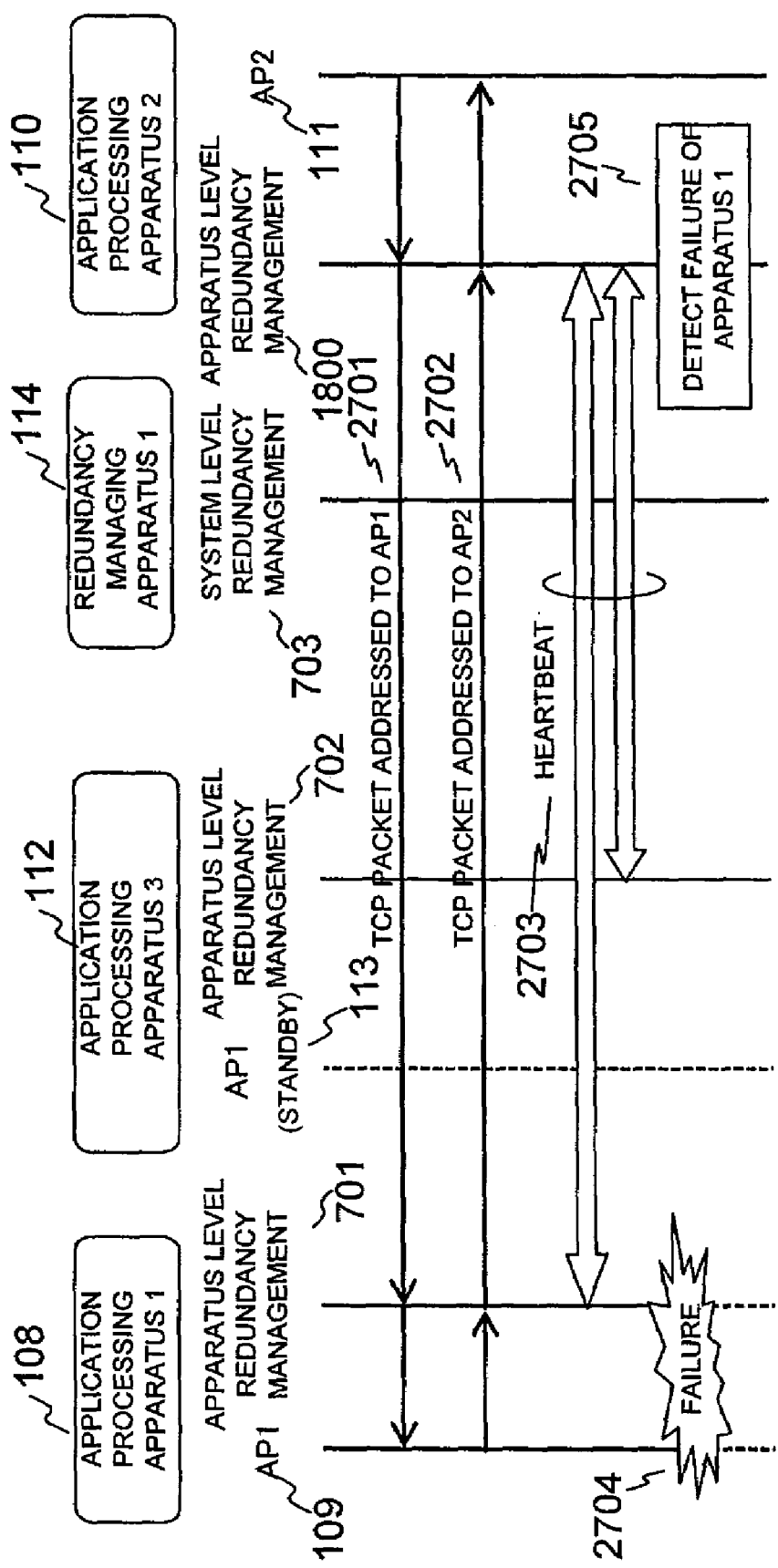
FIG. 27 is a sequence view of the first half of redundant failover of a TCP application.
Figure 28:
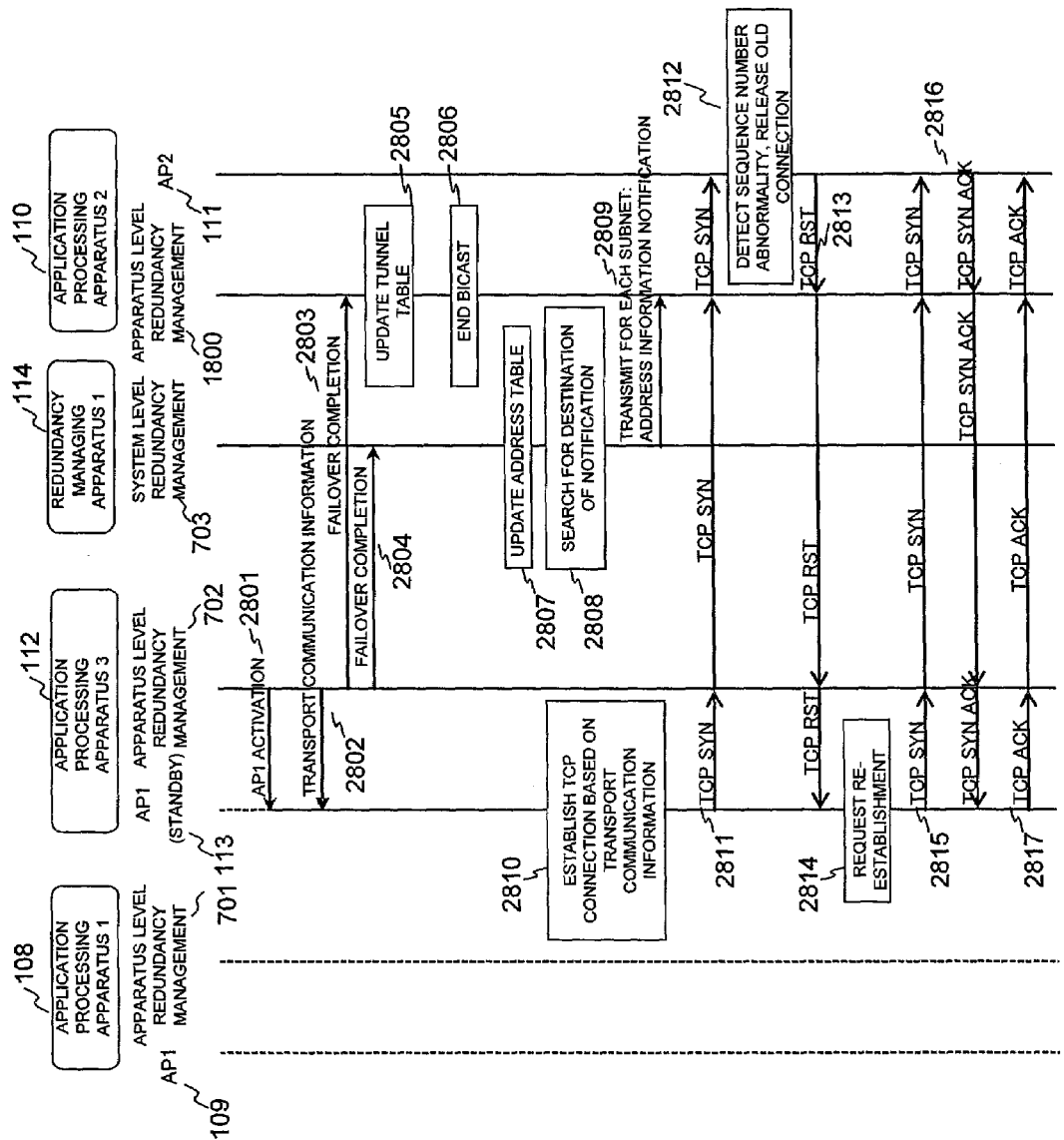
FIG. 28 is a sequence view of the latter half of the redundant failover of the TCP application.

FIG. 27 and FIG. 28 are sequence views of redundant failover of the TCP application.

First, FIG. 27 will be described. In this example, AP1 (109) of the application processing apparatus 1 (108) establishes a TCP connection with AP2 (111) of the application processing apparatus 2 (110), and mutually transmits and receives a TCP packet (step 2701, step 2702). With respect to the virtual IP address VIP1 of AP1 (109), the IP address RIP1 of the application processing apparatus 1 (108) and the IP address RIP3 of the application processing apparatus 3 (108) are registered in the tunnel table 218 of the apparatus level redundancy management section (1800) of the application processing apparatus 2 (110). Accordingly, the apparatus level redundancy management section (1800) performs heartbeat communication with each of the application processing apparatus 1 (108) and the application processing apparatus 3 (112). In this state, when a failure occurs in the application processing apparatus 1 (108) (step 2704), the apparatus level redundancy management section (1800) detects the failure of the application processing apparatus 1 (108) from the interruption of the heartbeat response from the application processing apparatus 1 (108) (step 2705). Thereafter, the same procedure as that from step 1807 (bicast start) of FIG. 18 to step 1904 (AP1 activation) of FIG. 19 is performed, and is continued to FIG. 28 (step 2801 of FIG. 28 corresponds to step 1904). Subsequent steps 2802, 2803, 2804, 2805, 2806, 2807, 2808 and 2809 are respectively the same as steps 1905, 1909, 1910, 1916, 1917, 1913, 1914 and 1915. AP1 (113) of the application processing apparatus 3 (112) starts to establish a TCP connection with AP2 (111) based on the transport communication information at step 2810. At step 2811, AP1 (113) transmits a TCP SYN packet to perform connection establishment. Although AP2 (111) recognizes the TCP SYN packet as the packet relating to the connection with AP1 (109), since the TCP sequence number is abnormal, the connection is released (step 2812). Then, a TCP RST packet is transmitted to AP1 (113) (step 2813). When the connection is released, AP1 (113) again establishes a connection (step 2814). A TCP SYN packet for that is transmitted (step 2815). AP2 (111) normally receives the TCP SYN packet, and transmits a TCP SYN ACK packet (step 2816). AP1 (113) transmits a TCP ACK packet to AP2 (111), and re-establishment of the TCP connection is completed (step 2817).

Figure 26:
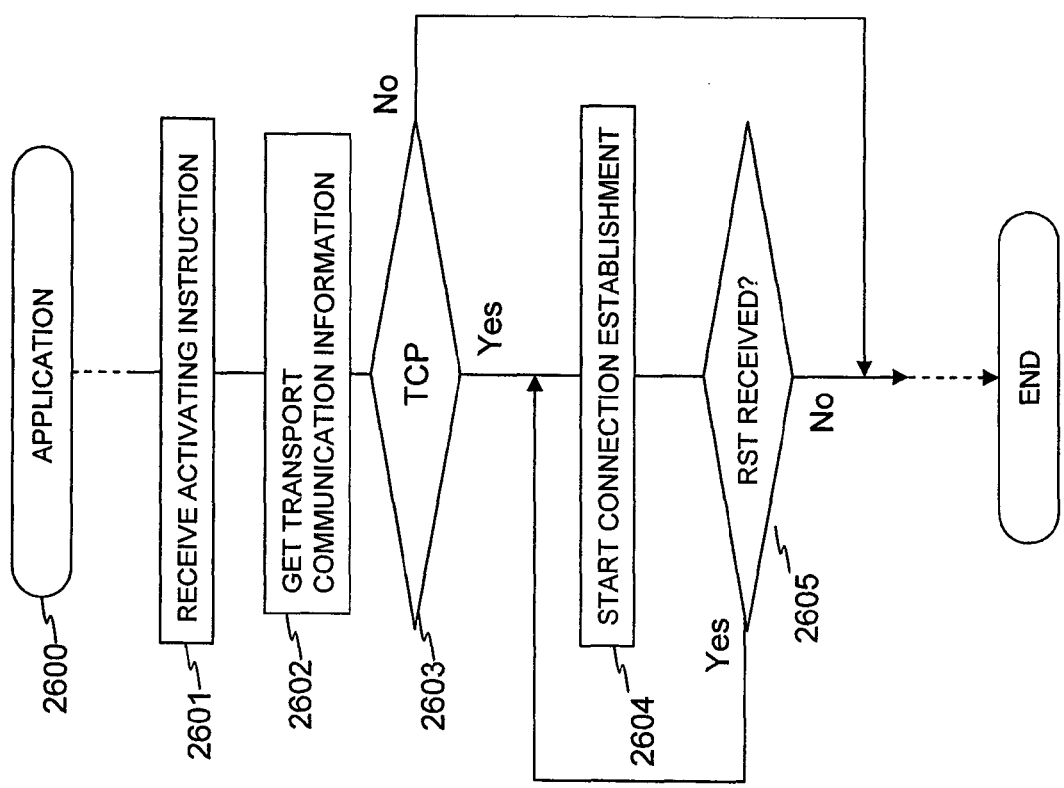
FIG. 26 is a flowchart of an application activation process.

FIG. 26 shows the flowchart of AP1 (113). When an activation instruction is received from the apparatus level redundancy management section (702) (step 2601), an application 2600 captures transport communication information (step 2602). Although the protocol is UDP in the example of the area 1516 of FIG. 15, this is TCP in the transport communication information captured by the TCP application. Thus, according to the determination at step 2603, shift is made to step 2604. Here, establishment of the TCP connection is started based on the transport communication information, that is, its own address VIP1, port number, address VIP2 of communication partner, and port number thereof. At step 2605, the reception of the TCP RST packet from the communication partner (that is, connection release) is determined, and when it is received, return is made to step 2604. Incidentally, at step 2603, when the protocol is UDP, a connection is not required, and accordingly, the process of steps 2604 and 2605 is skipped.

As stated above, in this embodiment, since the TCP application in which the failover is performed takes the lead in the re-establishment of the connection, even in the case where many connection re-establishments are required, they can be sequentially performed. When the connection re-establishment is performed from the communication partner application, not the TCP application in which the failover is performed, there is a case where re-establishment requests are concentrated in a short time, and an influence is exerted on smooth processing execution of the application processing apparatus of the failover destination.

Finally, redundant failover of the redundancy managing apparatus 1 (114) will be described. In a sequence view of FIG. 29, the redundancy managing apparatus 1 (114) is active. The redundancy managing apparatus 2 (118) is on standby. The address tables 309 of both the apparatuses are as shown in FIG. 4. Thus, heartbeat communication is performed between the system level redundancy management section (703) of the redundancy managing apparatus 1 (114) and the system level redundancy management section (2900) of the redundancy managing apparatus 2 (118) (step 2901). When update of the address table 309 occurs in the redundancy managing apparatus 1 (114) (step 2902), the address table update notification is transmitted to the redundancy managing apparatus 2 (118) (step 2903). The system level redundancy management section (2900) reflects the received update content to its own address table 309 (step 2904). Then, an address table update notification response is transmitted (step 2905). When a failure occurs in the redundancy managing apparatus 1 (114) (step 2906), the redundancy managing apparatus 2 (118) detects the failure by the interruption of the heartbeat response (step 2907). The redundancy managing apparatus 2 (118) itself becomes active, and notifies RIP7 as the apparatus address corresponding to VIP6 to the application processing apparatus in the independent wireless system (step 2908). In this case, the redundancy managing apparatus 2 (118) transmits the address information notification in subnet units based on the apparatus IP address 403 of the address table 309 and the subnet mask 404. In the application processing apparatus 1 (108), the state 3802 of the tunnel table 218 in which the virtual IP address 3801 is VIP6 and the apparatus IP address 3803 is RIP7 is made Active, and the state 3802 of the table in which the virtual IP address 3801 is VIP6 and the apparatus IP address 3803 is RIP6 is made Standby (step 2909).

Figure 29:
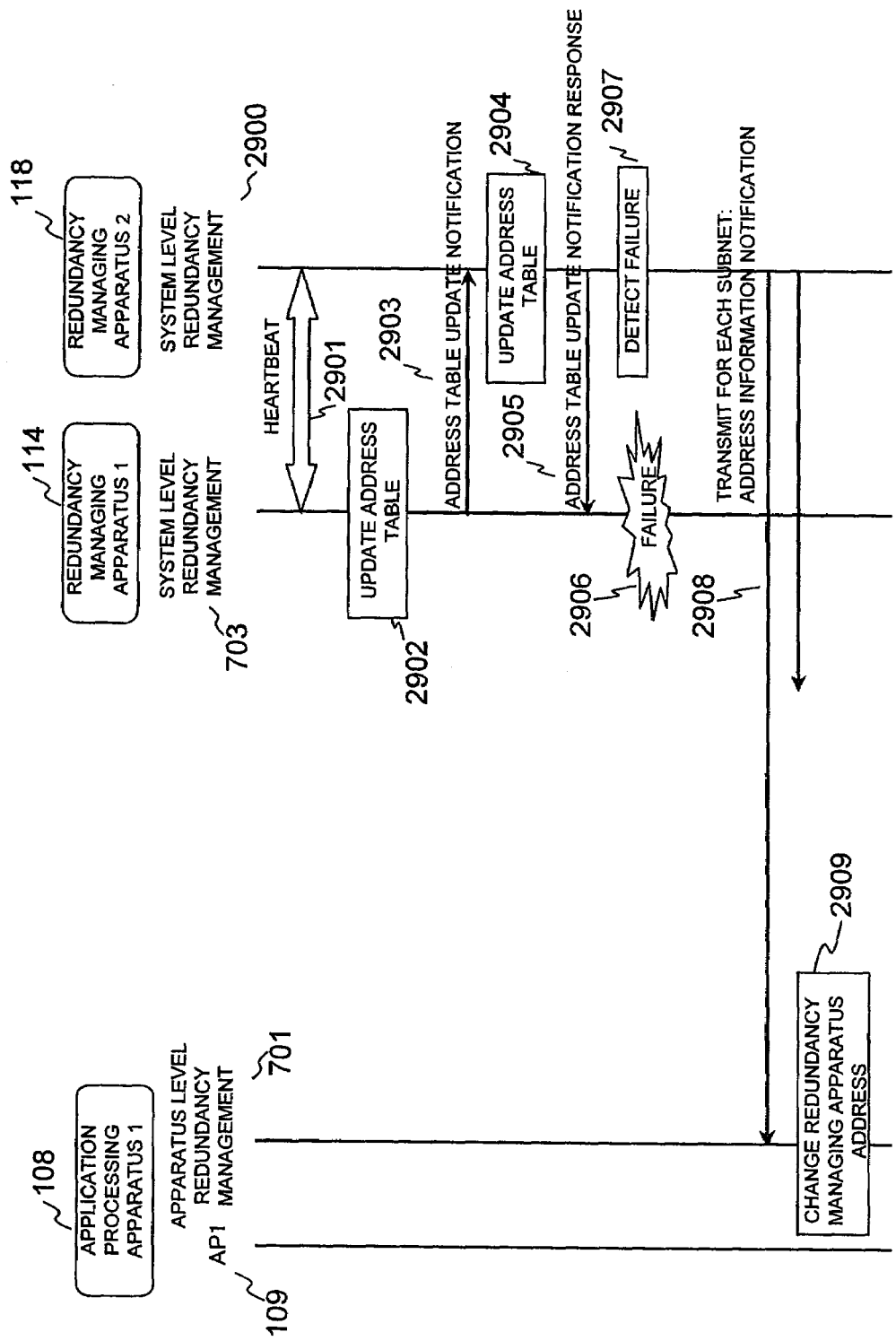
FIG. 29 is a sequence view of redundant failover of a redundancy managing apparatus.
Figure 30:
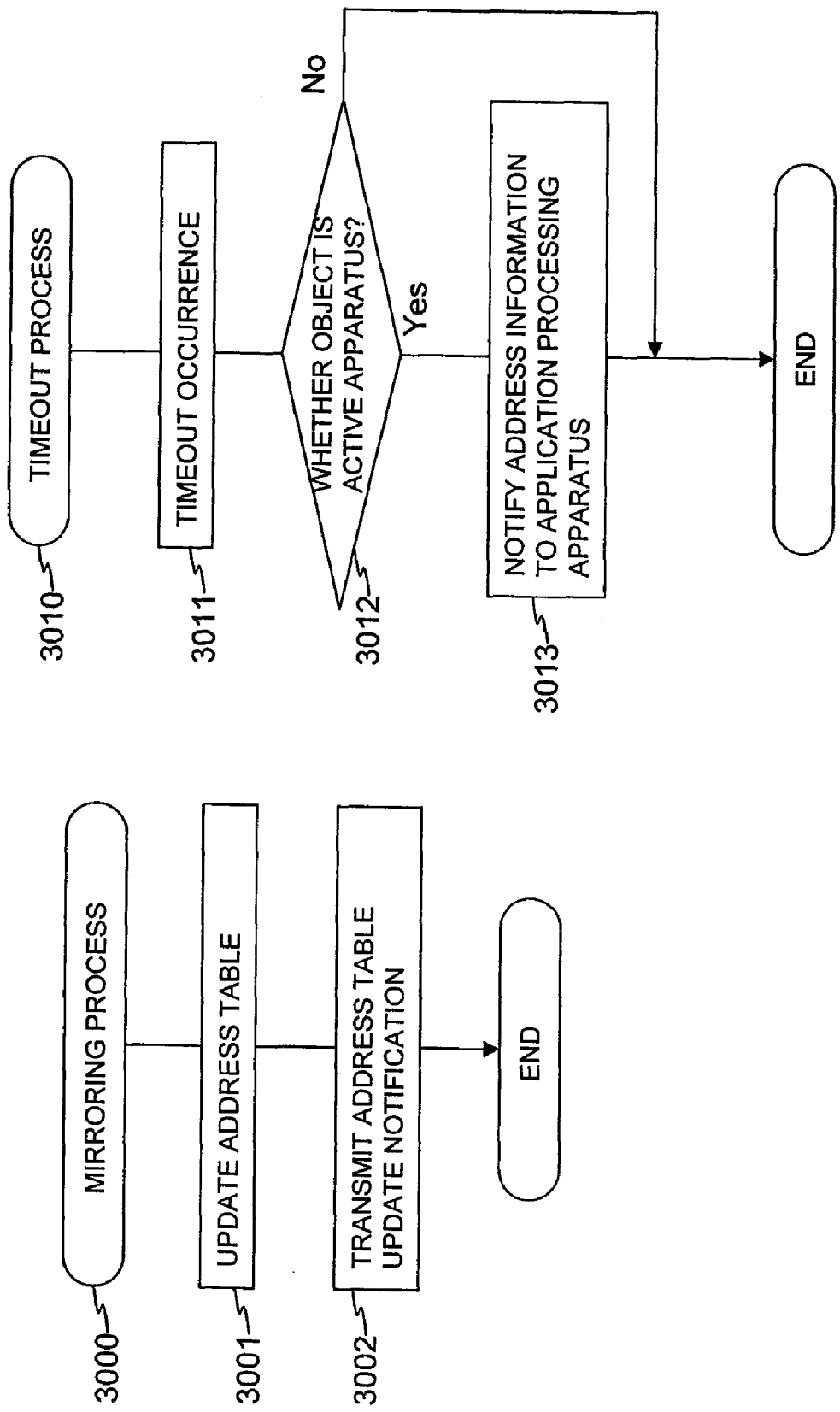
FIG. 30 is a flowchart of a mirroring process and a timeout process.

A mirroring process 3000 of FIG. 30 is executed by the system level redundancy management section 703 of the redundancy managing apparatus 1 (114) of FIG. 29. At step 3001, when some change is made to the address table (step 3001), the change content is set in the address table update notification, and is transmitted to the redundancy managing apparatus 2 (118) (step 3002).

A timeout process 3010 of FIG. 30 is executed by a system level redundancy management section (2900) of the redundancy managing apparatus 2 (118) of FIG. 29. At step 3011, when a timer waiting for a heartbeat response is timed out, it is determined whether the timeout object is an active redundancy managing apparatus (step 3012). In the case of Yes, the address information notification is transmitted to the application processing apparatus in the independent wireless system (step 3013). In the case of No in the determination of step 3012, the process is ended.

(Structure Example 1)

In one of redundant failover systems of the embodiment, for example, backup information is transmitted to a redundancy managing apparatus.

For example, in a redundant failover system for continuing communication between applications in an independent wireless system in which a plurality of application processing apparatuses and redundancy managing apparatuses are connected by an IP network, and the applications executed by the plurality of application processing apparatuses cooperate with each other to perform communication control of an independent mobile station, each of the application processing apparatuses includes an application, a tunnel table, a packet transfer processing section, a tunnel table management section and an application communication information notification section, the tunnel table stores a correspondence between a virtual IP address of a communication partner application of the application and an IP address of an application processing apparatus (called a communication partner application processing apparatus) to execute the communication partner application, the packet transfer processing section refers to the tunnel table to change a packet transmitted to the virtual IP address of the communication partner application by the application into a packet addressed to the IP address of the communication partner application processing apparatus and transmits it, the tunnel table management section updates the correspondence between the virtual IP address of the communication partner application and the IP address of the communication partner application processing apparatus, which is stored in the tunnel table, the application communication information notification section notifies the virtual IP address of the communication partner application to the redundancy managing apparatus, the redundancy managing apparatus includes an address table, a failover determination section, and a tunnel table update instruction section, the address table stores a correspondence between an IP address of an application processing apparatus in the redundant failover system and a virtual IP address of an application executed by the application processing apparatus, the failover determination section determines another application processing apparatus (called a failover destination application processing apparatus) for executing the application, which is executed by the application processing apparatus, instead of the application processing apparatus, and instructs the failover destination application processing apparatus to start an application process, the tunnel table update instruction section refers to the address table, and notifies the correspondence between the virtual IP address of the communication partner application notified from the application communication information notification section and the IP address of the communication partner application processing apparatus to the failover destination application processing apparatus, when the failover destination application processing apparatus is instructed to start the application process by the failover determination section, a process of the same application as the application is started, even if the application does not transmit a packet to the virtual IP address of the communication partner application, the tunnel table management section of the failover destination application processing apparatus sets the correspondence between the virtual IP address of the communication partner application and the IP address of the communication partner application processing apparatus, which is notified from the redundancy managing apparatus, into the tunnel table.

(Structure Example 2)

In the other one of the redundant failover systems of the embodiment, for example, backup information is transmitted to a failover schedule destination.

For example, in a redundant failover system for continuing communication between applications in an independent wireless system in which a plurality of application processing apparatuses and redundancy managing apparatuses are connected by an IP network, and the applications executed by the plurality of application processing apparatuses cooperate with each other to perform communication control of an independent mobile station, each of the application processing apparatuses includes an application, a tunnel table, a packet transfer processing section, a tunnel table management section and an application communication information notification section, the tunnel table stores a correspondence between a virtual IP address of a communication partner application of the application and an IP address of an application processing apparatus (called a communication partner application processing apparatus) to execute the communication partner application, the packet transfer processing section refers to the tunnel table to change a packet transmitted to the virtual IP address of the communication partner application by the application into a packet addressed to the IP address of the communication partner application processing apparatus and transmits it, the tunnel table management section updates the correspondence between the virtual IP address of the communication partner application and the IP address of the communication partner application processing apparatus, which is stored in the tunnel table, the application communication information notification section notifies the virtual IP address of the communication partner application to an application processing apparatus (called a failover destination application processing apparatus) which is scheduled to execute the application instead of the application processing apparatus, a redundancy managing apparatus includes an address table, a failover determination section, and a tunnel table update instruction section, the address table stores a correspondence between an IP address of an application processing apparatus in the redundant failover system and a virtual IP address of an application executed by the application processing apparatus, the failover determination section instructs the failover destination application processing apparatus to start an application process, the tunnel table update instruction section refers to the address table, and notifies the correspondence between the virtual IP address of the communication partner application and the IP address of the communication partner application processing apparatus to the failover destination application processing apparatus, when the failover destination application processing apparatus is instructed to start the application process by the failover determination section, a process of the same application as the application is started, even if the application does not transmit a packet to the virtual IP address of the communication partner application, the tunnel table management section of the failover destination application processing apparatus sets the correspondence between the virtual IP address of the communication partner application and the IP address of the communication partner application processing apparatus, which is notified from the tunnel table update instruction section, into the tunnel table.

(Structure Example 3)

In the other one of the redundant failover systems of the embodiment, for example, backup information is transmitted to a backup apparatus.

For example, in a redundant failover system for continuing communication between applications in an independent wireless system in which a plurality of application processing apparatuses and redundancy managing apparatuses are connected by an IP network, and the applications executed by the plurality of application processing apparatuses cooperate with each other to perform communication control of an independent mobile station, each of the application processing apparatuses includes an application, a tunnel table, a packet transfer processing section, a tunnel table management section and an application communication information notification section, the tunnel table stores a correspondence between a virtual IP address of a communication partner application of the application and an IP address of an application processing apparatus (called a communication partner application processing apparatus) to execute the communication partner application, the packet transfer processing section refers to the tunnel table to change a packet transmitted to the virtual IP address of the communication partner application by the application into a packet addressed to the IP address of the communication partner application processing apparatus and transmits it, the tunnel table management section updates the correspondence between the virtual IP address of the communication partner application and the IP address of the communication partner application processing apparatus, which is stored in the tunnel table, the application communication information notification section notifies the virtual IP address of the communication partner application to a backup apparatus, the backup apparatus stores the virtual IP address of the communication partner application notified by the application communication information notification section, the virtual IP address of the communication partner application is notified to an application processing apparatus (called a failover destination application processing apparatus) scheduled to execute the application instead of the application processing apparatus, a redundancy managing apparatus includes an address table, a failover determination section, and a tunnel table update instruction section, the address table stores a correspondence between an IP address of an application processing apparatus in the redundant failover system and a virtual IP address of an application executed by the application processing apparatus, the failover determination section instructs the failover destination application processing apparatus to start an application process, the tunnel table update instruction section refers to the address table, and notifies the correspondence between the virtual IP address of the communication partner application and the IP address of the communication partner application processing apparatus to the failover destination application processing apparatus, when the failover destination application processing apparatus is instructed to start the application process by the failover determination section, a process of the same application as the application is started, even if the application does not transmit a packet to the virtual IP address of the communication partner application, the tunnel table management section of the failover destination application processing apparatus sets the correspondence between the virtual IP address of the communication partner application notified from the backup apparatus and the IP address of the communication partner application processing apparatus into the tunnel table.

(Structure Example 4)

In the other one of the redundant failover systems of the embodiment, for example, backup information is transmitted to a failover schedule destination and the failover schedule destination determines failover.

For example, in a redundant failover system for continuing communication between applications in an independent wireless system in which a plurality of application processing apparatuses and redundancy managing apparatuses are connected by an IP network, and the applications executed by the plurality of application processing apparatuses cooperate with each other to perform communication control of an independent mobile station, each of the application processing apparatuses includes an application, a tunnel table, a packet transfer processing section, a tunnel table management section and an application communication information notification section, the tunnel table stores a correspondence between a virtual IP address of a communication partner application of the application and an IP address of an application processing apparatus (called a communication partner application processing apparatus) to execute the communication partner application, the packet transfer processing section refers to the tunnel table to change a packet transmitted to the virtual IP address of the communication partner application by the application into a packet addressed to the IP address of the communication partner application processing apparatus and transmits it, the tunnel table management section updates the correspondence between the virtual IP address of the communication partner application and the IP address of the communication partner application processing apparatus, which is stored in the tunnel table, the application communication information notification section notifies the virtual IP address of the communication partner application to an application processing apparatus (called a failover destination application processing apparatus) scheduled to execute the application instead of the application processing apparatus, a redundancy managing apparatus includes an address table and a tunnel table update instruction section, the address table stores a correspondence between an IP address of an application processing apparatus in the redundant failover system and a virtual IP address of an application executed by the application processing apparatus, the tunnel table update instruction section refers to the address table, and notifies the correspondence between the virtual IP address of the communication partner application and the IP address of the communication partner application processing apparatus to the failover destination application processing apparatus, the packet transfer processing section of an application processing apparatus (called a transmission source application processing apparatus) to execute a transmission source application changes a packet transmitted by the application (called the transmission source application) to the virtual IP address of the application into a packet addressed to the IP address of the failover destination application processing apparatus, when the failover destination application processing apparatus receives the changed packet, and when a destination address (that is, the virtual IP address of the application) at a time when the transmission source application transmits is not effective in the failover destination application processing apparatus, an inquiry is made to the redundancy managing apparatus about the IP address of the communication partner application processing apparatus corresponding to the virtual IP address of the communication partner application notified from the application communication information notification section of the application processing apparatus, even if the application does not transmit a packet to the virtual IP address of the communication partner application on the failover destination application processing apparatus, the tunnel table management section of the failover destination application processing apparatus sets the correspondence between the virtual IP address of the communication partner application and the IP address of the communication partner application processing apparatus, which is notified from the tunnel table update instruction section, into the tunnel table.

Besides, in each of the foregoing redundant failover systems, the application communication information notification section of the application processing apparatus notifies transport communication information including the virtual IP address of the communication partner application, a transport layer port number of the communication partner application, the virtual IP address of the application, and a transport layer port number of the application to the redundancy managing apparatus, and the tunnel table update instruction section of the redundancy managing apparatus notifies the transport communication information to the failover destination application processing apparatus.

Besides, in each of the foregoing redundant failover systems, the application communication information notification section of the application processing apparatus notifies transport communication information including the virtual IP address of the communication partner, application, a transport layer port number of the communication partner application, the virtual IP address of the application, and a transport layer port number of the application to the failover destination application processing apparatus.

Besides, in each of the foregoing redundant failover systems, a backup apparatus connected through the IP network to the plurality of application processing apparatuses and the redundancy managing apparatuses is provided, the application communication information notification section of the application processing apparatus notifies transport communication information including the virtual IP address of the communication partner application, a transport layer port number of the communication partner application, the virtual IP address of the application, and a transport layer port number of the application to the backup apparatus, and the backup apparatus notifies the transport communication information to the failover destination application processing apparatus.

Besides, in each of the foregoing redundant failover systems, when a connection is closed by reception or transmission of a reset packet of a connection-oriented transport protocol, the application transmits an establishment request packet for establishing a connection identified by transport communication information relating to the closed connection and including a transport layer port number of the application, a virtual IP address of the application, a transport layer port number of the communication partner application, and a virtual IP address of the communication partner application.

In general, there are many systems in which a connection start side randomly selects its own port number. In this case, when a connection is established by a new port number after failover, the application of the communication partner determines which connection before the failover is switched based on information of a higher layer, not the port number, and intentionally closes the connection before the failover.

Besides, in each of the foregoing redundancy managing apparatuses, the application processing apparatus transmits a confirmation packet for confirming IP reachability to the communication partner application processing apparatus, when the communication partner application processing apparatus fails to receive the confirmation packet, the communication partner application processing apparatus notifies the IP address of the application processing apparatus to the redundancy managing apparatus, or refers to the tunnel table and notifies the virtual IP address of the application corresponding to the IP address of the application processing apparatus to the redundancy managing apparatus, when the correspondence between the virtual IP address of the application and the IP address of the application processing apparatus to execute the application is received from the redundancy managing apparatus, even if the communication partner application does not transmit a packet to the virtual IP address of the application, the tunnel table management section of the communication partner application processing apparatus sets, in the tunnel table, the correspondence between the virtual IP address of the application and the IP address of the application processing apparatus to execute the application.

Besides, in each of the foregoing redundant failover systems, when failing to receive the confirmation packet, the communication partner application processing apparatus notifies subnet information of the communication partner application processing apparatus to the redundancy managing apparatus, the tunnel table update instruction section of the redundancy managing apparatus refers to the address table, and broadcasts the correspondence between the virtual IP address of the application and the IP address of the application processing apparatus to execute the application to a subnet of the communication partner application processing apparatus.

Besides, in each of the redundant failover systems, the application communication information notification section of the application processing apparatus notifies the virtual IP address of the communication partner application and the virtual IP address of the application or the IP address of the application processing apparatus to the redundancy managing apparatus, the tunnel table update instruction section of the redundancy managing apparatus refers to the address table, and notifies the correspondence between the virtual IP address of the application and the IP address of the application processing apparatus to the communication partner application processing apparatus corresponding to the virtual IP address of the communication partner application notified from the application communication information notification section, even if the communication partner application does not transmit a packet to the virtual IP address of the application, the tunnel table management section of the communication partner application processing apparatus sets, in the tunnel table, the correspondence between the virtual IP address of the application and the IP address of the application processing apparatus, which is notified from the tunnel table update instruction section.

Besides, in each of the redundant failover systems, the application of the application processing apparatus transmits a DNS query for inquiring about the virtual IP address corresponding to a domain name of the communication partner application to the redundancy managing apparatus, the redundancy managing apparatus includes an address resolution section to identify the virtual IP address corresponding to the domain name of the communication partner application, the tunnel table update instruction section refers to the address table, notifies the correspondence between the virtual IP address of the communication partner application identified by the address resolution section and the IP address of the communication partner application processing apparatus to execute the communication partner application to the application processing apparatus, refers to the address table, and notifies the correspondence between the virtual IP address of the application and the IP address of the application processing apparatus to the communication partner application processing apparatus, even if the application does not transmit a packet to the virtual IP address of the communication partner application, the tunnel table management section of the application processing apparatus sets, in the tunnel table, the correspondence between the virtual IP address of the communication partner application and the IP address of the communication partner application processing apparatus, which is notified from the redundancy managing apparatus, even if the communication partner application does not transmit a packet to the virtual IP address of the application, the tunnel table management section of the communication partner application processing apparatus sets, in the tunnel table, the correspondence between the virtual IP address of the application and the IP address of the application processing apparatus, which is notified from the redundancy managing apparatus.

Besides, in each of the redundant failover systems, when the tunnel table management section of the application processing apparatus deletes the correspondence between the virtual IP address of the communication partner application and the IP address of the communication partner application processing apparatus from the tunnel table, the tunnel table management section deletes DNS cash information corresponding to the virtual IP address of the communication partner application.

Besides, in each of the redundant failover systems, the application performs connection-oriented communication with the plurality of communication partner applications, when the application processing apparatus to execute the application is switched, the application starts re-establishment of a communication connection between the application and the plurality of communication partner applications.

When the communication partner starts re-establishment, the re-establishment process is concentrated in the switched application. This can be prevented.

Besides, in each of the redundant failover systems, the application processing apparatus transmits a confirmation packet for confirming IP reachability to the communication partner application processing apparatus stored in the tunnel table, and the communication partner application processing apparatus having received the confirmation packet transmits a confirmation packet for confirming the IP reachability to the application processing apparatus of a transmission source of the confirmation packet.

Besides, in each of the redundant failover systems, when the address table is updated, the redundancy managing apparatus notifies change content of the address table to another redundancy managing apparatus, the another redundancy managing apparatus transmits and receives a confirmation packet for confirming IP reachability to and from the redundancy managing apparatus, and when the another redundancy managing apparatus fails to receive the confirmation packet, the IP address of the another redundancy managing apparatus is notified to the application processing apparatus.

The present invention can be used in, for example, a communication system using an IP tunnel for communication between application processing apparatuses.

What is claimed is:

1. A redundant failover system for switching an application processing apparatus to execute a first application in a communication system which comprises a plurality of application processing apparatuses including a failover source application processing apparatus to execute the first application, a failover destination application processing apparatus to execute the first application instead of the failover source application processing apparatus, and a communication partner application processing apparatus to communicate with the failover source application processing apparatus and the failover destination application processing apparatus, a redundancy managing apparatus and a backup apparatus, and in which respective applications executed by the plurality of application processing apparatuses perform communication control, wherein each of the failover source application processing apparatus and the failover destination application processing apparatus includes a memory storing the first application and tunnel information, and a packet transfer processing section, the tunnel information includes a correspondence between a virtual IP address of a second application executed by the communication partner application processing apparatus and an IP address of the communication partner application processing apparatus, the packet transfer processing section refers to the tunnel information to change a packet addressed to the virtual IP address of the second application from the first application into a packet addressed to the IP address of the communication partner application processing apparatus and transmits the packet to the communication partner application processing apparatus, the failover source application processing apparatus further includes an application communication information notification section to notify the virtual IP address of the second application to the backup apparatus, the backup apparatus stores the virtual IP address of the second application notified from the application communication information notification section, and notifies the virtual IP address of the second application to the failover destination application processing apparatus, the redundancy managing apparatus includes a memory storing address information and a tunnel information update instruction section, the address information includes correspondences between IP addresses of the plurality of application processing apparatuses in the redundant failover system and virtual IP addresses of applications executed by the respective application processing apparatuses, the tunnel information update instruction section refers to the address information and notifies at least the virtual IP address of the second application and the IP address of the communication partner application processing apparatus corresponding to the virtual IP address to the failover destination application processing apparatus corresponding to the virtual IP address to the failover destination application processing apparatus in response to an inquiry including the virtual IP address of the second application received from the failover destination application processing apparatus, or notifies the virtual IP addresses of the plurality of the applications stored in the address information and the IP addresses of the communication partner application processing apparatus corresponding to the respective virtual IP addresses to the failover destination application processing apparatus in response to a notification of failure occurrence, the failover destination application processing apparatus further includes a tunnel information management section, and starts a process of the first application, irrespective of whether the first application transmits a packet to the virtual IP address of the second application, the tunnel information management section sets the virtual IP address of the second application and the IP address of the communication partner application processing apparatus correspondingly, which are notified from the redundancy managing apparatus, into the tunnel information, or sets the virtual IP address of the second application received from the backup apparatus and the IP address of the application processing apparatus corresponding to the virtual IP address among the plurality of virtual IP addresses and the IP addresses, which are notified from the redundancy managing apparatus, into the tunnel information.

2. The redundant failover system according to claim 1, wherein the application communication information notification section of the failover source application processing apparatus notifies transport communication information including the virtual IP address of the second application, a transport layer port number of the second application, the virtual IP address of the first application, and the transport layer port number of the first application to the failover destination application processing apparatus, when a connection is closed by reception or transmission of a reset packet of a connection-oriented transport protocol, the first application transmits an establishment request packet for establishing a connection identified by the transport communication information relating to the closed connection and including the transport layer port number of the first application, the virtual IP address of the first application, the transport layer port number of the second application, and the virtual IP address of the second application.

3. The redundant failover system according to claim 1, wherein the communication partner application processing apparatus includes a memory storing the second application and second tunnel information, and a packet transfer processing section, the second tunnel information includes a correspondence between the virtual IP address of the first application and the IP address of the failover source or the failover destination application processing apparatus, the packet transfer processing section refers to the second tunnel information to change a packet addressed to the virtual IP address of the first application from the second application into a packet addressed to the IP address of the failover source or the failover destination application processing apparatus, and transmits the packet to the failover source or the failover destination application processing apparatus, the failover source application processing apparatus transmits a confirmation packet for confirming IP reachability to the communication partner application processing apparatus, when failing to receive the confirmation packet, the communication partner application processing apparatus notifies the IP address of the failover source application processing apparatus to the redundancy managing apparatus, or refers to the tunnel information to notify the virtual IP address of the first application corresponding to the IP address of the failover source application processing apparatus to the redundancy managing apparatus, the communication partner application processing apparatus receives the virtual IP address of the first application and the IP address of the failover destination application processing apparatus to execute the first application from the redundancy managing apparatus, irrespective of whether the second application transmits a packet to the virtual IP address of the first application, the tunnel information management section of the communication partner application processing apparatus sets the virtual IP address of the first application and the IP address of the failover destination application processing apparatus correspondingly, which are received from the redundancy managing apparatus, into the second tunnel information.

4. The redundant failover system according to claim 1, wherein the communication partner application processing apparatus includes a memory storing the second application and second tunnel information, and a packet transfer processing section, the second tunnel information includes a correspondence between the virtual IP address of the first application and the IP address of the failover source or the failover destination application processing apparatus, the packet transfer processing section refers to the second tunnel information to change a packet addressed to the virtual IP address of the first application from the second application into a packet addressed to the IP address of the failover source or the failover destination application processing apparatus, and transmits the packet to the failover source or the failover destination application processing apparatus, the application communication information notification section of the failover source application processing apparatus notifies the virtual IP address of the second application, and the virtual IP address of the first application or the IP address of the failover source application processing apparatus to the redundancy managing apparatus, the tunnel information update instruction section of the redundancy managing apparatus refers to the address information and notifies the virtual IP address of the first application and the IP address of the failover source and/or failover destination application processing apparatus to the communication partner application processing apparatus corresponding to the virtual IP address of the second application notified from the application communication information notification section, irrespective of whether the second application transmits a packet to the virtual IP address of the first application, the tunnel information management section of the communication partner application processing apparatus sets the virtual IP address of the first application and the IP address of the failover source and/or the failover destination application processing apparatus correspondingly, which are notified from the tunnel information update instruction section, into the second tunnel information.

5. The redundant failover system according to claim 1, wherein the communication partner application processing apparatus includes a memory storing the second application and second tunnel information, and a packet transfer processing section, the second tunnel information includes a correspondence between the virtual IP address of the first application and the IP address of the failover source or the failover destination application processing apparatus, the packet transfer processing section refers to the second tunnel information to change a packet addressed to the virtual IP address of the first application from the second application into a packet addressed to the IP address of the failover source or the failover destination application processing apparatus, and transmits the packet to the failover source or the failover destination application processing apparatus, the first application of the failover source application processing apparatus transmits a DNS query for enquiring about the virtual IP address corresponding to a domain name of the second application to the redundancy managing apparatus, the redundancy managing apparatus further includes an address resolution section to identify the virtual IP address corresponding to the domain name of the second application, the tunnel information update instruction section of the redundancy managing apparatus refers to the address information and notifies the correspondence between the virtual IP address of the second application identified by the address resolution section in response to the DNS query and the IP address of the communication partner application processing apparatus to execute the second application to the failover source application processing apparatus, and refers to the address information and notifies the correspondence between the virtual IP address of the first application and the IP address of the failover source and/or failover destination application processing apparatus to the communication partner application processing apparatus, irrespective of whether the first application transmits a packet to the virtual IP address of the second application, the tunnel information management section of the failover source application processing apparatus sets the virtual IP address of the second application and the IP address of the communication partner application processing apparatus correspondingly, which are notified from the redundancy managing apparatus, into the tunnel information, irrespective of whether the second application transmits a packet to the virtual IP address of the first application, the tunnel information management section of the communication partner application processing apparatus sets the virtual IP address of the first application and the IP address of the failover source and/or failover destination application processing apparatus, which are notified from the redundancy managing apparatus correspondingly, into the second tunnel information.

6. The redundant failover system according to claim 1, wherein the first application performs connection-oriented communication with a plurality of applications, when the application processing apparatus to execute the first application is switched, the first application starts re-establishment of a communication connection between the first application and the plurality of applications.

7. The redundant failover system according to claim 2 1, wherein the redundancy managing apparatus further includes a failover determination section that determines the failover destination application processing apparatus and instructs the determined failover destination application processing apparatus to start a process of the first application, and the failover destination application processing apparatus starts the process of the first application in accordance with the instruction.

8. An application processing apparatus in a redundant failover system which comprises a plurality of application processing apparatuses including a failover source application processing apparatus to execute a first application, a failover destination application processing apparatus to execute the first application instead of the failover source application processing apparatus, and a communication partner application processing apparatus to communicate with the failover source application processing apparatus and the failover destination application processing apparatus, and a redundancy managing apparatus and a backup apparatus, and in which, respective applications executed by the plurality of application processing apparatuses perform communication control, the redundancy managing apparatus includes address information in which correspondences between IP addresses of the plurality of application processing apparatuses in the redundant failover system and virtual IP addresses of applications executed by the respective application processing apparatuses are stored and, refers to the address information, and notifies at least the virtual IP address of the second application and the IP address of the communication partner application processing apparatus corresponding to the virtual IP address to the failover destination application processing apparatus, the application processing apparatus comprises:

a memory storing the first application and tunnel information, a packet transfer processing section;

an application communication information notification section; and a tunnel information management section, wherein the tunnel information includes a correspondence between the virtual IP address of a second application executed by the communication partner application processing apparatus and the IP address of the communication partner application processing apparatus, the packet transfer processing section refers to the tunnel information to change a packet addressed to the virtual IP address of the second application from the first application into a packet addressed to the IP address of the communication partner application processing apparatus and transmits the packet to the communication partner application processing apparatus, when the application processing apparatus operates as a failover source, the application communication information notification section notifies the virtual IP address of the second application to the backup apparatus, when the application processing apparatus operates as a failover destination, the application processing apparatus starts a process of the first application, and irrespective of whether the first application transmits a packet to the virtual IP address of the second application, the tunnel information management section transmits an inquiry which includes the virtual IP address of the second application and is received from the backup apparatus, sets the virtual IP address of the second application and the IP address of the communication partner application processing apparatus correspondingly, which are notified from the redundancy managing apparatus in response to the inquiry, into the tunnel information, or sets the virtual IP address of the second application received from the backup apparatus and the IP address of the application processing apparatus corresponding to the virtual IP address among the plurality of virtual IP addresses and the IP addresses, which are notified from the redundancy managing apparatus, into the tunnel information.

* * * * *